United States Patent
Zhong et al.

(10) Patent No.: US 12,300,163 B2
(45) Date of Patent: May 13, 2025

(54) REFRESH RATE SWITCHING METHOD, ELECTRONIC DEVICE, AND SYSTEM

(71) Applicant: HONOR DEVICE CO., LTD., Shenzhen (CN)

(72) Inventors: Hui Zhong, Shenzhen (CN); Yi Su, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/546,808

(22) PCT Filed: Jun. 1, 2022

(86) PCT No.: PCT/CN2022/096694
§ 371 (c)(1),
(2) Date: Aug. 17, 2023

(87) PCT Pub. No.: WO2023/010983
PCT Pub. Date: Feb. 9, 2023

(65) Prior Publication Data
US 2024/0153449 A1    May 9, 2024

(30) Foreign Application Priority Data

Jul. 31, 2021   (CN) .................. 202110877466.X

(51) Int. Cl.
*G09G 3/3208* (2016.01)
*G06F 3/0354* (2013.01)
(Continued)

(52) U.S. Cl.
CPC ....... *G09G 3/3208* (2013.01); *G06F 3/03545* (2013.01); *G06F 3/0412* (2013.01);
(Continued)

(58) Field of Classification Search
None
See application file for complete search history.

(56) References Cited

U.S. PATENT DOCUMENTS

| | | | |
|---|---|---|---|
| 6,124,848 A * | 9/2000 | Ballare | G06F 3/0412 345/173 |
| 10,133,403 B2 | 11/2018 | Yeh et al. | |

(Continued)

FOREIGN PATENT DOCUMENTS

| | | |
|---|---|---|
| CN | 108885852 A | 11/2018 |
| CN | 110377251 A | 10/2019 |

(Continued)

*Primary Examiner* — Amr A Awad
*Assistant Examiner* — Donna V Bocar
(74) *Attorney, Agent, or Firm* — Fish & Richardson P.C.

(57) ABSTRACT

Embodiments of this application provide a refresh rate switching method, an electronic device, and a system. After being in a communication connection to a stylus, the electronic device may display a picture at a first refresh rate. The user may operate the electronic device, so that a refresh rate of the electronic device is switched from the first refresh rate to a second refresh rate. When the user holds the stylus again to approach a screen, the electronic device switches from the second refresh rate to a third refresh rate, where the first frequency is an integer multiple of the third refresh rate; and then after the electronic device sends a wake-up signal to the stylus, the stylus may intercept the wake-up signal, to send an uplink signal, and then the electronic device may receive the uplink signal from the stylus, and may keep signal synchronization with the stylus.

20 Claims, 28 Drawing Sheets

(51) Int. Cl.
*G06F 3/041* (2006.01)
*G06F 3/044* (2006.01)

(52) U.S. Cl.
CPC ........ *G06F 3/04162* (2019.05); *G06F 3/0442* (2019.05); *G09G 2340/0435* (2013.01); *G09G 2354/00* (2013.01)

(56) References Cited

U.S. PATENT DOCUMENTS

| | | |
|---|---|---|
| 2015/0084908 A1 | 3/2015 | Jordan |
| 2016/0092010 A1 | 3/2016 | Agarwal et al. |
| 2018/0164909 A1 | 6/2018 | Bae et al. |
| 2020/0402478 A1* | 12/2020 | Her .................... G09G 3/3406 |
| 2021/0397342 A1 | 12/2021 | Luo et al. |
| 2022/0027010 A1* | 1/2022 | Yuan ................... G06F 3/04166 |
| 2023/0386390 A1* | 11/2023 | Park .................... G09G 3/3233 |

FOREIGN PATENT DOCUMENTS

| | | |
|---|---|---|
| CN | 111610848 A | 9/2020 |
| CN | 113220154 A | 8/2021 |
| WO | 2020062310 A1 | 4/2020 |

\* cited by examiner

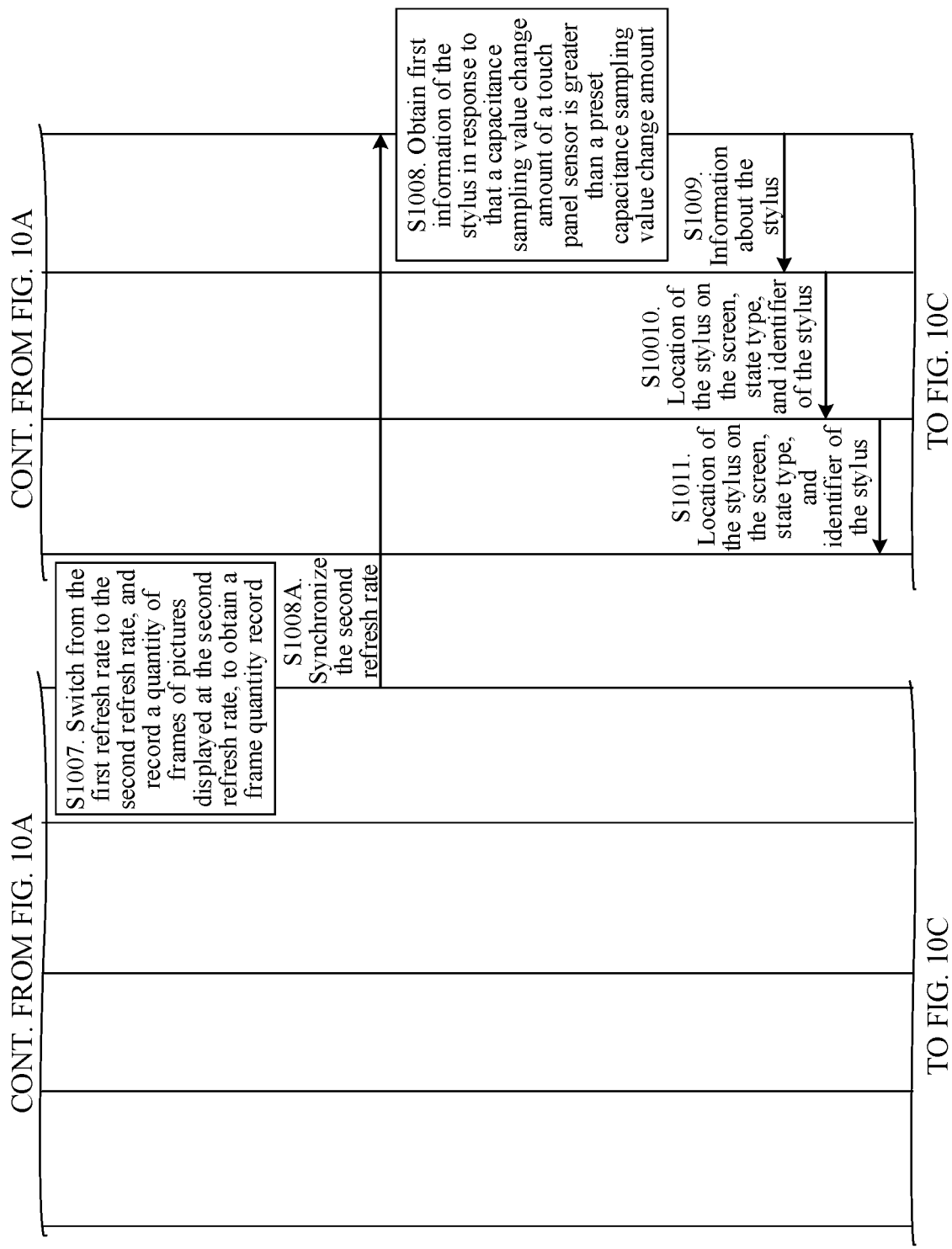

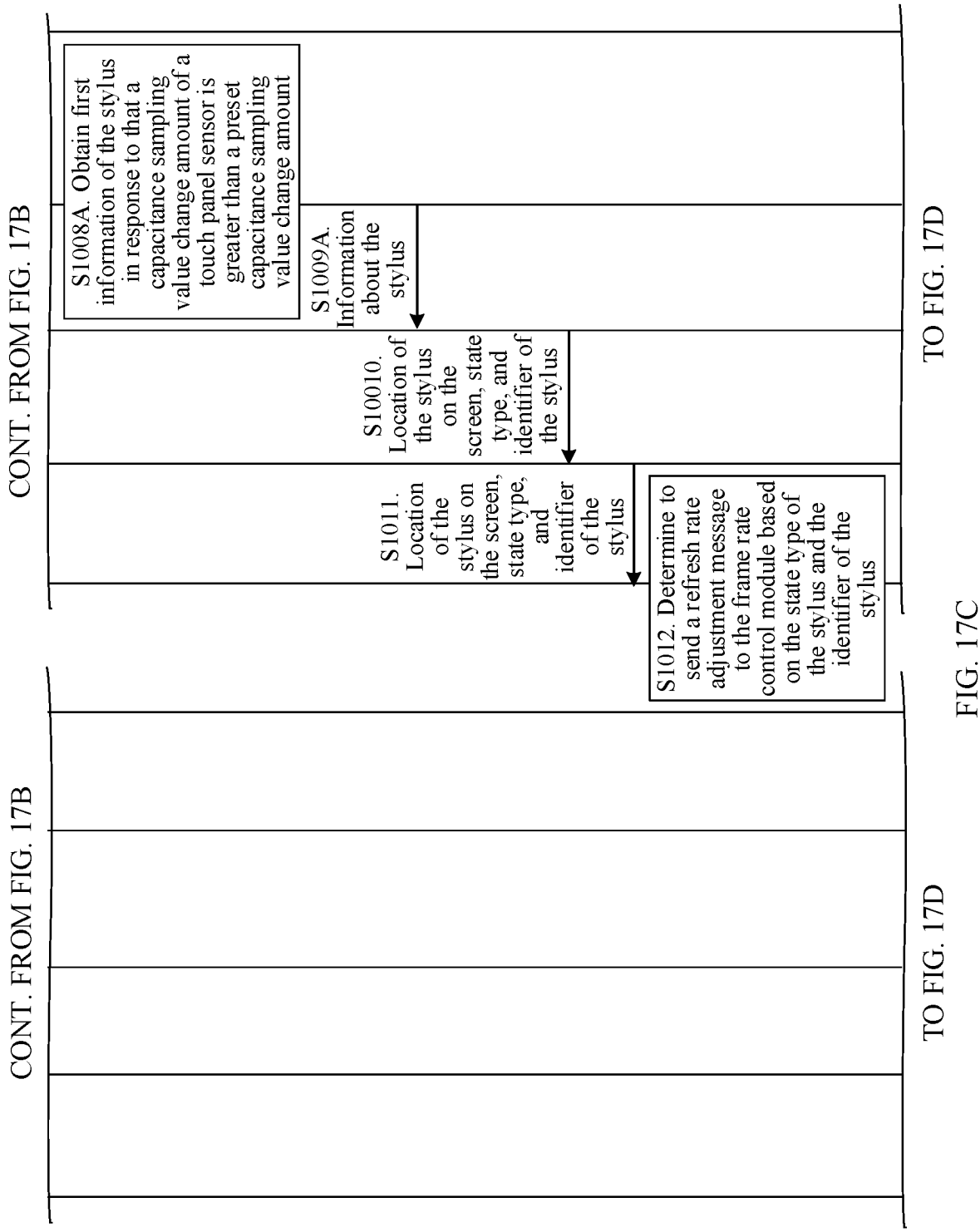

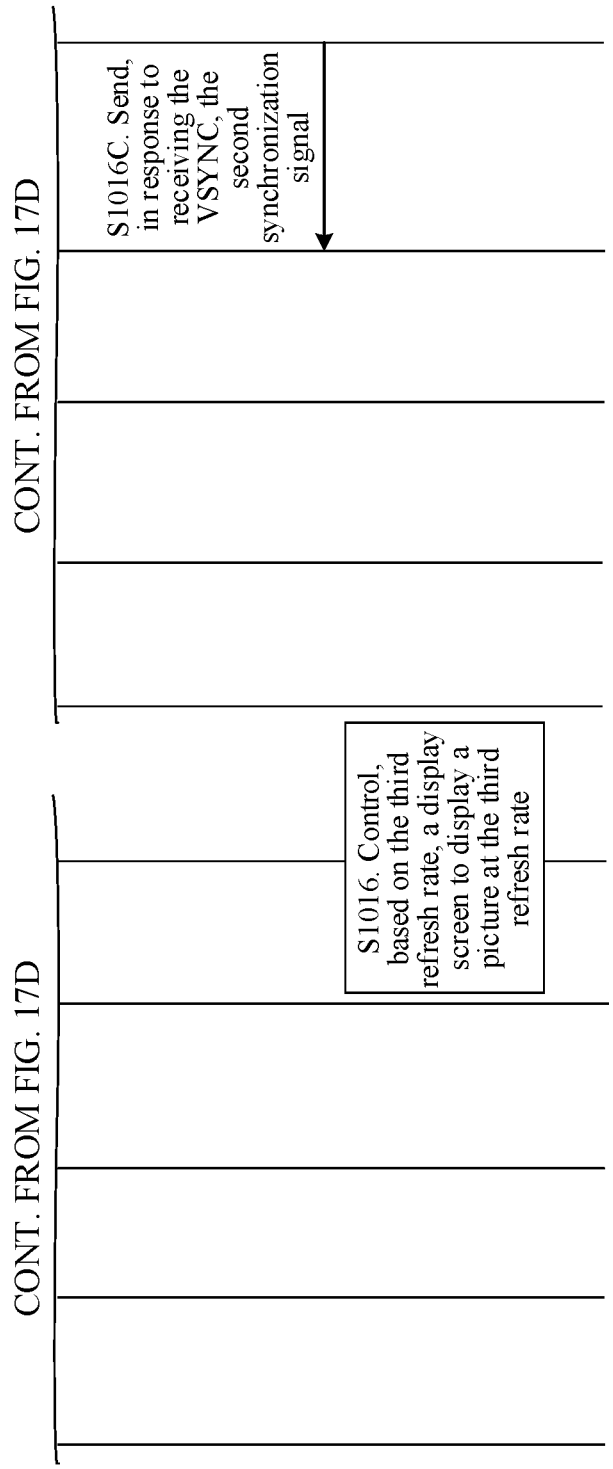

REFRESH RATE SWITCHING METHOD, ELECTRONIC DEVICE, AND SYSTEM

CROSS-REFERENCE TO RELATED APPLICATIONS

This application is a National Stage of International Application No. PCT/CN2022/096694 filed on Jun. 1, 2022, which claims priority to Chinese Patent Application No. 202110877466.X filed on Jul. 31, 2021. The aforementioned applications are incorporated by reference in their entireties.

TECHNICAL FIELD

Embodiments of this application relate to terminal technologies, and in particular, to a refresh rate switching method, an electronic device, and a system.

BACKGROUND

With the development of touch technologies, more electronic devices perform human-computer interaction in a touch manner. A user may provide input to an electronic device by operating a screen of the electronic device through a stylus, and the electronic device performs a corresponding operation based on the input.

Currently, after the electronic device and the stylus are in a wireless connection, the electronic device may display a picture at a specific refresh rate. If a frequency with which the stylus sends an uplink signal to the electronic device is equal to the refresh rate of the electronic device, the electronic device may receive the uplink signal from the stylus. The electronic device may obtain information about the stylus such as a location and an inclination angle based on the uplink signal, and execute a corresponding operation based on the information.

However, the electronic device may switch between refresh rates based on different application scenarios. As a result, the electronic device cannot receive the uplink signal from the stylus, and consequently the electronic device cannot interact with the stylus.

SUMMARY

Embodiments of this application provide a refresh rate switching method, an electronic device, and a system, where the electronic device may receive an uplink signal from a stylus, to implement signal synchronization between the electronic device and the stylus.

According to a first aspect, an embodiment of this application provides a refresh rate switching method, and an execution body of the method may be a terminal device or a chip in a terminal device. A description is made below using an example in which the execution body is a terminal device. The electronic device and a stylus are in a communication connection, and the method includes: switching, by the electronic device, a refresh rate of the electronic device from a first refresh rate to a second refresh rate in response to a first operation by a user, where a first frequency with which the stylus sends an uplink signal is an integer multiple of the first refresh rate, and the first frequency is not an integer multiple of the second refresh rate; switching from the second refresh rate to a third refresh rate when a distance between the stylus and a screen of the electronic device is less than or equal to a preset distance, where the first frequency is an integer multiple of the third refresh rate; sending a wake-up signal to the stylus; and receiving the uplink signal from the stylus, where the uplink signal is sent after the stylus receives the wake-up signal.

The first operation may be a window switching operation or a list sliding operation by the user.

In this embodiment of this application, after switching from the first refresh rate to the second refresh rate, the electronic device may record the quantity of frames of the pictures displayed by the electronic device at the second refresh rate, and then switch to the third refresh rate when detecting that the stylus approaches the screen, where the first frequency of the stylus is an integer multiple of the third refresh rate, and therefore occurrence of a handwriting intermittence phenomenon caused by signal asynchrony between the electronic device and the stylus may be avoided. In addition, after switching the refresh rate, the electronic device may receive the uplink signal from the stylus, and then keep signal synchronization with the stylus.

In a possible implementation, after the switching a refresh rate of the electronic device from a first refresh rate to a second refresh rate, the method further includes: recording a quantity of frames of pictures displayed at the second refresh rate, to obtain a frame quantity record; and the switching from the second refresh rate to a third refresh rate includes: querying the frame quantity record, and switching from the second refresh rate to the third refresh rate in response to that a quantity of frames recorded in the frame quantity record reaches a target quantity of frames.

In an implementation, the electronic device may start a frame counter, to count the quantity of frames of the pictures displayed at the second refresh rate, to obtain a frame quantity record.

The electronic device may perform the following steps, to obtain the target quantity of frames:

A: calculating whether a product of a latest quantity of frames recorded in the frame quantity record and the second refresh rate is an integer multiple of the first frequency; and if yes, performing step B, or otherwise, performing step A in response to detecting a new quantity of frames recorded in the frame quantity record; and B: determining that the quantity of frames recorded in the frame quantity record reaches the target quantity of frames.

In this embodiment of this application, in response to that the quantity of frames of the pictures displayed at the second refresh rate reaches the target quantity of frames, the electronic device may switch from the second refresh rate to the third refresh rate, so that the stylus may intercept the wake-up signal from the electronic device, to send the uplink signal and ensure signal synchronization between the electronic device and the stylus.

In a possible implementation, a manner in which the electronic device detects that the distance between the stylus and the screen is less than or equal to the preset distance may be: determining that a distance between the stylus and the screen is less than or equal to the preset distance if it is detected that a capacitance sampling value change amount of a touch panel sensor TP sensor in the screen is greater than or equal to a preset capacitance sampling value change amount and a change area of the capacitance sampling value change amount of the TP sensor indicates that a touch type is a stylus type.

A distance sensor or an infrared sensor may be arranged on the electronic device, and may be configured to detect the distance between the stylus and the screen.

In an embodiment, the third refresh rate is equal to the first refresh rate.

Alternatively, in an embodiment, the third refresh rate is not equal to the first refresh rate. The electronic device may determine, based on a scenario in which the electronic device is located, whether to switch to the first refresh rate or the third refresh rate. For example, for an application whose picture fluency requirement is high, the electronic device may switch to the third refresh rate, and for an application whose picture fluency requirement is low, the electronic device may switch to the first refresh rate, where the third refresh rate is higher than the first refresh rate.

It should be understood that, the electronic device sends a handshake request to the stylus after being in the communication connection to the stylus; receives a handshake signal from the stylus, where the handshake signal includes the first frequency; determines that the refresh rate of the electronic device is the first refresh rate; and sends a response signal to the stylus, where the response signal includes the first refresh rate, the second refresh rate, and the third refresh rate. In this way, after the electronic device sends the response signal to the stylus, the electronic device may display a picture at the first refresh rate, and keep signal synchronization with the stylus.

In an embodiment, the first operation is a window switching operation or a list sliding operation, and the switching a refresh rate of the electronic device from a first refresh rate to a second refresh rate in response to a first operation by a user includes: obtaining, in response to the first operation by the user, a refresh rate occurring after the user executes the first operation; and switching from the first refresh rate to the second refresh rate in response to that the refresh rate occurring after the user executes the first operation is the second refresh rate.

In a possible implementation, an application and a refresh rate have a mapping relationship, and when the first operation is a window switching operation, the obtaining a refresh rate occurring after the user executes the first operation includes: obtaining, according to an application to which a window occurring after switching belongs and the mapping relationship, the refresh rate occurring after the user executes the first operation.

In a possible implementation, when the first operation is a list sliding operation, the obtaining a refresh rate occurring after the user executes the first operation includes: obtaining, based on an application to which a window corresponding to the first operation executed by the user belongs and the first operation, the refresh rate occurring after the user executes the first operation.

In a possible implementation, after the receiving the uplink signal from the stylus, the method further includes: receiving a communication connection interrupt message from the stylus or a sleep message from the stylus; obtaining, in response to a second operation by the user, a refresh rate occurring after the user executes the second operation; and switching, in response to that the refresh rate occurring after the user executes the second operation is not the third refresh rate, the third refresh rate to the refresh rate occurring after the user executes the second operation.

In this possible implementation, because the stylus is disconnected from the electronic device, or the stylus is sleeping, indicating that the user does not use the stylus, the electronic device may switch the refresh rate based on a scenario in which the electronic device is located, and does not need to consider a moment of switching to the third refresh rate.

In a possible implementation, the electronic device includes: an application, an activity manager service module AMS, a window manager service module WMS, a scenario identification module, a frame rate control module, and a screen, the screen includes: a first integrated circuit IC chip, a display screen, and a touch panel sensor TP sensor.

In the foregoing embodiment, the switching a refresh rate of the electronic device from a first refresh rate to a second refresh rate in response to a first operation by a user includes:

sending, by the application in response to the first operation, first information to the AMS, where the first information includes: an identifier of the application and an identifier of an activity; sending, by the application, second information to the WMS, where the second information includes: a location of a window, a display sequence, sizes, and locations of elements in the window, the identifier of the application, and the identifier of the activity; sending, by the WMS in response to the second information, the identifier of the application and the identifier of the activity to the scenario identification module; determining, by the scenario identification module, an identifier of a scenario based on the identifier of the application and the identifier of the activity; and sending, by the scenario identification module, the identifier of the scenario to the frame rate control module.

The frame rate control module may execute the following operation in response to the identifier of the scenario:

first, when the first operation is a window switching operation, determining, by the frame rate control module based on the identifier of the scenario, that a refresh rate corresponding to the identifier of the scenario is the second refresh rate; or second, when the first operation is a list sliding operation, determining, by the frame rate control module based on the identifier of the scenario and the first operation, that a refresh rate corresponding to the identifier of the scenario is the second refresh rate.

After determining the second refresh rate, the frame rate control module synchronizes the second refresh rate to the first IC chip. A manner of synchronizing, by the frame rate control module, the second refresh rate to the first IC chip may be: sending, by the frame rate control module, a parameter ID of the second refresh rate to the first IC chip, or sending, by the frame rate control module, the second refresh rate to the first IC chip, or synchronizing, by the frame rate control module, the second refresh rate to the first IC chip through a display driver.

When switching from the first refresh rate to the second refresh rate, the frame rate control module may send a vertical synchronization signal VSYNC to the first IC chip; and the first IC chip displays, in response to receiving the VSYNC, a picture at the second refresh rate, and collects touch information of the user. It should be understood that, because the first frequency is not an integer multiple of the second refresh rate, the first IC chip may neither send the wake-up signal, and then nor collect the uplink signal of the stylus, but collect only the touch information of the user.

When determining to switch from the second refresh rate to the third refresh rate, the frame rate control module may synchronize the third refresh rate to the first IC chip; the frame rate control module sends, based on the third refresh rate, the VSYNC to the first IC chip; and the first IC chip displays, in response to receiving the VSYNC, a picture at the third refresh rate, the first IC chip sends the wake-up signal to the stylus through the TP sensor in a vertical back porch of displaying the picture at the third refresh rate, and the first IC chip receives the uplink signal from the stylus through the TP sensor. Different from the foregoing second refresh rate, because the first frequency is an integer multiple of the third refresh rate, the first IC chip may send the wake-up signal. correspondingly, the stylus may receive the wake-up signal, and then send the uplink signal, so that the first IC chip may collect the uplink signal. After collecting the uplink signal, the first IC chip may collect the touch information of the user.

In a possible implementation, during the displaying, by the first IC chip in response to receiving the VSYNC, a picture at the second refresh rate, the method further includes: starting, by the frame rate control module, the frame counter, to count the quantity of frames of the pictures displayed at the second refresh rate, to obtain a frame quantity record. Correspondingly, before the synchronizing, by the frame rate control module, the third refresh rate to the first IC chip, the method further includes: querying the frame quantity record, and synchronizing the third refresh rate to the first IC chip in response to that a quantity of frames recorded in the frame quantity record reaches the target quantity of frames.

Before the synchronizing, by the frame rate control module, the third refresh rate to the first IC chip in response to that a quantity of frames recorded in the frame quantity record reaches the target quantity of frames, the method further includes determining the target quantity of frames, where the determining the target quantity of frames specifically includes:

A: calculating whether a product of a latest quantity of frames recorded in the frame quantity record and the second refresh rate is an integer multiple of the first frequency; and if yes, performing step B, or otherwise, performing step A in response to detecting a new quantity of frames recorded in the frame quantity record; and B: determining that the quantity of frames recorded in the frame quantity record reaches the target quantity of frames.

In a possible implementation, after the displaying, by the first IC chip in response to receiving the VSYNC, a picture at the second refresh rate, the method further includes: determining, by the first IC chip, that a distance between the stylus and the screen is less than or equal to the preset distance in response to detecting that a capacitance sampling value change amount of the TP sensor is greater than or equal to a preset capacitance sampling value change amount and a change area of the capacitance sampling value change amount of the TP sensor indicates that a touch type is a stylus type.

In a possible implementation, the electronic device further includes: a touch driver, a touch message dispatch processing module, and a first touch message processing module, and after the determining that a distance between the stylus and the screen is less than or equal to the preset distance, the method further includes:

sending, by the first IC chip, information about the stylus to the touch driver, where the information about the stylus includes: a location of the stylus on the screen, a state type, and an identifier of the stylus, or the information about the stylus includes: the capacitance sampling value change amount of the TP sensor and an identifier of the stylus, and the state type may include but is not limited to: an enter hover type, a down type, an up type, or a move type;

obtaining, by the touch driver, the location of the stylus on the screen, the state type, and the identifier of the stylus according to the information about the stylus; sending, by the touch driver, the location of the stylus on the screen, the state type, and the identifier of the stylus to the first touch message processing module through the touch message dispatch processing module; and determining, by the first touch message processing module, to send a refresh rate adjustment message to the frame rate control module according to the state type of the stylus and the identifier of the stylus, where the refresh rate adjustment message is used for instructing the frame rate control module to adjust the second refresh rate to the third refresh rate.

In a possible implementation, the determining, by the first touch message processing module, to send a refresh rate adjustment message to the frame rate control module according to the state type of the stylus and the identifier of the stylus includes: determining, by the first touch message processing module in response to the identifier of the stylus and determining that the state type of the stylus is a preset state type, to send the refresh rate adjustment message to the frame rate control module, where the preset state type includes: the enter hover type or the down type; and the synchronizing, by the frame rate control module, the third refresh rate to the first IC chip includes: synchronizing, by the frame rate control module in response to receiving the refresh rate adjustment message, the third refresh rate to the first IC chip.

The foregoing is a solution in which the first IC chip can control the display screen to display a picture, and can also collect the touch information. In a possible implementation, the first IC chip includes: a touch IC chip and a display IC chip; the synchronizing, by the frame rate control module, the second refresh rate to the first IC chip includes: synchronizing, by the frame rate control module, the second refresh rate to the touch IC chip; and synchronizing, by the frame rate control module, the second refresh rate to the display IC chip.

To enable the touch IC chip to be synchronized with the display IC chip, that is, enable the touch IC chip to collect the touch information when the display IC chip displays each frame of picture, the display IC chip displays, in response to receiving the VSYNC, a picture at the second refresh rate, and sends a first synchronization signal to the touch IC chip; and the touch IC chip collects, in response to receiving the first synchronization signal, the touch information of the user.

Similarly, the synchronizing, by the frame rate control module, the third refresh rate to the first IC chip includes: synchronizing, by the frame rate control module, the third refresh rate to the touch IC chip; and synchronizing, by the frame rate control module, the third refresh rate to the display IC chip;

To enable the touch IC chip to be synchronized with the display IC chip, that is, enable the touch IC chip to send the wake-up signal in the vertical back porch VBP in which the display IC chip displays each frame of picture, the display IC chip displays, in response to the VSYNC, a picture at the third refresh rate, and may send a second synchronization signal to the touch IC chip, where the second synchronization signal includes: a start moment and an end moment of the vertical back porch of displaying the picture at the third refresh rate.

Correspondingly, the touch IC chip sends, in response to receiving the second synchronization signal, the wake-up signal to the stylus through the TP sensor in the vertical back porch; the first IC chip receives the uplink signal from the stylus through the TP sensor; and the touch IC chip receives the uplink signal from the stylus through the TP sensor.

As described above, regardless of whether the touch IC chip and the display IC chip are separated and arranged independently or integrated, signal synchronization between the electronic device and the stylus can be ensured.

According to a second aspect, an embodiment of this application provides a refresh rate switching method, and an execution body of the method may be an electronic device or a chip in an electronic device. An example in which the execution body is an electronic device is used. The electronic device and a stylus are in a communication connection, the electronic device supports a first refresh rate and a second refresh rate, a frequency with which the stylus intercepts a wake-up signal from the electronic device is a first frequency, and the first frequency is an integer multiple of a least common multiple of the first refresh rate and the second refresh rate. The method includes:

sending, by the electronic device when the electronic device displays a picture at the first refresh rate, the wake-up signal to the stylus, and receiving, by the stylus, the wake-up signal; sending, by the stylus, an uplink signal to the electronic device; and receiving, by the electronic device, the uplink signal.

The electronic device switches a refresh rate of the electronic device from the first refresh rate to the second refresh rate in response to a first operation by a user; switches from the second refresh rate to the first refresh rate when a distance between the stylus and a screen of the electronic device is less than or equal to a preset distance; sends a wake-up signal to the stylus; and receives the uplink signal from the stylus.

It should be understood that, the first operation may be a window switching operation or a list sliding operation.

In this embodiment of this application, because the frequency with which the stylus intercepts the wake-up signal is an integer multiple of the least common multiple of the first refresh rate and the second refresh rate that are supported by the electronic device, regardless of which refresh rate is adopted by the electronic device, it can be ensured that when using the stylus, the user can intercept the wake-up signal of the electronic device, and therefore the electronic device may receive the uplink signal from the stylus, to achieve an objective of signal synchronization between the electronic device and the stylus.

According to a third aspect, an embodiment of this application provides an electronic device, and the electronic device is configured to perform the method according to the first aspect.

In a possible implementation, the electronic device may include: an application, an activity manager service module AMS, a window manager service module WMS, a scenario identification module, a frame rate control module, and a screen, the screen includes: a first integrated circuit IC chip, a display screen, and a touch panel sensor TP sensor, where modules in the electronic device may execute actions corresponding to modules in the first aspect.

In a possible implementation, the electronic device may further include: a touch driver, a touch message dispatch processing module, and a first touch message processing module, where modules in the electronic device may execute actions corresponding to modules in the first aspect.

According to a fourth aspect, an embodiment of this application provides a refresh rate switching system, including the electronic device according to the third aspect and a stylus.

According to a fifth aspect, an embodiment of this application provides a refresh rate switching apparatus, and the apparatus may include: a processor and a memory. The memory is configured to store computer-executable program code, where the program code includes instructions. When the processor executes the instructions, the instructions enable an electronic device to perform the method according to the first aspect.

According to a sixth aspect, an embodiment of this application provides an electronic device, and the electronic device may be the refresh rate switching apparatus according to the fifth aspect. The electronic device includes units, modules, or circuits configured to perform the method provided in the first aspect.

According to a seventh aspect, an embodiment of this application provides a computer program product including an instruction, where when the computer program product is run on a computer, the computer is enabled to perform the method according to the first aspect.

According to an eighth aspect, an embodiment of this application provides a computer-readable storage medium, where the computer-readable storage medium stores an instruction, and when the instruction runs on a computer, the computer is enabled to perform the method according to the first aspect.

For beneficial effects of the possible implementations of the second aspect to the eighth aspect, reference may be made to the beneficial effects brought by the first aspect, and details are not described herein again.

BRIEF DESCRIPTION OF DRAWINGS

FIG. 10A, FIG. 10B, and FIG. 10C are schematic flowcharts of an embodiment of a refresh rate switching method according to an embodiment of this application;

FIG. 17A, FIG. 17B, FIG. 17C, FIG. 17D, and FIG. 17E are schematic flowcharts of another embodiment of a refresh rate switching method according to an embodiment of this application;

DESCRIPTION OF EMBODIMENTS

Figure 1A:
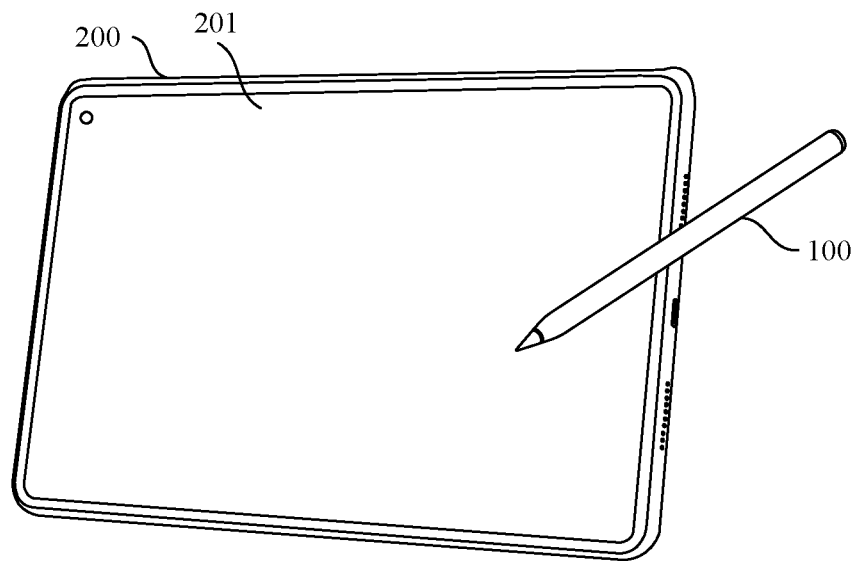
FIG. 1A is a schematic diagram of a scenario to which an embodiment of this application is applicable.

FIG. 1A is a schematic diagram of a scenario to which an embodiment of this application is applicable. Referring to FIG. 1A, the scenario includes a stylus (stylus) 100 and an electronic device 200. In FIG. 1A, an example in which the electronic device 200 is a tablet (tablet) is used for description. The stylus 100 may perform an operation on a screen 201 of the electronic device 200, to provide input to the electronic device 200, and the electronic device 200 may perform an operation in response to the input based on the input by the stylus 100. In an embodiment, the stylus 100 and the electronic device 200 may be interconnected through a communication network to interact through radio signals. The communication network may be, but is not limited to a Wi-Fi hotspot network, a Wi-Fi peer-to-peer (peer-to-peer, P2P) network, a Bluetooth network, a Zigbee zigbee network, a near field communication (near field communication, NFC) network, or the like. That is to say, the stylus 100 may be in a communication connection or wireless connection to the electronic device 200.

Figure 1B:
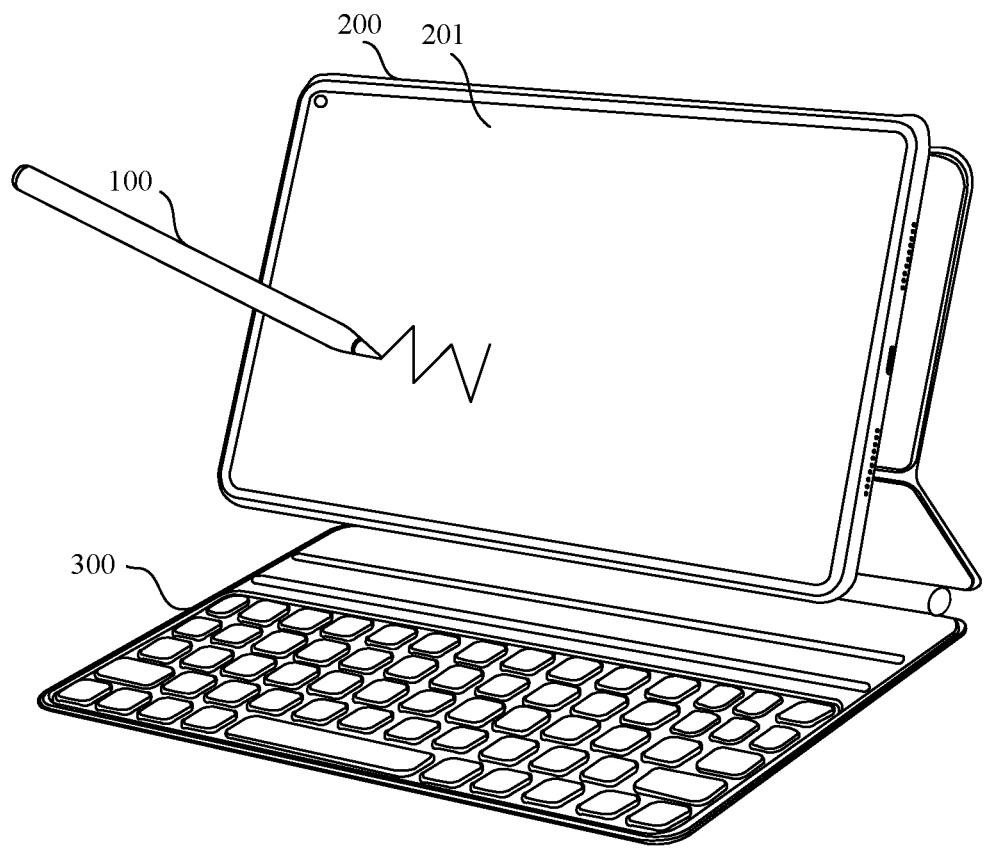
FIG. 1B is a schematic diagram of another scenario to which an embodiment of this application is applicable.

FIG. 1B is a schematic diagram of another scenario to which an embodiment of this application is applicable. Compared with FIG. 1A, in addition to the stylus 100 and the electronic device 200, the scenario may further include a wireless keyboard 300. The user may operate the wireless keyboard 300, to provide an input to the electronic device 200. The electronic device 200 may perform an operation in response to the input based on the input by the wireless keyboard 300. In an embodiment, a touch area may be arranged on the wireless keyboard 300. The stylus 100 may operate the touch area of the wireless keyboard 300 to provide an input to the wireless keyboard 300. The structure of the wireless keyboard 300 is not limited in this embodiment of this application. In an embodiment, the stylus 100 and the wireless keyboard 300, and the electronic device 200 and the wireless keyboard 300 may also be interconnected through a communication network. For the communication network, reference may be made to foregoing related descriptions.

It should be understood that, FIG. 1A and FIG. 1B are examples of two scenarios to which an embodiment of this application is applicable, and a refresh rate switching method provided in embodiments of this application may be further applicable to other scenarios "including the stylus 100 and the electronic device 200".

To better describe the refresh rate switching method provided in the embodiments of this application, the display principle of the electronic device is briefly described below:

A refresh rate indicates a quantity of times that the electronic device displays a picture in each second, and a refresh rate of the electronic device may also be referred to as a display frequency or a display frame rate. Refresh rates of the electronic device may be but are not limited to: 60 Hz, 90 Hz, and 120 Hz. Using an example in which a refresh rate of the electronic device is 60 Hz, the electronic device may display 60 frames of pictures in 1000 ms, that is, display a frame of picture every 16.6 ms.

Figure 2:
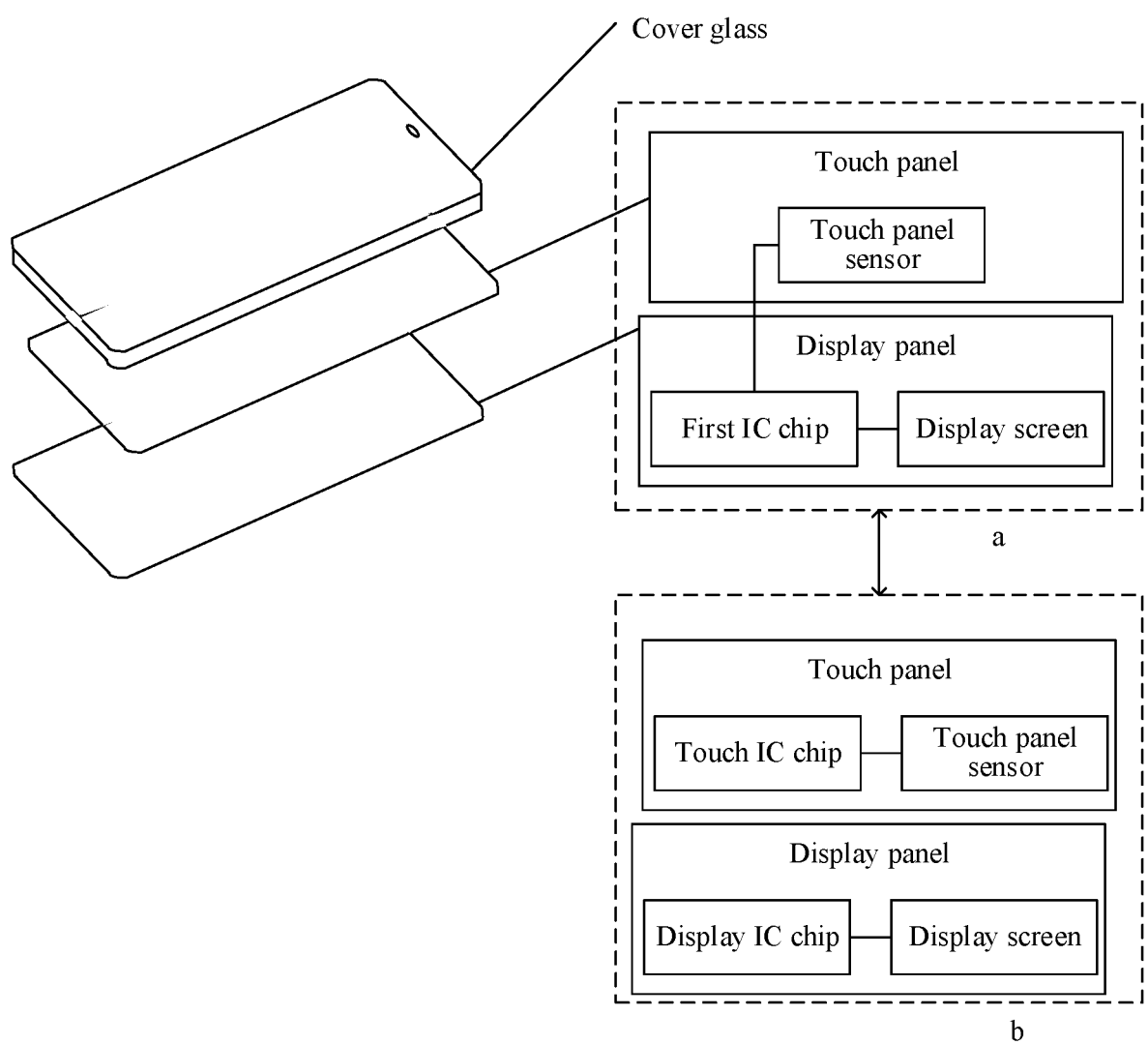
FIG. 2 is a schematic structural diagram of a screen of an electronic device according to an embodiment of this application.

FIG. 2 is a schematic structural diagram of a screen of an electronic device according to an embodiment of this application. Referring to FIG. 2, the screen 201 of the electronic device 200 includes: a cover glass, a touch panel, and a display panel. It can be understood that an example structure in this embodiment of this application does not constitute a specific limitation on the electronic device 200. In some other embodiments of this application, the electronic device 200 may include more or fewer components than those shown in the figure, or some components may be combined, or some components may be split, or a different component deployment may be used.

Referring to FIG. 2, the cover glass is located on top of the touch panel, and the touch panel is located on top of the display panel. The cover glass plays a role in protecting the touch panel and the display panel.

In an embodiment, the touch panel includes a touch IC chip (integrated circuit chip) and a touch panel sensor (touch panel sensor, TP sensor), the display panel includes a display screen and a display IC chip, and the display IC chip is configured to control the display screen to display a picture at a refresh rate, referring to b in FIG. 2.

In an embodiment, the touch IC chip and the display IC chip may be integrated. As shown in a in FIG. 2, the first IC chip indicates that the touch IC chip and the display IC chip are integrated. In this embodiment, the touch panel includes the TP sensor, the display panel includes the first IC chip and the display screen, and the first IC chip is connected to each of the TP sensor and the display screen. It should be understood that, the terminal device may include the structure shown in a of FIG. 2 or the structure shown in b of FIG. 2.

The display principle of the electronic device 200 is described below mainly with reference to the display IC chip and the display screen:

The display screen includes pixels in a row-column arrangement, and the display IC chip may control the pixels to display corresponding brightness and colors, so that the display screen may display a frame of picture. That the display IC chip controls the pixels to display corresponding brightness and colors may be referred to as that the display IC chip lights the pixels. In an embodiment, using an example in which the display screen is an organic light-emitting diode (organic light-emitting diode, OLED) display screen, each pixel may include three OLED organic light-emitting diodes, the three organic light-emitting diodes respectively emit colors of red (red, R), green (green, G), and blue (blue, B), and a combination of the three organic light-emitting diodes may emit a color in an RGB format. The display IC chip may control organic light-emitting diodes in the pixels to display corresponding brightness and colors, so that the display screen displays a frame of picture.

Figure 3:
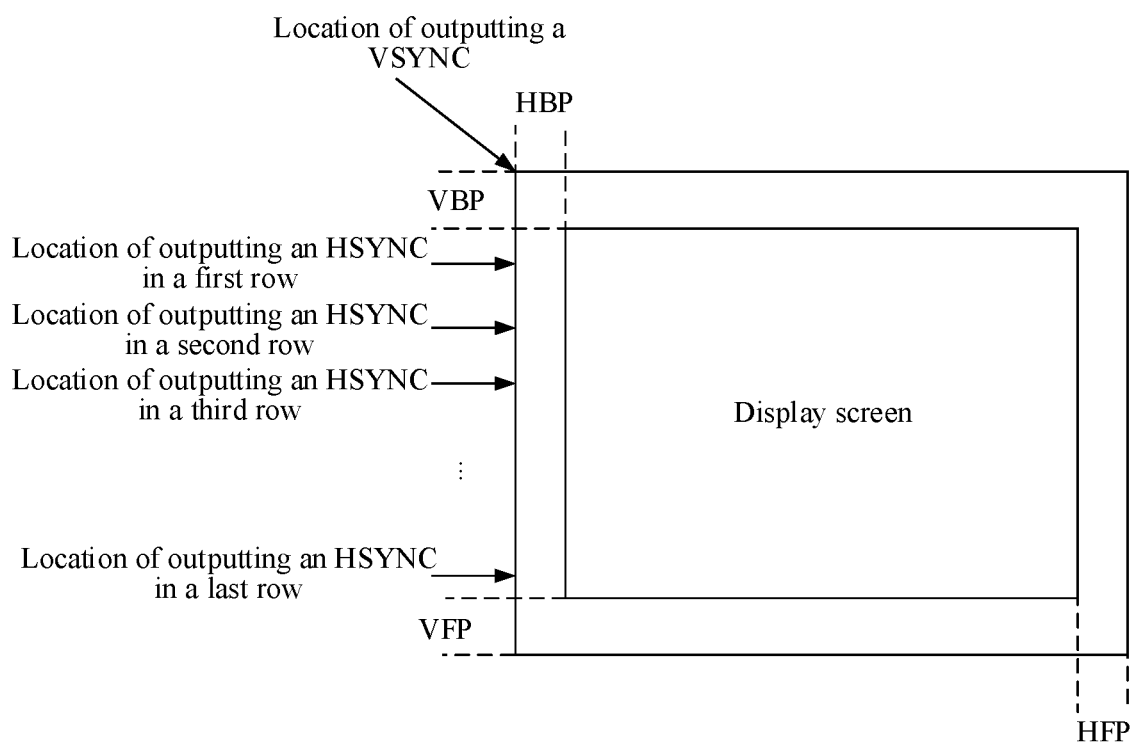
FIG. 3 is a schematic diagram of displaying a picture on a display screen.

Referring to FIG. 3, for example, an OLED display screen has a resolution of 1080×2400, indicating that for the OLED display screen, one row includes 1080 pixels and one column includes 2400 pixels. For the OLED display screen, the display IC chip may sequentially light rows of pixels from top to bottom, but does not light first n1 rows of pixels and last n2 rows of pixels. It may be understood that, when controlling the OLED display screen to display a frame of picture, the display IC chip may control organic light-emitting diodes in the first n1 rows of pixels and the last n2 rows of pixels to emit no light, and control organic light-emitting diodes in pixels between the first n1 rows of pixels and the last n2 rows of pixels to display corresponding brightness and colors.

The first n1 rows of pixels may be referred to as a vertical back porch (vertical back porch, VBP), and the last n2 rows of pixels may be referred to as a vertical front porch (vertical front porch, VFP). The vertical front porch and the vertical back porch may be understood as: several rows of pixels that are inapplicable when the display IC chip controls the display screen to display a frame of picture. It should be understood that, n1 and n2 are preset. In an embodiment, n1 may be equal to n2. In this way, when controlling the display screen to display a frame of picture, the display IC chip may control organic light-emitting diodes in pixels between the vertical back porch and the vertical front porch to display corresponding brightness and colors row by row from an $(n1+1)^{th}$ row of pixels.

For a row of pixels, the display IC chip may sequentially light the row of pixels from left to right, but does not light first n3 pixels and last n4 pixels of the row. It may be understood that, the display IC chip may control organic light-emitting diodes in the first n3 pixels and the last n4 pixels to emit no light.

The first n3 pixels may be referred to as a horizontal back porch (horizontal back porch, HBP), and the last n4 pixels may be referred to as a horizontal front porch (horizontal front porch, HFP). The horizontal front porch and the horizontal back porch may be understood as: several pixels that are not used when the display IC chip controls a rows of pixels. It should be understood that, n3 and n4 are preset. In an embodiment, n3 may be equal to n4. For example, n3 is 10 pixels.

Using an example in which the display IC chip controls the $(n1+1)^{th}$ row of pixels, the display IC chip may control, according to a horizontal synchronization signal (horizontal sync, HSYNC), organic light-emitting diodes in the horizontal back porch to emit no light, organic light-emitting diodes in pixels between the horizontal back porch and the horizontal front porch to display corresponding brightness and colors, and organic light-emitting diodes in the horizontal front porch to emit no light. The HSYNC indicates that the display IC chip controls the organic light-emitting diodes in the $(n1+1)^{th}$ row of pixels to work. After controlling organic light-emitting diodes in a last pixel of the horizontal front porch to emit no light, the display IC chip may control pixels in an $(n1+2)^{th}$ row according to a horizontal synchronization signal in the $(n1+2)^{th}$ row. In this way, the display IC chip may control organic light-emitting diodes in the pixels between the vertical back porch and the vertical front porch to display corresponding brightness and colors, so that the display screen displays a frame of picture.

For each row of pixels, there is a horizontal porch (horizontal porch, H-Porch), and H-Porch=HFP+HBP+HSW, where HBP may indicate duration for which the display IC chip controls the organic light-emitting diodes in the horizontal back porch to emit no light, HFP may indicate duration for which the display IC chip controls the organic light-emitting diodes in the horizontal front porch to emit no light, HSW indicates duration of the HSYNC, and the unit of HSW is duration for which the display IC chip controls light-emitting diodes in one pixel to work. The horizontal porch may also be referred to as a row porch.

After the display IC chip controls the display screen to display a frame of picture, the display IC chip may control the organic light-emitting diodes in the vertical front porch to emit no light. After the display IC chip controls a last organic light-emitting diode in the vertical front porch to emit no light, the display IC chip may control, according to a vertical synchronization signal (vertical sync, VSYNC), the organic light-emitting diodes in the vertical back porch to emit no light, and the organic light-emitting diodes in the pixels between the vertical back porch and the vertical front porch to display corresponding brightness and colors. For details, reference may be made to the foregoing related description. The VSYNC indicates that the display IC chip controls the display screen to display a next frame of picture. For the VSYNC, reference may be made to related descriptions in the following embodiments.

For a frame of picture, there is a vertical porch (vertical porch, V-Porch), and V-Porch=VFP+VBP+VSW, where VFP may indicate duration for which the display IC chip controls the organic light-emitting diodes in the vertical front porch to emit no light, VBP may indicate duration for which the display IC chip controls the organic light-emitting diodes in the vertical back porch to emit no light, VSW indicates duration of the VSYNC, and the unit of HSW is duration for which the display IC chip controls light-emitting diodes in one row of pixels to work. The vertical porch may also be referred to as a frame porch.

Figure 4A:
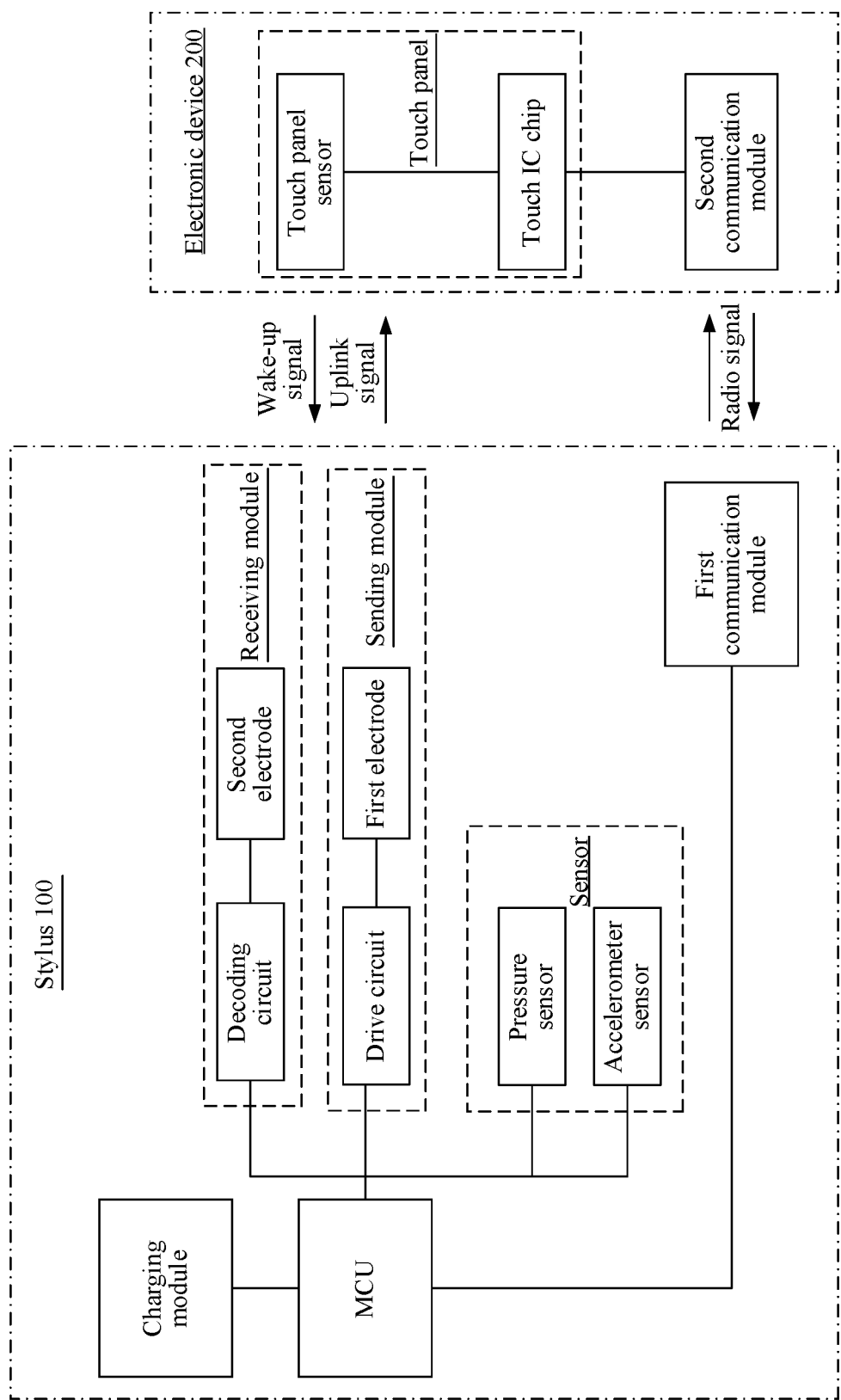
FIG. 4A is a schematic diagram of interaction between a stylus and an electronic device according to an embodiment of this application.

FIG. 4A is a schematic diagram of interaction between a stylus and an electronic device to which an embodiment of this application is applicable. Referring to FIG. 4A, in an embodiment, the stylus 100 may include: a microcontroller unit (microcontroller unit, MCU), a first communication module, a sending module, and a receiving module. As described above, the electronic device shown in FIG. 2 includes the touch IC chip and the TP sensor. In addition, the electronic device 200 may further include: a second communication module.

In the stylus 100, the MCU is connected to each of the first communication module, the sending module, and the receiving module. The sending module may include: a first electrode and a drive circuit, where the first electrode is connected to the drive circuit, and the drive circuit is connected to the MCU. The receiving module includes a second electrode and a decoding circuit, where the second electrode is connected to the decoding circuit, and the decoding circuit is connected to the MCU. In the electronic device 200, the TP sensor includes an electrode array, and the electrode array includes a plurality of electrodes in a row-column arrangement.

In the following embodiments, a description is made using an example in which the first communication module and the second communication module are both Bluetooth modules, and the first communication module and the second communication module may alternatively be wireless local area network modules, Wi-Fi modules, or the like. This is not limited in the embodiments of this application. It should be understood that, the stylus 100 and the electronic device 200 may establish a wireless path (for example, Bluetooth path) through the first communication module and the second communication module.

Figure 4B:
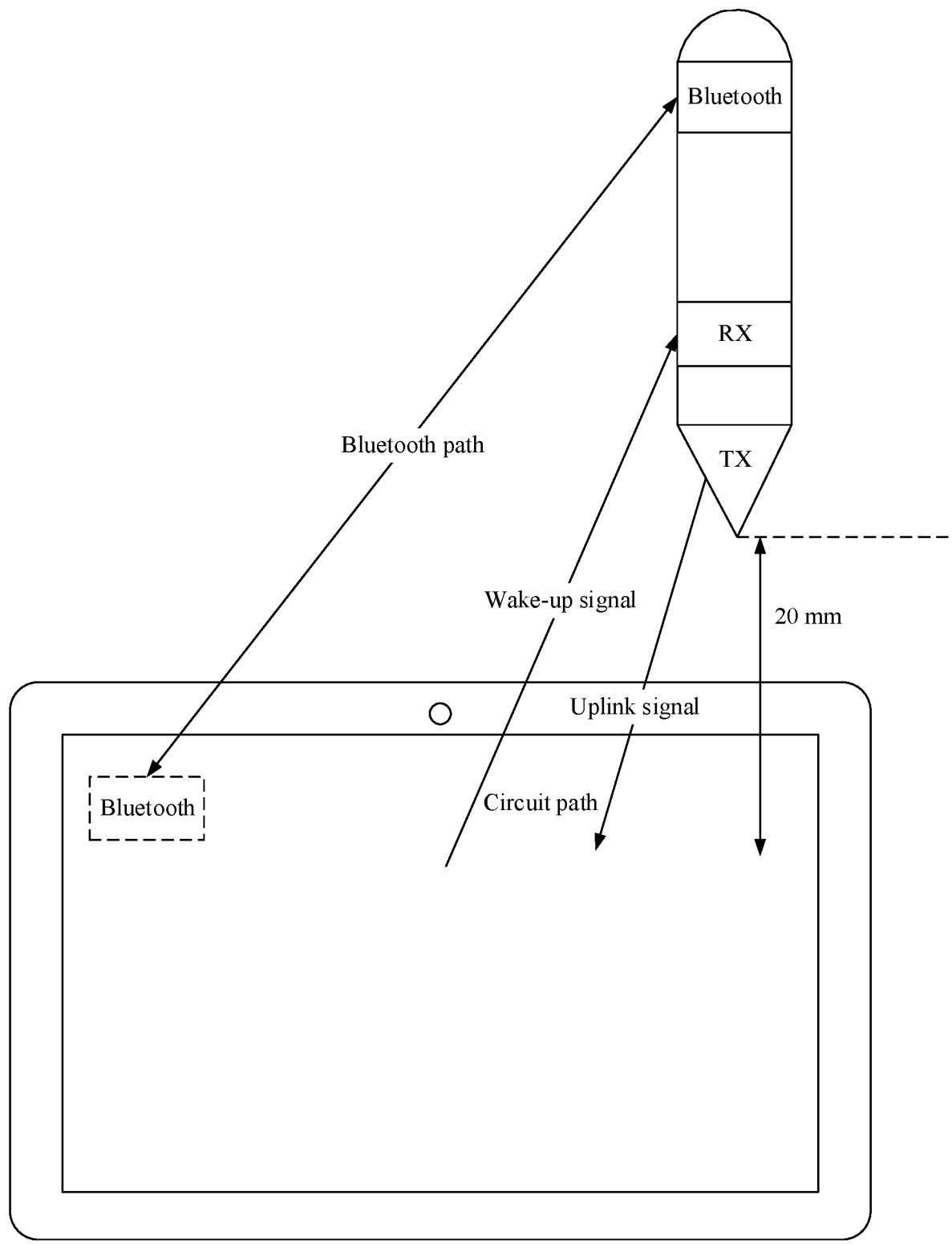
FIG. 4B is another schematic diagram of interaction between a stylus and an electronic device according to an embodiment of this application.

For example, the stylus and the electronic device may establish a Bluetooth path through the first communication module and the second communication module. Referring to FIG. 4B, because the tip of the stylus is provided with an electrode, a screen of the electronic device includes an electrode array, and an insulating material (for example, air or cover glass) exists between the tip of the stylus and the electrode of the touch panel sensor, a capacitor may be formed between the tip of the stylus and the electrode of the touch panel sensor, the tip of the stylus and the touch panel sensor in the electronic device may establish a circuit connection through the capacitor, and a path between the tip of the stylus and the touch panel sensor in the electronic device may be referred to as a circuit path. The stylus and the electronic device may perform signal interaction through the circuit path.

In the stylus 100, the MCU is configured to generate a pulse width modulation (pulse width modulation, PWM) signal, and send the PWM signal to the drive circuit. The drive circuit may drive, based on the PWM signal, the first electrode to send a signal (for the signal outputted by the stylus, reference may be made to related descriptions in FIG. 6B, such as the uplink signal). The first electrode may be referred to as a transport electrode (transport, TX), and the first electrode may be arranged close to the tip of the stylus 100.

In the electronic device 200, the TP sensor is configured to collect touch information, where the touch information may include: information about touching the screen 201 by the stylus 100 and information about touching the screen 201 by the user (for example, a finger or a finger joint of the user). Using an example in which the touch information is the information about touching the screen 201 by the stylus 100, the touch IC chip may determine, based on the touch information collected by the TP sensor, a location of the stylus 100 on the screen 201.

Figure 4C:
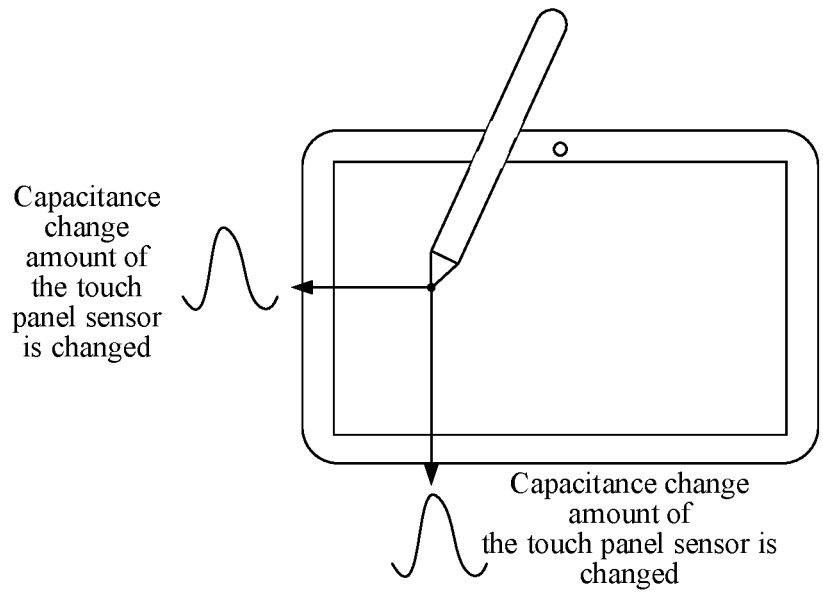
FIG. 4C is another schematic diagram of a capacitance sampling value change amount of a TP sensor according to an embodiment of this application.

It should be understood that, if the tip of the stylus 100 approaches the screen 201 of the electronic device 200, the capacitance sampling value change amount of the TP sensor in the screen 201 is changed, and a shorter distance between the tip of the stylus and the screen 201 indicates a larger capacitance sampling value change amount of the TP sensor. Referring to FIG. 4C, in FIG. 4C, a wave crest indicates that a capacitance sampling value change amount in a location corresponding to the TP sensor is changed, and the touch IC chip in the screen 201 may determine, based on a capacitance sampling value change amount on the TP sensor, a location of the stylus on the screen 201 of the electronic device. For example, the touch IC chip may use a location with a largest capacitance sampling value change amount on the TP sensor as the location of the stylus on the screen 201. It should be understood that, in FIG. 4C, a black dot indicates a location where the stylus comes into contact with the screen 201.

Figure 6A:
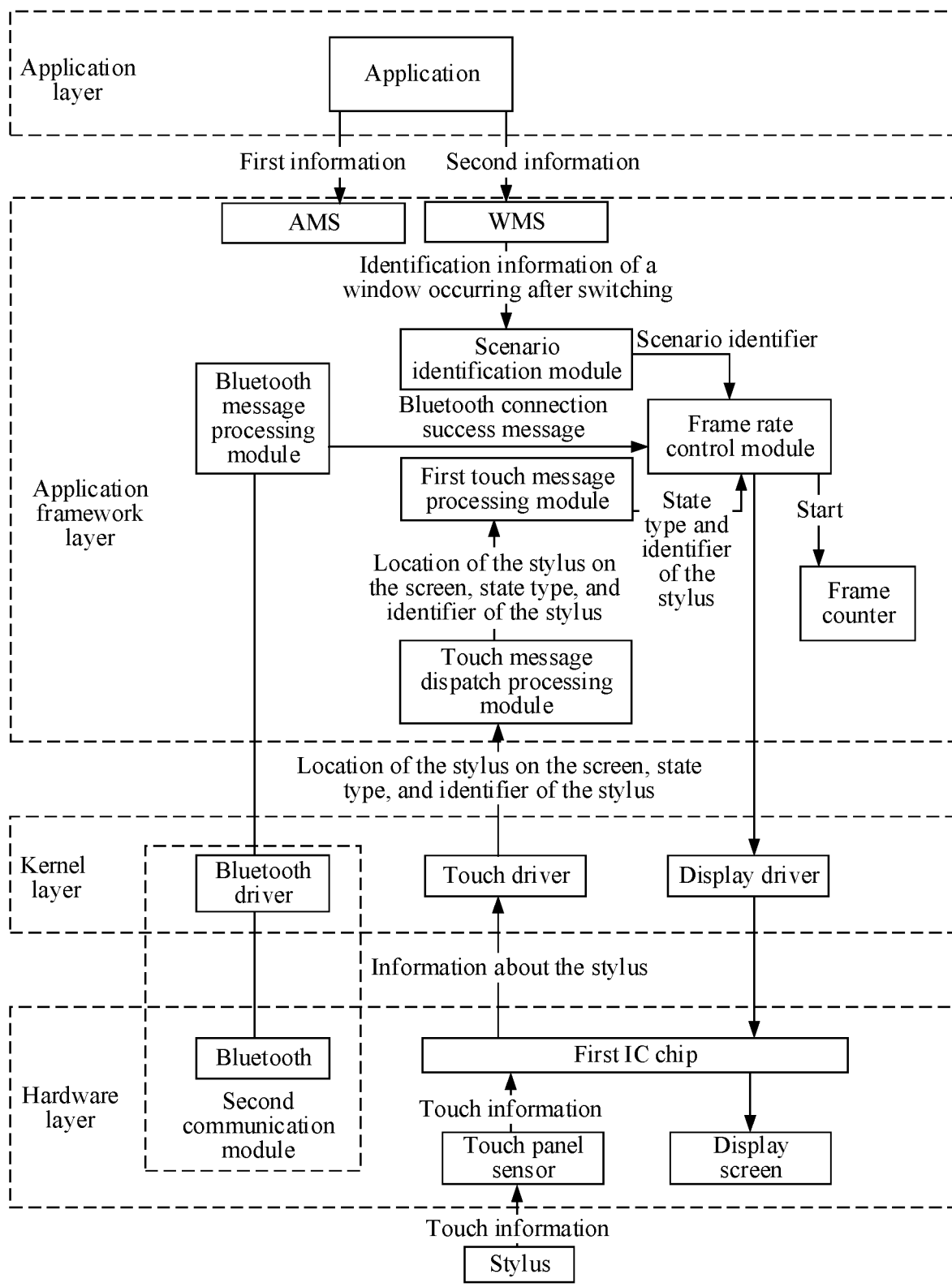
FIG. 6A is a block diagram of a structure of an electronic device to which an embodiment of this application is applicable.
Figure 6B:
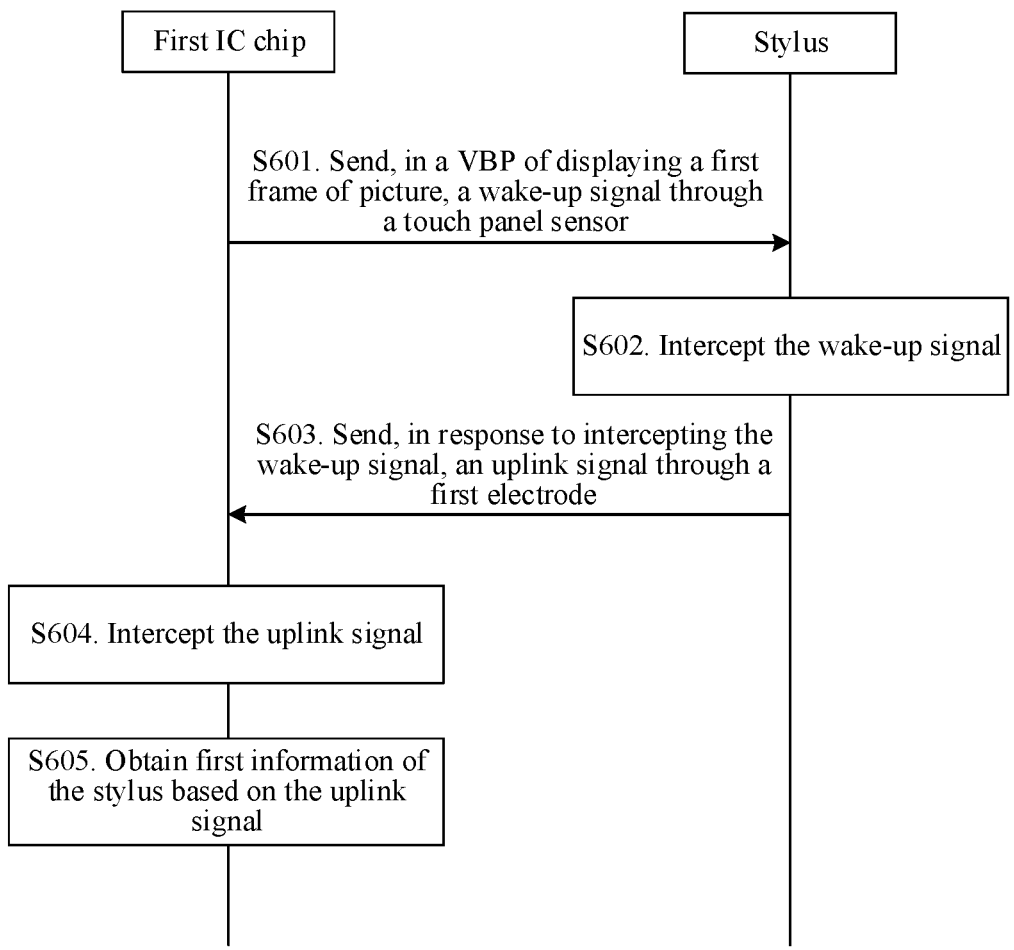
FIG. 6B is a schematic diagram of interaction between a stylus and an electronic device through a circuit path according to an embodiment of this application.

The second electrode is configured to receive a signal from the TP sensor in the electronic device (for the signal sent by the electronic device, reference may be made to related descriptions in FIG. 6B, such as the wake-up signal), and send the signal to the decoding circuit. The decoding circuit is configured to decode the signal from the electronic device 200, and send a decoded signal to the MCU. The second electrode may be referred to as a receive electrode (receive, RX).

It should be understood that, the signal sent by the stylus through the first electrode and the signal sent by the electronic device through the TP sensor are both square wave signals.

Referring to FIG. 4A, in an embodiment, the stylus 100 may further include: a charging module and a sensor module. The charging module is configured to charge the stylus 100. The sensor module may include but is not limited to: a pressure sensor, an accelerometer sensor (accelerometer sensor, G-sensor), and the like. The sensor module may be connected to the MCU.

The pressure sensor may be arranged on the tip of the stylus 100. The pressure sensor is configured to collect a pressure value of the tip. For example, when the tip of the stylus comes into contact with the screen 201 of the electronic device, the pressure sensor may collect a pressure value of the tip. The G-sensor is configured to collect a three-axis acceleration value of the stylus, where the three-axis acceleration value includes: an X-axis acceleration value, a Y-axis acceleration value, and a Z-axis acceleration value. The pressure sensor may send the collected pressure value to the MCU, and the G-sensor may send the three-axis acceleration value to the MCU. In this way, the MCU may obtain, based on the three-axis acceleration value, information about the stylus 100 such as an inclination angle and a motion state, where the motion state is used to indicate whether the stylus 100 is in a motionless state or non-motionless state.

The MCU may synchronize the information about the stylus 100 to the electronic device 200, and the information about the stylus 100 may include: the pressure value of the tip, the inclination angle and the motion state of the stylus 100, and the like. In an embodiment, the MCU may send, based on the first communication module, the information about the stylus 100 to the electronic device 200, and the electronic device 200 may receive the information about the stylus 100 through the second communication module. In an embodiment, the MCU may send the information about the stylus 100 to the electronic device 200 through the first electrode TX, and the electronic device 200 may receive the information about the stylus 100 through the TP sensor. In the following embodiments, a description is made using an example in which the MCU sends the information about the stylus 100 to the electronic device 200 through the first electrode TX.

It should be understood that, the structure of the stylus shown in FIG. 4A is an example. In an embodiment, two electrodes may be arranged in the stylus, where one electrode is TX, and the other electrode may switch between TX and RX. Reference may be made to related descriptions in the existing technology, and a quantity and a principle of electrodes in the stylus are not limited in the embodiments of this application.

Figure 5:
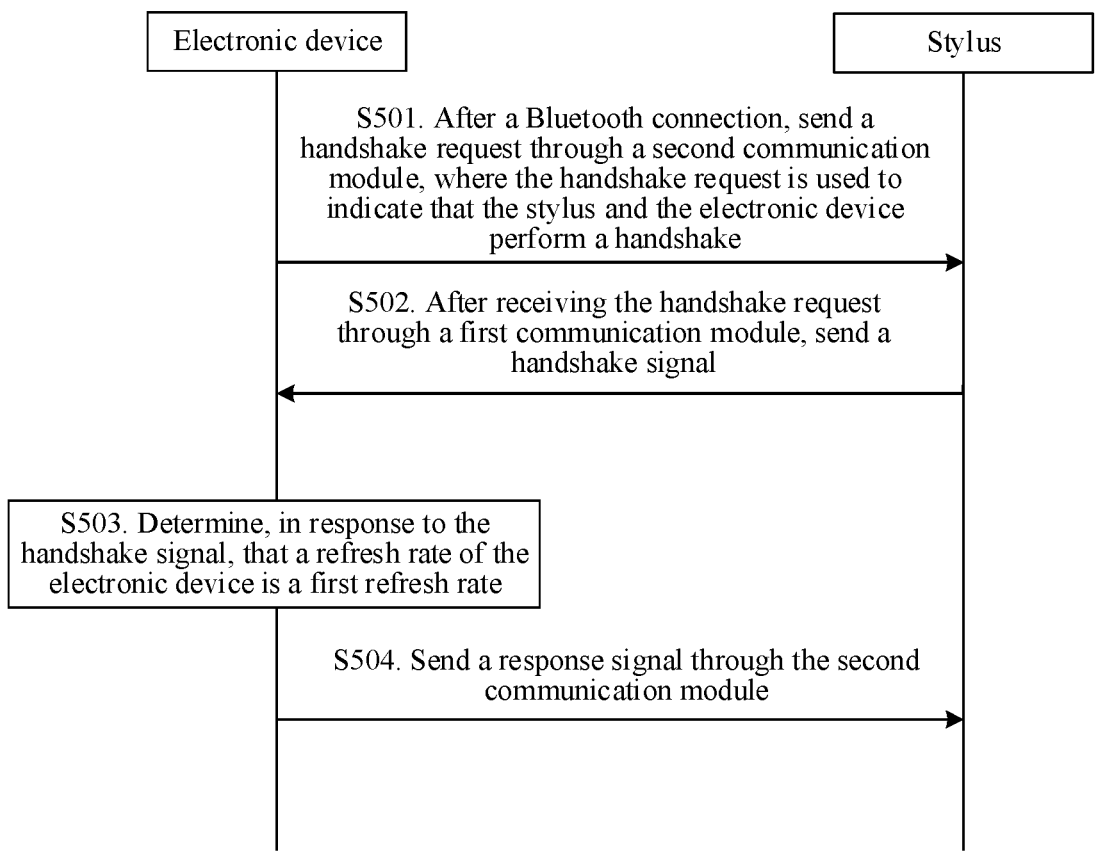
FIG. 5 is a schematic diagram of interaction between a stylus and an electronic device through a wireless path according to an embodiment of this application.

With reference to the foregoing structures of the stylus and the electronic device, the process of performing interaction between the stylus and the electronic device through radio signals is further described below:

Referring to FIG. 5, a process in which an electronic device and a stylus interact through a wireless path may include:

S501. After the electronic device and the stylus are in a Bluetooth connection, the electronic device sends a handshake request to the stylus through a second communication module, where the handshake request is used to indicate that the stylus and the electronic device perform a handshake.

It should be understood that, only when the electronic device and the stylus perform a handshake successfully, the stylus may perform an operation, writing, and the like on a screen of the electronic device.

S502. After receiving the handshake request through a first communication module, the stylus sends a handshake signal to the electronic device.

The handshake signal includes a first frequency with which the stylus sends an uplink signal. For example, the first frequency is 240 Hz.

S503. The electronic device determines, in response to the handshake signal, that a refresh rate of the electronic device is a first refresh rate.

To ensure signal synchronization with the stylus, the electronic device may determine to display a picture at the first refresh rate. The first refresh rate is a largest refresh rate that is an integer multiple of the first frequency and that is supported by the electronic device. Specifically, in response to the handshake signal, the electronic device may adjust, if determining that a current refresh rate of the electronic device is not the first refresh rate, the refresh rate of the electronic device to the first refresh rate, or may not switch between refresh rates if determining that a current refresh rate of the electronic device is the first refresh rate. It should be understood that, the integer multiple may be 1, 2, 3, or the like.

For example, the electronic device supports 60 Hz, 90 Hz, and 120 Hz, and the electronic device may learn, based on the handshake signal, that the first frequency of the stylus is 240 Hz, where 240 Hz is an integer multiple of 60 Hz or 120 Hz. If a refresh rate of the electronic device is 60 Hz or 90 Hz, the electronic device may adjust the refresh rate to 120 Hz, that is, the first refresh rate is 120 Hz. For example, the electronic device supports 60 Hz and 90 Hz, and the electronic device may learn, based on the handshake signal, that the first frequency of the stylus is 240 Hz. If a refresh rate of the electronic device is 90 Hz, the electronic device may adjust the refresh rate to 60 Hz, or if a refresh rate of the electronic device is 60 Hz, the electronic device may not adjust the refresh rate.

S504. The electronic device sends a response signal to the stylus through the second communication module.

The response signal indicates that the electronic device and the stylus perform the handshake successfully, and an objective of performing the handshake by the electronic device and the stylus is that the electronic device and the stylus may be aligned based on signals exchanged through the circuit path, that is, each of the electronic device and the stylus may receive a signal sent by a peer through the circuit path. The response signal includes refresh rates supported by the electronic device, such as 60 Hz, 90 Hz, and 120 Hz.

It should be noted that, if the electronic device does not support a refresh rate that is an integer multiple of the first frequency, the electronic device may not send the response signal to the stylus through the first communication module, and correspondingly the stylus has not received the response signal from the electronic device. Therefore, the stylus and the electronic device perform the handshake unsuccessfully. For example, if the electronic device support 90 Hz, and the electronic device may learn, based on the handshake signal, that the first frequency of the stylus is 240 Hz, the electronic device may not send the response signal to the stylus, indicating that the electronic device and the stylus perform the handshake unsuccessfully.

A process of performing interaction through a circuit path after the stylus and the electronic device perform a handshake is described below. Before this, the structure of the electronic device is first described:

FIG. 6A is a block diagram of a structure of an electronic device to which an embodiment of this application is applicable. Referring to FIG. 6A, a software system of the electronic device may use a layered architecture, an event-driven architecture, a microkernel architecture, a microservice architecture, or a cloud architecture. In this embodiment of this application, the software structure of the electronic device is illustrated by using an Android system with a layered architecture as an example. In the layered architecture, a software system of the electronic device is divided into several layers. Each layer has a clear role and function. Layers communicate with each other through a software interface.

In an embodiment, an Android system may be divided into four layers that are respectively an application (applications) layer, an application framework (application framework) layer, a kernel (kernel) layer, and a hardware layer. In an embodiment, the Android system may further include an Android runtime (Android runtime) and a system library, which are not shown in FIG. 6A. The layering of the software structure of the electronic device is not limited in this embodiment of this application.

The application layer may include application packages. For example, the application layer may include: application packages such as camera, photos, calendar, phone, maps, navigation, Bluetooth, music, videos, and SMS messages (in FIG. 6A, an application is used as an example for description). Referring to FIG. 6A, the application layer may include: an application.

The application framework layer may provide an application programming interface (application programming interface, API) and a programming framework for applications in the application layer. In an embodiment, referring to FIG. 6A, the application framework layer may further include: a touch message dispatch processing module, a touch message processing module, a frame rate control module, a window manager service (window manager service, WMS) module, a window switching module, and a scenario identification module. Reference may be made to related descriptions in FIG. 6B. In an embodiment, the application framework layer may further include a Bluetooth message processing module. It should be understood that, the window switching module is understood as an activity manager service module (activity manager service, AMS). In both the following embodiments and FIG. 6A, the AMS is used as an example for description.

The kernel layer includes at least a hardware driver, configured to drive hardware to work. For example, the kernel layer includes a touch driver, a display driver, and the like. This is not limited in this embodiment of this application. In an embodiment, when the electronic device supports Bluetooth, the kernel layer of the electronic device may further include a Bluetooth driver.

The hardware layer includes hardware devices such as a touch panel, a display panel, and Bluetooth. The touch driver may drive the touch panel to work, the display driver may drive the display panel to work, and the Bluetooth driver may drive Bluetooth to work. The touch panel includes a TP sensor and a touch IC chip, and the display panel includes a display screen and a display IC chip.

In an embodiment, as shown in FIG. 6A, the touch IC chip and the display IC chip may be integrated, and be represented by the first IC chip in FIG. 6A. The first IC chip is connected to each of the touch driver, the display driver, the TP sensor, and the display screen. The first IC chip is configured to execute an action of the foregoing touch IC chip, and execute an action of the foregoing display IC chip. Specifically, the first IC chip is configured to obtain, in a process of controlling the display screen to display a frame of picture, touch information collected by the TP sensor. Reference may be made to related descriptions in FIG. 6B.

After performing the handshake successfully, the electronic device and the stylus may exchange signals through a circuit path, so that the stylus may perform an operation and writing on the screen of the electronic device. A process of exchanging signals through a circuit path by the electronic device and the stylus is described below using an example in which the first refresh rate of the electronic device is 60 Hz and the first frequency of the stylus is 240 Hz. Referring to FIG. 6B, a process in which an electronic device and a stylus interact through a circuit path may include:

S601. A first IC chip sends, in a VBP of controlling a display screen to display a first frame of picture, a wake-up signal through a TP sensor.

In this embodiment of this application, after the electronic device and the stylus perform a handshake successfully, when the first IC chip controls the display screen to display each frame of picture, to ensure signal synchronization between the electronic device and the stylus, the first IC chip may send, in a VBP of displaying each frame of picture, a wake-up signal through the TP sensor. Correspondingly, after the stylus and the electronic device perform the handshake successfully, the stylus may intercept the wake-up signal from the electronic device. It should be understood that, after the electronic device and the stylus perform the handshake successfully, every first preset duration, the electronic device sends a first wake-up signal. Correspondingly, after the stylus and the electronic device perform the handshake successfully, the stylus may intercept the wake-up signal every first preset duration, where the first preset duration is preset.

Using the first frame of picture as an example, in the VBP of displaying the first frame of picture, the first IC chip sends the wake-up signal through the TP sensor.

Figure 7:
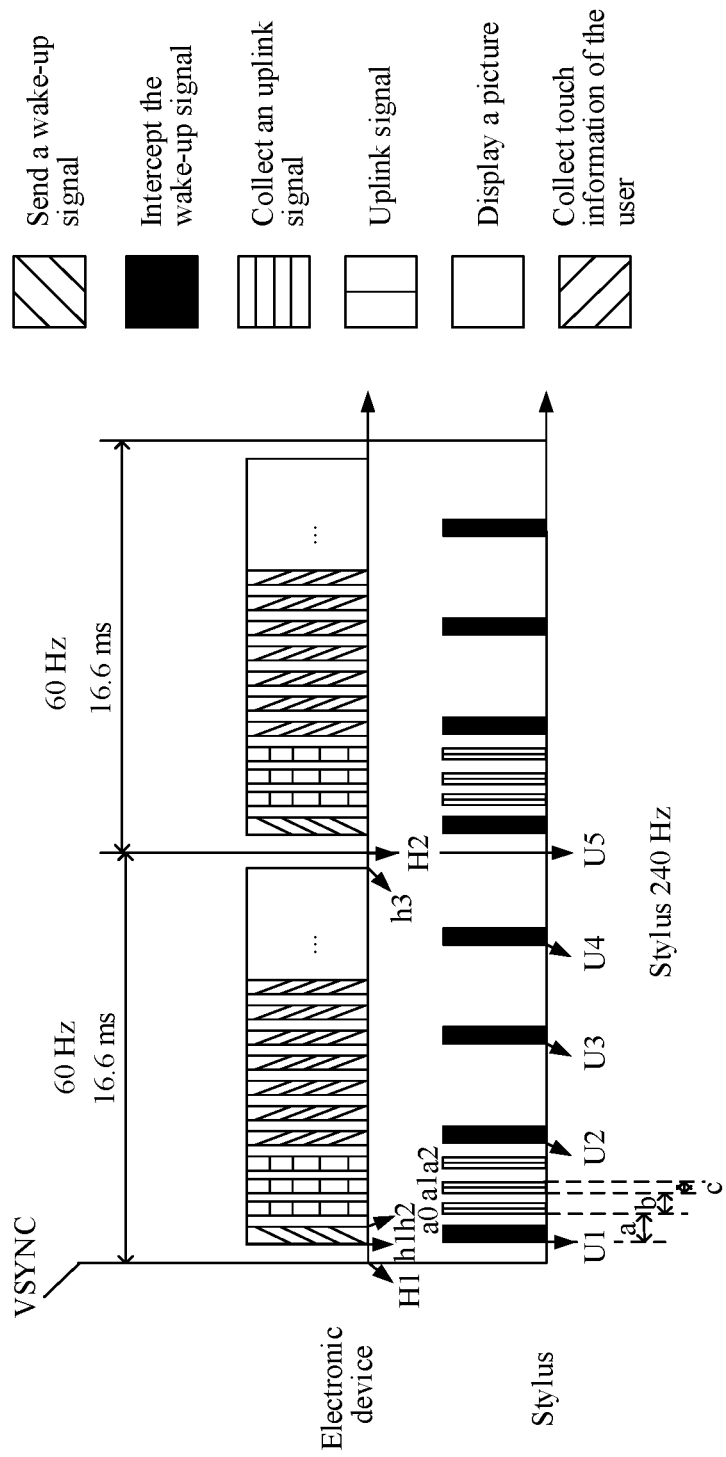
FIG. 7 is a sequence diagram of interaction between an electronic device and a stylus according to an embodiment of this application.

FIG. 7 is a sequence diagram of interaction between an electronic device and a stylus according to an embodiment of this application. A description is made in FIG. 7 using an example in which a refresh rate of the electronic device is 60 Hz and a first frequency of the stylus is 240 Hz, and in FIG. 7, H indicates a moment at which a first IC chip controls a display screen to display each frame of picture. For example, H1 indicates a moment at which the first IC chip controls the display screen to display a first frame of picture (or an nth frame of picture), and may also be understood as a moment at which the first IC chip outputs a VSYNC of the first frame, and H2 indicates a moment at which the first IC chip controls the display screen to display a second frame of picture (or an $(n+1)^{th}$ frame of picture), and may also be understood as a moment at which the first IC chip outputs a VSYNC of the second frame. In FIG. 7, U indicates a moment at which the stylus intercepts a wake-up signal. For example, U1 indicates a moment at which the stylus intercepts a wake-up signal, U2 indicates a moment at which the stylus intercepts a wake-up signal, and the rest can be deduced by analogy. It should be understood that, because the refresh rate of the electronic device is 60 Hz, and the first frequency of the stylus is 240 Hz, the stylus may execute intercepting a wake-up signal four times in 16.6 ms for displaying the first frame of picture.

Referring to FIG. 7, when the first IC chip controls the display screen to display each frame of picture, preset duration may be reserved in VBP of V-Porch, and is used to send a wake-up signal to the stylus. At the moment H1, the first IC chip outputs a VSYNC, duration of the VSYNC is from the moment H1 to the moment h1, and the moment h1 to the moment h2 are a vertical back porch. At the moment h2, the first IC chip controls organic light-emitting diodes in a first pixel in an $(n1+1)^{th}$ row in the first frame of picture to emit no light. It should be understood that, between the moment h2 and the moment h3, the first IC chip controls the display screen to display the first frame of picture, and intercepts an uplink signal from the stylus, and the moment h3 to the moment H2 are a vertical front porch.

S602. The stylus intercepts the wake-up signal.

After the stylus and the electronic device perform the handshake successfully, the stylus intercepts the wake-up signal from the electronic device. After intercepting the wake-up signal, the stylus may send the uplink signal through a first electrode.

It should be noted that, a longer distance between the stylus and the screen indicates smaller strength of the signal received from the first IC chip, and the stylus may intercept the signal from the first IC chip when a distance between the stylus and a screen of the electronic device is less than or equal to a preset distance. For example, the preset distance may be 20 mm, as shown in FIG. 4B.

S603. The stylus sends, in response to intercepting the wake-up signal, an uplink signal through a first electrode.

Referring to FIG. 7, because the refresh rate of the electronic device is 60 Hz, and the first frequency of the stylus is 240 Hz, the stylus may execute an action of intercepting a wake-up signal four times in 16.6 ms for displaying the first frame of picture. It should be understood that, if the stylus intercepts the wake-up signal from the first IC chip, the stylus may send, in response to the wake-up signal, the uplink signal through the first electrode. If the stylus intercepts the wake-up signal from the first IC chip at the moment U1, the stylus may send the uplink signal through the first electrode.

The uplink signal may include: an inclination angle of the stylus, and/or a pressure value of the tip of the stylus. Referring to FIG. 7, the uplink signal may be a square wave signal. In an embodiment, for example, a square wave a0 and a square wave a1 may carry information indicating the inclination angle of the stylus, and a square wave a3 carries information indicating the pressure value of the tip of the stylus. Information carried in the uplink signal, and how square waves carry information are not limited in this embodiment of this application.

It should be understood that, the stylus may store a configuration file, and the configuration file includes values of a, b, c, and N. Referring to FIG. 7, a indicates duration between intercepting the wake-up signal and sending the uplink signal (for example, the square wave a0) by the stylus. b indicates duration between two adjacent square wave signals. c indicates duration occupied by one square wave signal. N indicates a quantity of square waves in one period in which the stylus sends the uplink signal. In this way, during working, the stylus may determine, based on the configuration file, how to send the uplink signal. In addition, it should be understood that, after the stylus and the electronic device perform the handshake successfully, the stylus may intercept a wake-up signal every first preset duration, and the stylus may determine, based on the first frequency, to intercept the wake-up signal again in second preset duration after sending the uplink signal, where the first preset duration and the second preset duration are preconfigured.

If the stylus has not intercepted the wake-up signal from the first IC chip, the stylus does not send the uplink signal through the first electrode. For example, at the moment U2, the stylus has not intercepted the wake-up signal, so that the stylus does not send the uplink signal through the first electrode. At a moment U3 and a moment U4, the stylus has not intercepted the wake-up signal either, so that the stylus does not send the uplink signal through the first electrode either. However, at a moment U5, the stylus may intercept the wake-up signal from the first IC chip, so that the stylus may send the uplink signal through the first electrode.

It should be understood that, the uplink signal in this embodiment of this application is based on the stylus. It may be thought that based on the electronic device, a signal from the stylus may be referred to as a downlink signal, and a signal sent by the electronic device is an uplink signal. In the following embodiments, a description is made using an example in which a signal sent by the stylus is an uplink signal and a signal sent by the electronic device is a downlink signal.

S604. The first IC chip intercepts the uplink signal from the stylus.

After sending the wake-up signal through the TP sensor, the first IC chip may intercept the uplink signal from the stylus. It should be understood that, because the first IC chip not only needs to control the display screen to display the first frame of picture, but also needs to intercept the uplink signal from the stylus, the first IC chip may intercept the uplink signal at the moment at which the stylus sends the uplink signal.

In an embodiment, the electronic device may store identifiers of different styluses and a configuration file corresponding to an identifier of each stylus, and the configuration file includes values of a, b, c, and N. It should be understood that, configuration files of the different styluses may be different. In this embodiment, in S502, the handshake signal may include an identifier of the stylus such as a model of the stylus, and the first IC chip may determine, based on the identifier of the stylus, the configuration file of the stylus, then determine, based on the configuration file of the stylus, how the stylus sends the uplink signal, and then may intercept the uplink signal from the stylus at the moment at which the stylus sends the uplink signal.

In an embodiment, in S502, the handshake signal may include the configuration file, and the first IC chip may obtain the configuration file through the second communication module, and then intercept, based on the configuration file, the uplink signal from the stylus at the moment at which the stylus sends the uplink signal.

It should be understood that, the first IC chip may start to intercept the uplink signal after sending the wake-up signal, and S604 and "S602 and S603" are not performed in a sequential order.

S605. The first IC chip obtains first information of the stylus based on the uplink signal.

The first IC chip may parse the intercepted uplink signal, to obtain the first information such as the inclination angle of the stylus and/or the pressure value of the tip of the stylus. In addition, based on related descriptions in FIG. 4C, the first IC chip may determine, based on a capacitance sampling value change amount of the TP sensor, a location of the stylus on the screen, the location may be, for example, coordinates (X, Y) of the stylus on the screen, and the coordinates of the stylus on the screen may be referred to as second information of the stylus.

In this way, the first IC chip may obtain information about the stylus, and the information about the stylus may include the first information and the second information. In this way, the first IC chip may adjust, based on the pressure value of the tip of the stylus, a crudeness or fineness effect of handwriting drawn by the stylus. The first IC chip may adjust, based on the inclination angle of the stylus, a stroke effect of handwriting drawn by the stylus, and the like.

In the period of displaying the first frame of picture, the first IC chip not only may intercept the uplink signal from the stylus, but also may intercept the touch information from the user.

Referring to FIG. 7, in 16.6 ms, the first IC chip may further intercept the touch information from the user after intercepting the uplink signal from the stylus. For example, after intercepting the square wave signal in the uplink signal, the first IC chip may intercept the touch information from the user once every b, and the touch information from the user is not described in detail in this embodiment of this application.

It should be understood that, a refresh rate of the electronic device is, for example, 60 Hz, and if the first IC chip intercepts touch information twice in a period of displaying a frame of picture, a touch sampling rate of the electronic device is 120 Hz, and the touch sampling rate of the electronic device is related to the refresh rate of the electronic device, that is, the intercepting the touch information by the first IC chip is related to the refresh rate of the electronic device.

Based on FIG. 7, because the first frequency of the stylus is an integer multiple of a refresh rate at which the first IC chip displays a picture, after the stylus and the electronic device perform a handshake, the stylus may intercept the wake-up signal from the first IC chip, the first IC chip may receive the uplink signal from the stylus, and the electronic device and the stylus may keep signal synchronization.

However, the refresh rate of the electronic device may be changed based on an application scenario of the electronic device. For example, the electronic device supports refresh rates 60 Hz and 90 Hz. In a scenario with a high picture fluency requirement such as an application market or an Email application, the electronic device may adjust the refresh rate to 90 Hz, to satisfy a requirement of the user for picture fluency. In a scenario with a low picture fluency requirement such as a navigation application, the electronic device may adjust the refresh rate to 60 Hz, to reduce power consumption of the electronic device.

Figure 8:
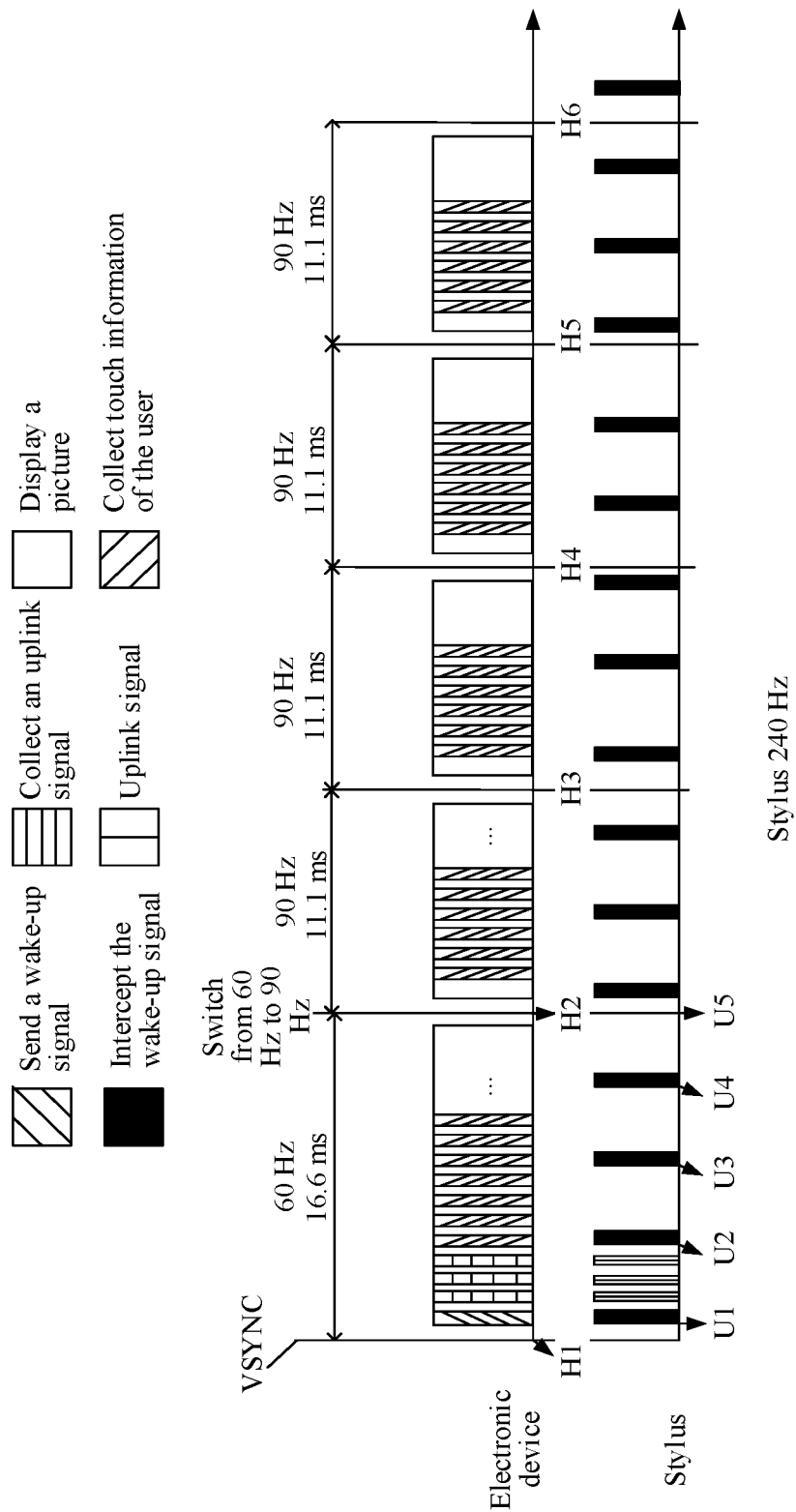
FIG. 8 is another sequence diagram of interaction between an electronic device and a stylus according to an embodiment of this application.

In an embodiment, it is assumed that the electronic device may support a plurality of refresh rates such as 60 Hz, 90 Hz, and 120 Hz. A description is made herein using an example in which the first frequency of the stylus is 240 Hz. Referring to FIG. 8, between a moment H1 and a moment H2, a first IC chip displays a first frame of picture at 60 Hz. Reference may be made to related descriptions in FIG. 7. If an electronic device switches the refresh rate from 60 Hz to 90 Hz in a VFP of the first frame of picture, because 240 Hz is not an integer multiple of 90 Hz, the first IC chip may not send a wake-up signal in a VBP of a second frame of picture. Correspondingly, a stylus has not intercepted the wake-up signal, so that the stylus does not send an uplink signal.

Similarly, between a moment H3 and a moment H6, because the first IC chip displays a picture at 90 Hz, and the first IC chip has not sent the wake-up signal, the stylus has not intercepted the wake-up signal, and does not send the uplink signal. Therefore, within this duration from the moment H3 to the moment H6, the user holds the stylus to write on the screen, but the screen does not display handwriting of writing of the stylus. that is to say, from the moment H3 to the moment H6, the stylus slides and taps on the screen, but is not responded to by the electronic device.

In the scenario shown in FIG. 8, after the electronic device switches the refresh rate, if the first frequency is a non-integer multiple of a refresh rate occurring after the switching, a handwriting intermittence phenomenon of the stylus is caused when the user uses the stylus to write on the screen. The handwriting intermittence phenomenon may be understood as follows: When the stylus draws handwriting on the screen of the electronic device, the handwriting intermittently occurs, and the user feels that the stylus intermittently works.

It may be learned based on FIG. 8 that, when the user uses the stylus to interact with the electronic device, the first frequency of the stylus needs to be an integer multiple of the refresh rate of the electronic device; otherwise, the handwriting intermittence phenomenon occurs. Therefore, in an actual scenario, if the electronic device switches the refresh rate of the electronic device based on the operation by the user, the first frequency is a non-integer multiple of a refresh rate occurring after the switching. If the user reuses the stylus, the electronic device needs to adjust the refresh rate to avoid the handwriting intermittence phenomenon, where the first frequency is an integer multiple of a refresh rate occurring after the adjustment.

Figure 9:
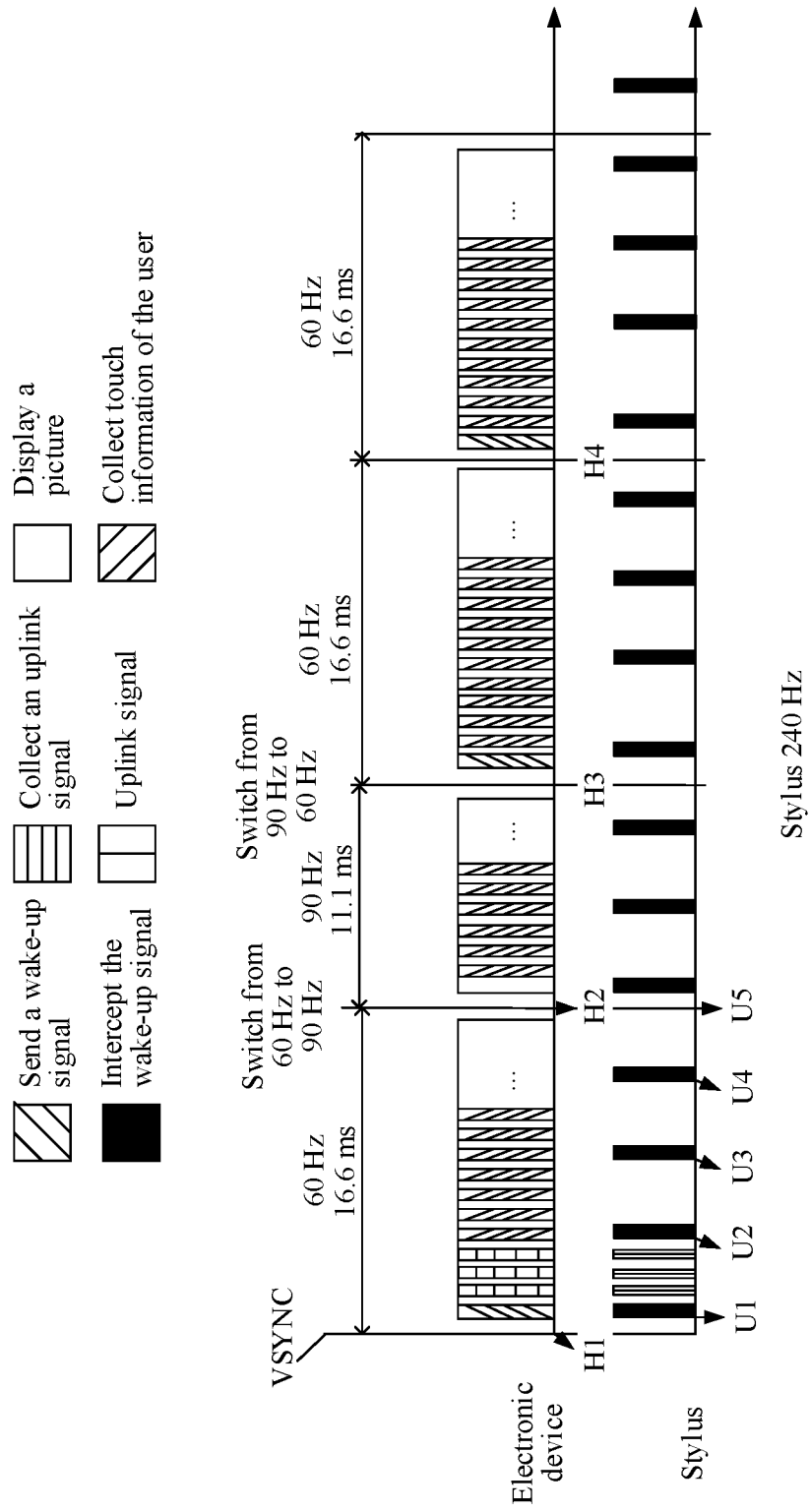
FIG. 9 is another sequence diagram of interaction between an electronic device and a stylus according to an embodiment of this application.

However, a moment at which the electronic device switches back to a refresh rate having a multiple relationship with the first frequency is crucial. Referring to FIG. 9, if the electronic device switches the refresh rate from 90 Hz to 60 Hz at the moment H3, or the moment H4, or the moment H5 (in FIG. 9, the moment H3 is used as an example), the stylus cannot intercept the wake-up signal from the first IC chip, and cannot send the uplink signal, to cause the user to consider that the stylus is damaged.

In this way, it may be learned with reference to FIG. 8 and FIG. 9 that, the first frequency of the stylus is an integer multiple of the first refresh rate, and after the electronic device switches from the first refresh rate to the second refresh rate, if it is detected that the user is using the stylus (for example, a distance between the stylus and the screen is less than the preset distance), the electronic device needs to quickly switch to the first refresh rate, to resolve a problem of signal asynchrony between the electronic device and the stylus. However, a moment at which the electronic device switches from the second refresh rate to the first refresh rate again is very important, and directly affects whether the stylus can intercept the wake-up signal, so that the electronic device urgently needs a refresh rate switching method, to resolve the problem.

For example, in a scenario, the electronic device supports 60 Hz, 90 Hz, and 120 Hz, and the first frequency of the stylus is 240 Hz. After the electronic device and the stylus are in a Bluetooth connection, if the refresh rate of the electronic device is 60 Hz, the electronic device can keep signal synchronization with the stylus. After the user has used the stylus for a period of time, where the period of time is, for example, the time before the moment H2 in FIG. 8, the user puts the stylus aside, and operates the screen with a finger. The user operates the touch screen with a finger, so that the electronic device can switch the refresh rate from 60 Hz to 90 Hz. After the user has operated the screen with a finger for a period of time, if the user holds the stylus to operate the screen, to avoid the handwriting intermittence phenomenon shown in FIG. 8 that occurs because the refresh rate of the electronic device is different from the frequency with which the stylus sends the uplink signal, the electronic device needs to switch from 90 Hz to 60 Hz (or 120 Hz) as soon as possible, to keep synchronization with the stylus.

As shown in FIG. 9, the moment at which the electronic device switches from 90 Hz to 60 Hz (or 120 Hz) is very important, and if the moment at which the electronic device switches the refresh rate is not proper, the stylus cannot intercept the wake-up signal from the first IC chip.

Based on the problem described above, an embodiment of this application provides a refresh rate switching method, where after an electronic device switches a refresh rate from a first refresh rate to a second refresh rate, the electronic device may record a quantity of frames of pictures displayed by the electronic device at the second refresh rate, and determine, based on the recorded quantity of frames, a moment of switching from the second refresh rate to the first refresh rate, so that a stylus may intercept a wake-up signal from the electronic device, to ensure signal synchronization between the electronic device and the stylus.

Figure 10A:
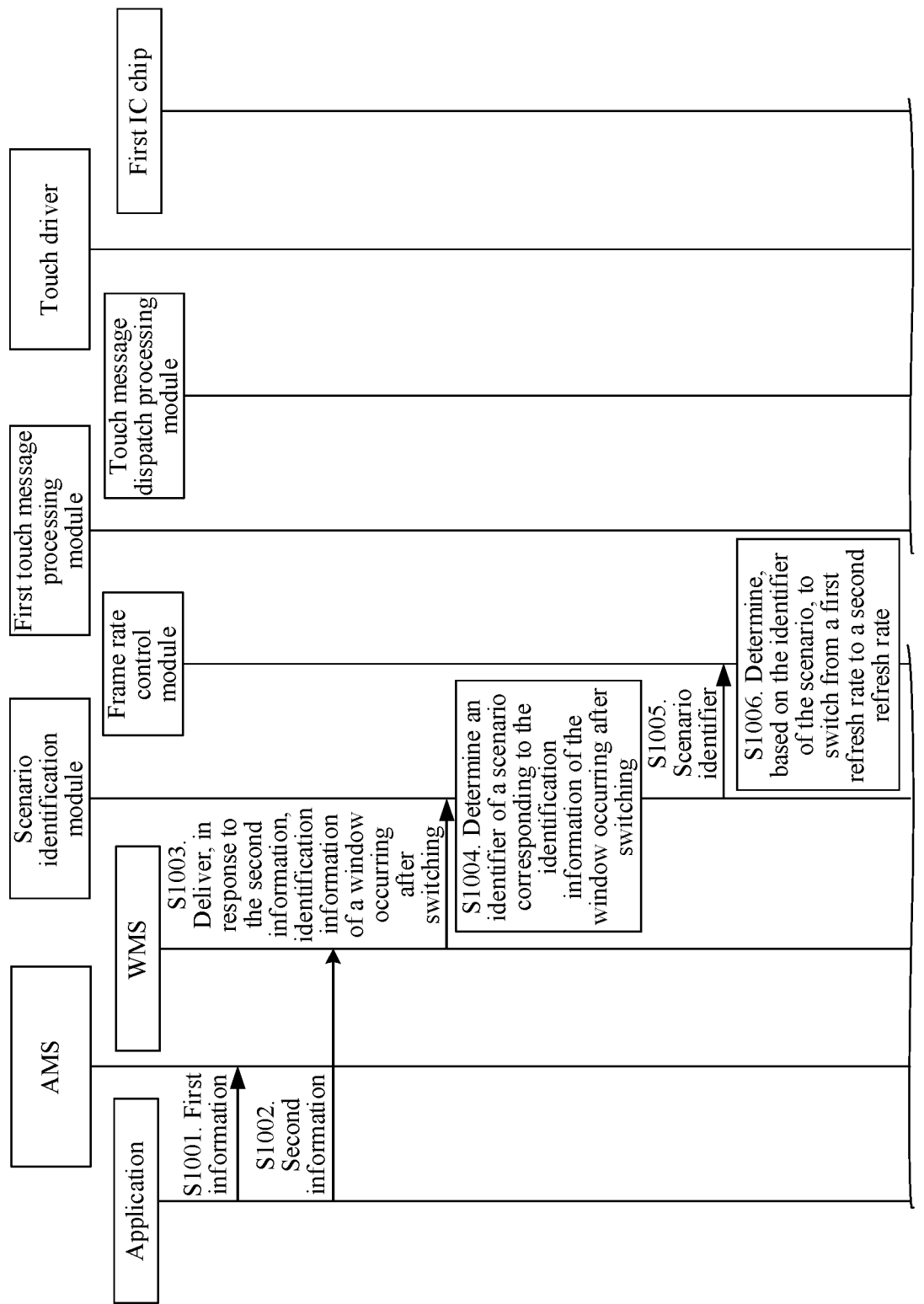
Figure 10C:
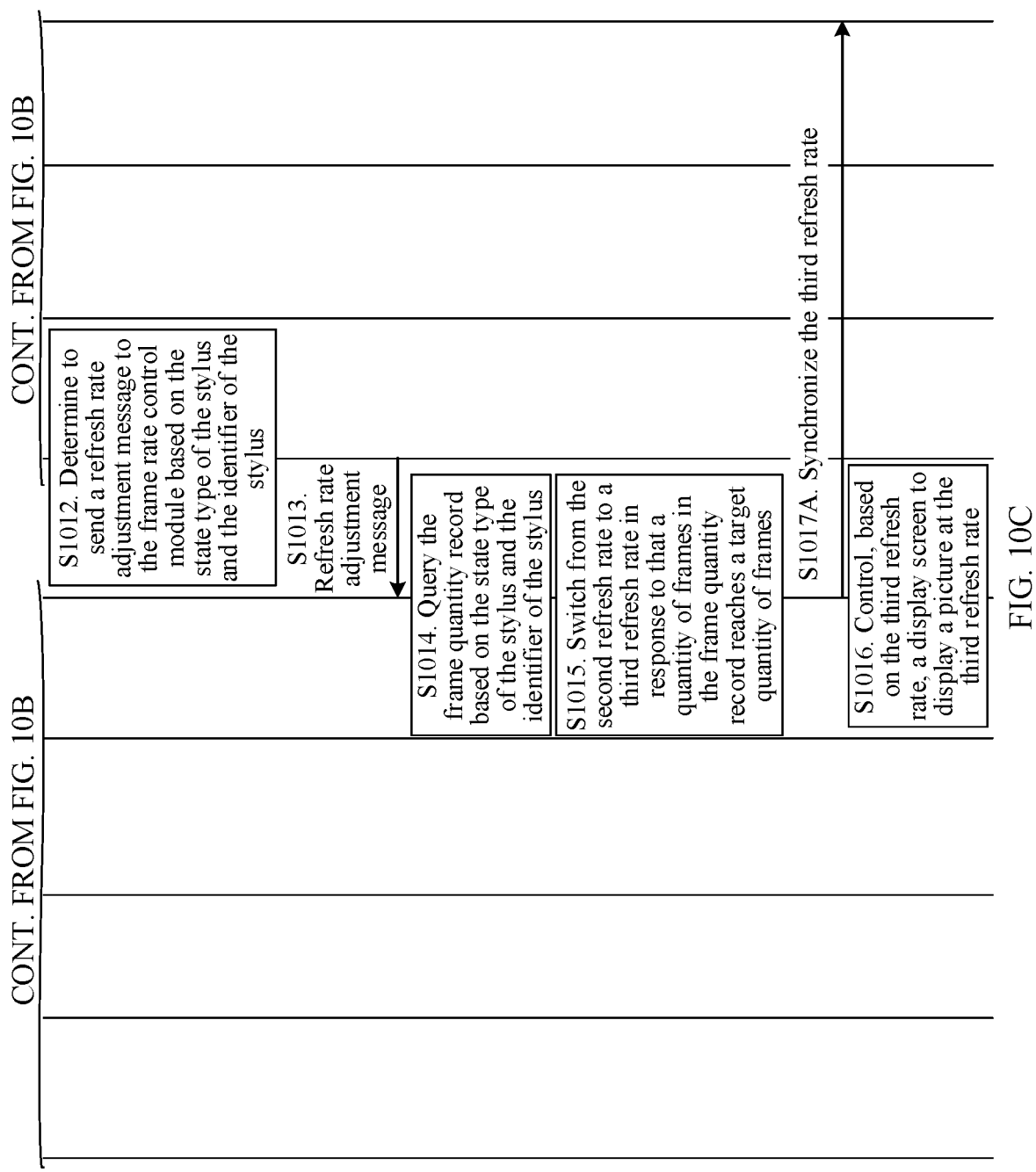

FIG. 10A, FIG. 10B, and FIG. 10C are schematic flowcharts of an embodiment of a refresh rate switching method according to an embodiment of this application. Referring to FIG. 10A, FIG. 10B, and FIG. 10C, the refresh rate switching method provided in this embodiment of this application may include:

S1001. An application sends first information to an AMS in response to a window switching operation by a user.

A window may be understood as an activity displayed by an electronic device. Switching a window may be understood as switching an activity displayed by the electronic device. For example, switching a window may be switching from a first activity in a same application to a second activity, and therefore an application to which the second activity belongs sends the first information to the AMS. Alternatively, switching a window may be switching from an activity of a first application to an activity of a second application, and therefore the second application may send the first information to the AMS.

The application in S1001 is an application to which a window occurring after the switching belongs.

When starting, an application may register with the AMS, where the AMS is configured to manage an activity of the application. The application may send the first information to the AMS in response to the window switching operation by the user. The first information includes: an identifier of an application to which a window occurring after switching belongs and an identifier of an activity. The identifier of the application may be a package name of the application. It should be understood that, when downloading the application, the electronic device downloads an installation package of the application, and the package name of the application is a name of the installation package of the application. An identifier of an activity may be a name, a number, or an identity document (identity document, ID) of the activity (activity). This is not limited in the embodiments of this application.

The AMS switches between windows based on the identifier of the application and the identifier of the activity. The AMS invokes a member function startActivityLocked of an ActivityStack type, to start an Activity component of a window occurring after switching, and then the AMS may invoke other member functions, to instruct an Activity component of a window occurring before switching to enter a paused Paused state. After the Activity component of the window occurring before switching enters the Paused state, if the AMS detects that the Activity component of the window occurring after switching has started, the AMS may set a state of the Activity component of the window occurring after switching to a resumed Resumed state.

For example, after the electronic device is connected to the stylus, the first refresh rate of the electronic device is 60 Hz, the first frequency with which the stylus sends the uplink signal is 240 Hz, and the user uses the stylus and then puts the stylus aside. Referring to a in FIG. 11, an electronic device displays a music playback application, and a user uses a finger to exit an activity of the music playback application, so that the electronic device switches to display a desktop, as shown in b in FIG. 11. In this way, a window switching module may switch from a window of "music playback application" to a window of "desktop", and the "desktop" application may send the first information to the AMS.

S1002. The application sends second information to a WMS.

The second information includes: a location of a window occurring after switching, a display sequence, sizes, and locations of elements in the window, and a switching animation. The location of the window is a location of the window on the display screen of the electronic device, and the elements in the window include but are not limited to: a text, a picture, a box, and the like displayed in the window. The switching animation is used to indicate a switching effect occurring when the window occurring after switching is displayed.

It should be noted that, when starting, the application may further request a touch information interception right from a touch message dispatch processing module through the WMS or the AMS, where the touch information interception right may be understood as follows: The request touch message dispatch processing module dispatches obtained touch information to a touch message processing module corresponding to the application, so that the application may obtain the touch information, and then execute a corresponding operation based on the touch information. For details, reference may be made to related descriptions in S1011 to S1013. It should be understood that, in FIG. 6A, a step in which the "application" requests the touch information interception right from the touch message dispatch processing module through the WMS or the AMS is not shown.

S1003. The WMS delivers, in response to the second information, identification information of a window occurring after switching to a scenario identification module.

The WMS is configured to manage a window, and the WMS may store information about all windows in the terminal device. In an embodiment, a root window container (root window container) in the WMS stores information about a window.

The information about the window may include states of the window. The states of the window may include: a visible (visible) state, an invisible (invisible) state, a focus window (which may be indicated with yes), and a non-focus window (which may be indicated with no). The visible state or invisible state is specific to the user, the visible state indicates that the user can see the window, and the invisible state indicates that the user cannot see the window. The focus window refers to a window that the electronic device is displaying, and the non-focus window may include a window of an application running at the background.

The information about the window may further include: an application to which the window belongs, a window identifier, and information about elements in the window. The application to which the window belongs may be indicate with an identifier of the application, and the identifier of the application to which the window belongs may be but is not limited to: a name of the application or a name of an installation package of the application. The window identifier may be a display ID of the window. The elements in the window include but are not limited to: a text, a picture, a box, and the like displayed in the window. The information about the elements in the window may include: locations of the elements in the window.

The WMS may determine, in response to the second information, that window switching occurs. In an aspect, the WMS may set, based on the second information, a switching animation for a window occurring after switching, and set the window occurring after switching to the visible state, so that the user may see the window occurring after switching on the electronic device. This part is not described in detail in this embodiment of this application. It should be understood that, the window occurring after switching may be understood as a focus window. In another aspect, the WMS may deliver, in response to the second information, identification information of the window occurring after switching to the scenario identification module.

In an embodiment, the identification information of the window occurring after switching may include: an identifier of an application to which the window occurring after switching belongs, such as a package name of the application. In an embodiment, the identification information of the window occurring after switching may further include: a window identifier of the window occurring after switching. In the following embodiments, a description is made using an example in which the identification information of the window occurring after switching includes the package name of the application. In an embodiment, the identification information of the window occurring after switching may further include: an identifier of a list control listview, where the identifier of the list control indicates that the activity includes the list control. It should be understood that, when the window occurring after switching includes the list control, the identification information of the window occurring after switching includes the identifier of the list control; or when the identification information of the window occurring after switching does not include the list control, the identification information of the window occurring after switching does not include the identifier of the list control.

Figure 11:
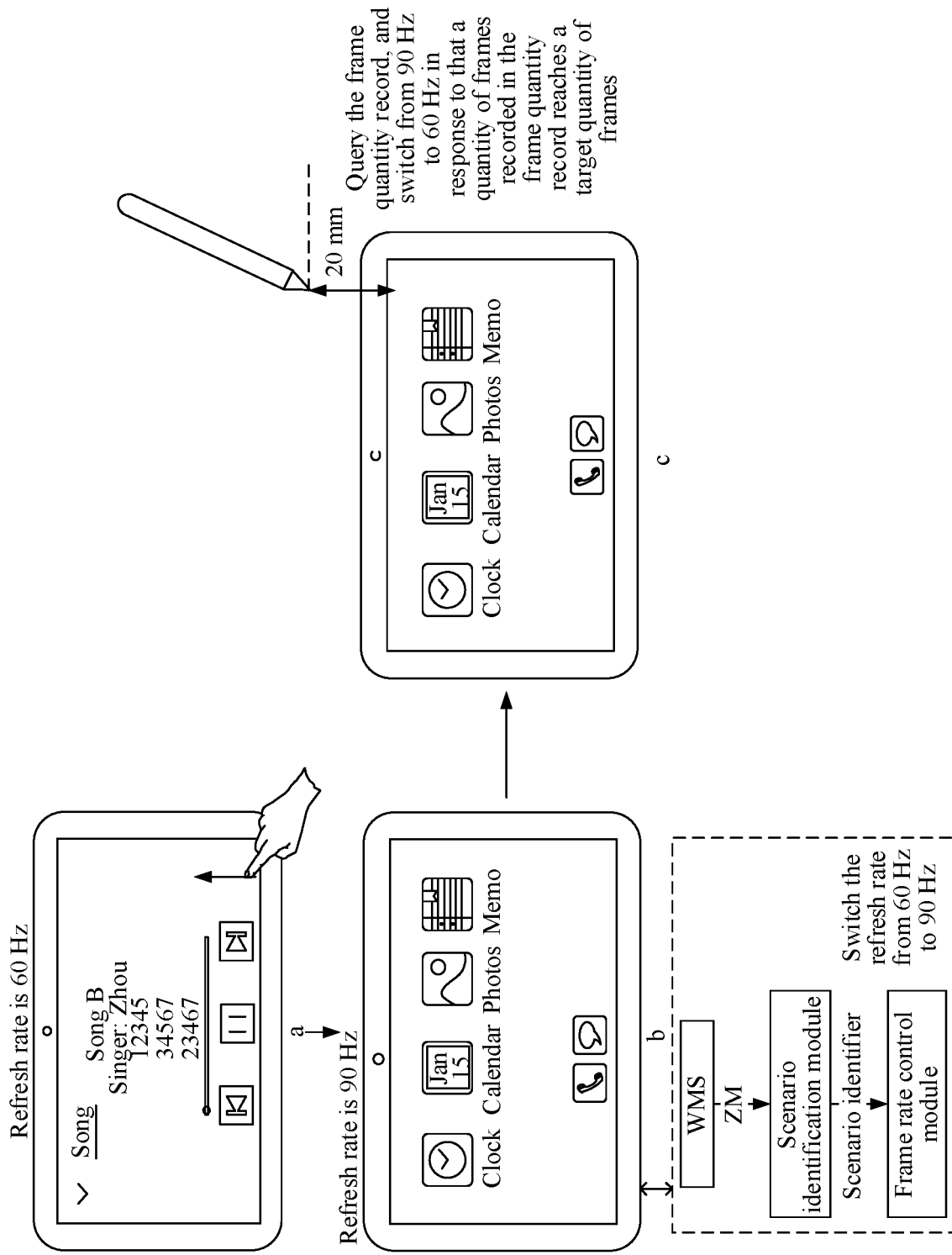
FIG. 11 is a schematic diagram of switching a refresh rate by an electronic device according to an embodiment of this application.

Referring to b in FIG. 11, the electronic device switches from a window of "audio playback application" to a window of "desktop", the WMS may send, in response to the second information, a package name of "desktop" to which the window occurring after switching belongs, such as "ZM" to the scenario identification module, and the form of the identification information of the window is not limited in this embodiment of this application.

S1004. The scenario identification module determines, in response to receiving the identification information of the window occurring after switching, an identifier of a scenario corresponding to the identification information of the window occurring after switching.

The identifier of the scenario may be a number or a scenario ID of the scenario.

In an embodiment, a package name of an application and a scenario category have a mapping relationship, and a scenario category and a scenario identifier have a mapping relationship, so that the scenario identification module may determine an identifier of a scenario based on a package name of an application in identification information of a window occurring after switching. For example, as shown in Table 1, for a Taobao application, the scenario identification module may determine, based on a package name of the Taobao application in identification information of a window occurring after switching, that a scenario category is a shopping category, and a scenario identifier corresponding to the shopping category is 14.

In an embodiment, a package name of an application, an identifier of an activity, and an identifier of a scenario have a mapping relationship, so that the scenario identification module may determine an identifier of a scenario based on a package name of an application and an identifier of an activity in identification information of a window occurring after switching. For example, as shown in Table 1, for a first application, the scenario identification module may determine, based on a package name (com.tencent.mm) of the first application and an identifier of an activity (a head activity com.xxx.mm.ui.LauncherUI of the first application) in identification information of a window occurring after switching, that a scenario identifier is 101.

In an embodiment, a package name of an application and an identifier of a scenario have a mapping relationship, so that the scenario identification module may determine an identifier of a scenario based on a package name of an application in identification information of a window occurring after switching. For example, as shown in Table 1, for photos, the scenario identification module may determine, based on a package name (com.xxx.photos) of the photos in identification information of a window occurring after switching, that a scenario identifier is 111.

In an embodiment, for an application including a list control (listview), an activity including the list control and an activity not including the list control of the same application correspond to different scenario identifiers. For example, as shown in Table 1, for a Baidu browser application, the scenario identification module may determine, based on a package name of the Baidu browser application in identification information of a window occurring after switching, that a scenario category is a browser category, and the identification information of the window occurring after switching includes an identifier of a list control, so that the scenario identification module may determine that a scenario identifier is 19. It should be understood that, when the identification information of the window occurring after switching includes an identifier of a list control, the scenario identification module may determine that a scenario identifier is 18. It should be understood that, an instant messaging category in this embodiment of this application may be understood as an instant messaging application.

TABLE 1

| Scenario category | Application package name | Activity name | Control | Scenario identifier | Refresh rate (fps) |
|---|---|---|---|---|---|
| Instant messaging | Phone/Contact | — | — | 0 | 120 |
| Shopping | Taobao/Amazon/JD | — | — | 14 | 120 |
| Browser | Google Chrome | — | — | 18 | 60 |
|  | Baidu browser application | — | List control listview | 19 | 120 |
| Community forum | Forum application | — | — | 20 | 120 |
| News | News application | — | — | 26 | 120 |
| Application market | Google store | — | — | 31 | 120 |
| Life helper | Calculator | — | — | 32 | 60 |
| — | Photos com.xxx.photos | — | — | 111 | 90 |
| — | Memo com.xxx.notepad | — | — | 112 | 120 |
| First application | com.xxx.mm | Head activity of the first application com.xxx.mm.ui.LauncherUI | — | 101 | 120 |
| First application | com.tencent.mm | QR code activity of the first application com.xxx.mm.plugin.setting.ui.setting.SelfQRCodeUI | — | 103 | 60 |
| First application | com.tencent.mm | Code scan activity of the first application com.xxx.mm.plugin.scanner.ui.BaseScanUI | — | 104 | 60 |
| First application | com.tencent.mm | Payment of the first application com.xxx.mm.plugin.offline.ui.WalletOfflineCoinPurseUI | — | 105 | 120 |

S1005. The scenario identification module sends the identifier of the scenario to the frame rate control module.

S1006. The frame rate control module determines, based on the identifier of the scenario, to switch from a first refresh rate to a second refresh rate.

It should be understood that, a refresh rate of the electronic device is related to a scenario. That is to say, different scenarios correspond to different refresh rates of the electronic device.

In an embodiment, a refresh rate and an identifier of a scenario have a mapping relationship, and the frame rate control module pre-stores the second mapping relationship. The frame rate control module may obtain, based on an identifier of a scenario and the mapping relationship, a refresh rate corresponding to the window occurring after switching. For example, a mapping relationship between a refresh rate and an identifier of a scenario may be shown in Table 1, and the frame rate control module may query Table 1, to obtain a refresh rate corresponding to the window occurring after switching.

In an embodiment, a mapping relationship between a refresh rate and an identifier of a scenario may be shown in Table 2, and the frame rate control module may obtain, based on Table 2, a refresh rate corresponding to the window occurring after switching.

TABLE 2

| | Scenario identifier | | | | | | | |
|---|---|---|---|---|---|---|---|---|
| | 0 | 14 | 18 | 19 | 20 | 26 | 31 | ... 105 |
| Refresh rate (fps) | 120 | 120 | 60 | 120 | 120 | 120 | 120 | 120 |

A refresh rate occurring before window switching is the first refresh rate. If the frame rate control module determines that a refresh rate occurring after window switching is also the first refresh rate, it is not necessary to adjust the refresh rate of the electronic device, and the frame rate control module may stop operating. This embodiment of this application does not focus on describing this. A refresh rate occurring before window switching is the first refresh rate. If the frame rate control module determines that a refresh rate occurring after window switching is the second refresh rate, and the first refresh rate is different from the second refresh rate, the frame rate control module determines that it is necessary to switch from the first refresh rate to the second refresh rate.

For example, in a in FIG. 11, the electronic device displays the activity of the music playback application, and the frame rate control module determines that the refresh rate is 60 Hz. The electronic device displays a desktop, and a refresh rate corresponding to the desktop is the second refresh rate 90 Hz. The frame rate control module may determine that the frame rate control module needs to switch the refresh rate of the electronic device from 60 Hz to 90 Hz, as shown in b in FIG. 11.

In an embodiment, for an identifier of a scenario including a list control, the frame rate control module may determine, based on whether a list sliding operation by the user is detected, whether to switch from the first refresh rate to the second refresh rate. If an identifier of a scenario received by the frame rate control module is 19, it indicates that the window occurring after switching includes the list control. Therefore, if the frame rate control module detects the list sliding operation by the user, it may be determined that the first refresh rate is switched to the second refresh rate; or if the frame rate control module has not detected the list sliding operation by the user, it may be determined that the first refresh rate is not switched.

It should be understood that, a manner in which the frame rate control module detects the list sliding operation by the user may be as follows: The first IC chip detects the touch information of the user through the TP sensor, and reports the touch information of the user to the application through the touch driver, the touch message dispatch processing module, the first touch message processing module, and the second touch message processing module. The application determines, in response to the touch information of the user, that a touch operation by the user is a list sliding operation, and may synchronize the list sliding operation to the frame rate control module. In this way, the frame rate control module may detect the list sliding operation by the user. It should be noted that, for a manner in which the application detects the list sliding operation by the user, reference may be made to descriptions of an existing detection manner.

Based on the foregoing descriptions, for an activity including a list control, S1001 to S1006 may be replaced with:

S1001a. An application sends second information to a WMS in response to a list sliding operation by a user, where the second information includes: a location of a window, a display sequence, sizes, and locations of elements in the window, and the like.

S1002a. The application synchronizes the list sliding operation by the user to a frame rate control module.

S1003a. The frame rate control module determines, in response to the list sliding operation by the user and based on identification information of the window, to switch from a first refresh rate to a second refresh rate.

It should be understood that, in this embodiment, because the window does not switch, the identification information of the window in S1003A is an identifier of an activity of the list sliding operation by the user and an identifier of the application to which the activity belongs.

1007. The frame rate control module switches from the first refresh rate to the second refresh rate, and records a quantity of frames of pictures displayed at the second refresh rate, to obtain a frame quantity record.

In this embodiment of this application, after determining, based on the identifier of the scenario, to switch from the first refresh rate to the second refresh rate, the frame rate control module needs to determine, based on whether the information about the stylus reported from the touch message processing module is received, whether to switch from the first refresh rate to the second refresh rate. After determining to switch from the first refresh rate to the second refresh rate, if the frame rate control module can still receive the information about the stylus reported from the touch message processing module, the frame rate control module does not switch from the first refresh rate to the second refresh rate to keep signal synchronization between the electronic device and the stylus. After determining to switch from the first refresh rate to the second refresh rate, if the frame rate control module has not received the information about the stylus reported from the touch message processing module, the frame rate control module may switch from the first refresh rate to the second refresh rate.

It should be understood that, a scenario to which an embodiment of this application is applicable is as follows: Because the user does not use the stylus, the frame rate control module has not received the information about the stylus reported from the touch message processing module after the frame rate control module determines to switch from the first refresh rate to the second refresh rate. Therefore, the frame rate control module may switch from the first refresh rate to the second refresh rate.

That the frame rate control module switches from the first refresh rate to the second refresh rate may be specifically understood as that the frame rate control module controls, based on the second refresh rate, the first IC chip to control the display screen to display a picture at the second refresh rate. That the frame rate control module controls the display screen in the electronic device to display a picture at the second refresh rate may be specifically as follows:

The frame rate control module may control, based on the second refresh rate, an application drawing rendering module to draw elements in a frame of picture every 11.1 ms, where the elements may include but are not limited to: a text, an icon, an image, and the like. In an embodiment, the application drawing rendering module may be a graphics processing unit (graphics processing unit, GPU) in the electronic device. The frame rate control module may control, according to the second refresh rate, the application drawing rendering module to compose elements in a frame of picture drawn by the application drawing rendering module. After a layer composition module composes a frame of picture, the frame of picture may be buffered in a frame buffer (frame buffer) (not shown in FIG. 9). The frame rate control module may control, according to the second refresh rate, the display driver to obtain a frame of picture from the frame buffer every 11.1 ms, and drive the first IC chip to control the display screen to display the frame of picture. In this way, the frame rate control module may control the display screen to display a picture at the second refresh rate. It should be understood that, for detailed descriptions of the application drawing rendering module, the layer composition module, and the display driver, reference may be made to related descriptions in an existing technology.

After switching from the first refresh rate to the second refresh rate, the frame rate control module may record a quantity of frames of pictures displayed at the second refresh rate, to obtain a frame quantity record. In an embodiment, that the frame rate control module records a quantity of frames of pictures displayed at the second refresh rate may be understood as that the frame rate control module starts a frame counter in response to switching from the first refresh rate to the second refresh rate, to count a quantity of frames of pictures in the frame buffer, to obtain a frame quantity record.

Figure 12:
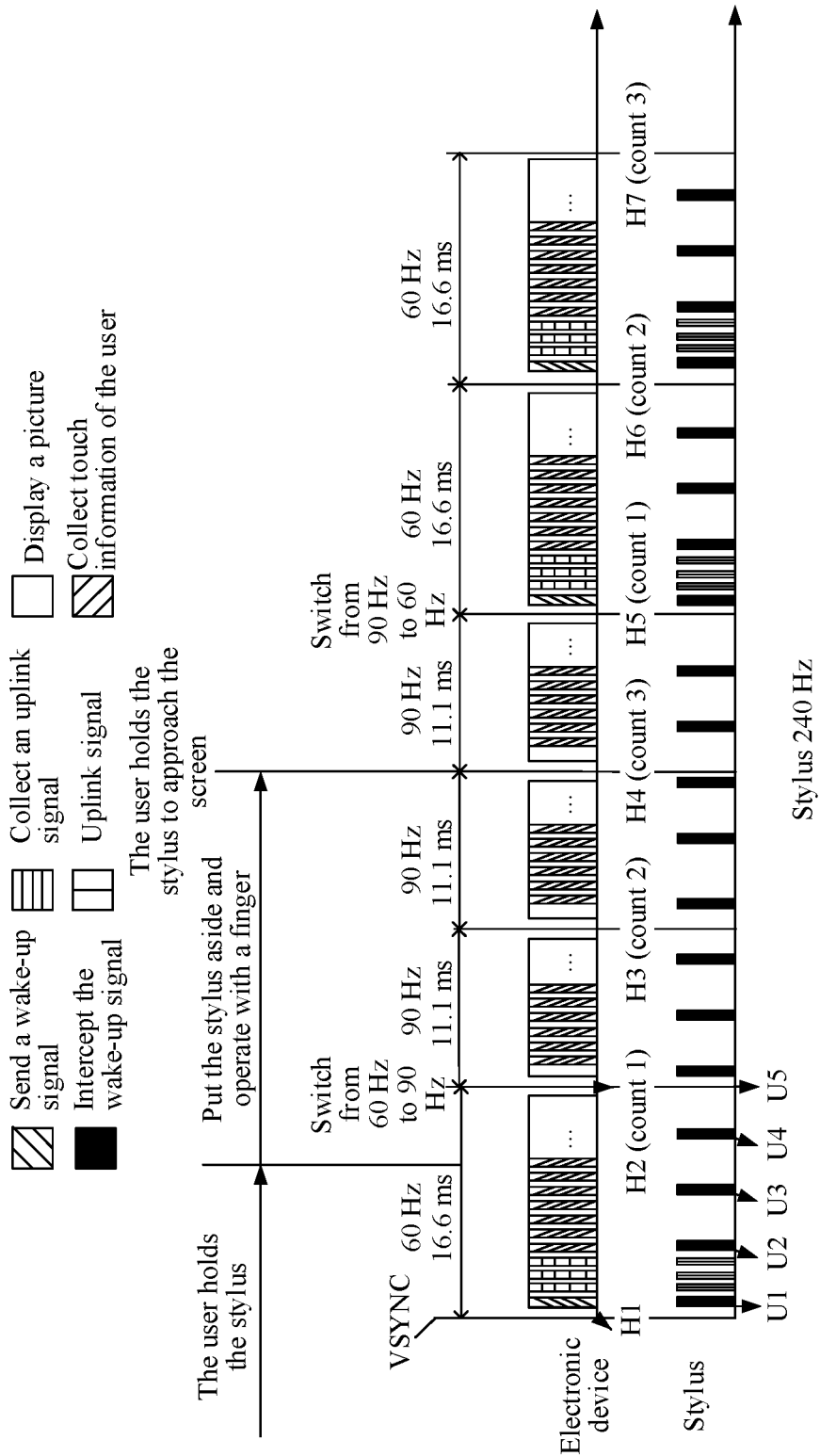
FIG. 12 is another sequence diagram of interaction between an electronic device and a stylus according to an embodiment of this application.

For example, referring to FIG. 12, in a VFP of displaying a first frame of picture, a frame rate control module switches a refresh rate from 60 Hz to 90 Hz. The frame rate control module may use a frame of picture displayed between a moment H2 and a moment H3 as a first frame of "a picture displayed at a second refresh rate", whose count is 1, use a frame of picture displayed between the moment H3 and a moment H4 as a second frame of "the picture displayed at the second refresh rate", whose count is 2, and so on. The rest can be deduced by analogy, to obtain a frame quantity record.

The frame quantity record in the frame rate control module may be shown in Table 3:

TABLE 3

| Quantity of frames of pictures displayed at the second refresh rate | Quantity of displayed frames |
| --- | --- |
| $1^{st}$ frame | n + 1 |
| $2^{nd}$ frame | n + 2 |
| $3^{rd}$ frame | n + 3 |
| $4^{th}$ frame | n + 4 |
| $5^{th}$ frame | n + 5 |
| ... | ... |
| $m^{th}$ frame | n + m |

In an embodiment, after switching from the first refresh rate to the second refresh rate, the frame rate control module may start the frame counter, to start recording a quantity of frames of pictures displayed at the second refresh rate.

Because the touch IC chip and the display IC chip are integrated, after S1007, the method may include S1008A: The frame rate control module synchronizes the second refresh rate to the first IC chip. For example, the frame rate control module may send ID1 of a refresh rate control parameter (or the second refresh rate) to the first IC chip, where ID1 of the refresh rate control parameter is used to indicate the second refresh rate. In response to receiving ID1 of the refresh rate control parameter, the first IC chip may determine, based on ID1 of the refresh rate control parameter, to switch the refresh rate to the second refresh rate.

In addition, the frame rate control module may output a VSYNC to the first IC chip based on the second refresh rate, and the first IC chip controls, in response to receiving the VSYNC, the display screen to display a picture at the second refresh rate. Because the first frequency of the stylus is not an integer multiple of the second refresh rate, the first IC chip may not output the wake-up signal in a VBP of a picture displayed at the second refresh rate, and therefore has not received the uplink signal of the stylus. Therefore, the first IC chip may collect the touch information from the user in the picture displayed at the second refresh rate.

S1008. The first IC chip obtains information about the stylus in response to that a capacitance sampling value change amount of a TP sensor is greater than a preset capacitance sampling value change amount.

It should be understood that, when the stylus approaches the screen or a finger of the user approaches the screen, the capacitance sampling value change amount of the TP sensor in the touch panel is changed. In an embodiment, the first IC chip may determine, based on an area in which the capacitance sampling value change amount of the TP sensor is changed, whether the stylus or a finger of the user approaches the screen. An area in which the capacitance sampling value change amount of the TP sensor is changed by a finger of the user is larger. If the first IC chip determines that the stylus approaches the screen, it may be determined that the touch type is the stylus type. If the first IC chip determines that a finger of the user approaches the screen, it is determined that the touch type is the user type.

When the first IC chip detects that the capacitance sampling value change amount of the TP sensor gradually increases and is greater than or equal to the preset capacitance sampling value change amount, the first IC chip may obtain, based on the capacitance sampling value change amount of the TP sensor, a location of the stylus on the screen. For example, when the first IC chip responds to that the capacitance sampling value change amount of the TP sensor is greater than or equal to 50% (that is, a distance between the stylus and the screen is less than 20 mm), the first IC chip may obtain a location of the stylus on the screen.

The first IC chip may obtain state types of the stylus based on capacitance sampling value change amounts of the TP sensor, where the state types may include: an enter hover type (enter hover), a down type (down), an up type (up), a move type (move), and the like. Referring to c in FIG. 11, because the stylus does not come into contact with the screen, the first IC chip may learn that the state type of the stylus is the enter hover type.

In this embodiment, the information about the stylus may include: a location of the stylus on the screen, a state type, and an identifier of the stylus. The identifier of the stylus is used to indicate that the stylus instead of a finger of the user comes into contact with the screen. In an embodiment, the identifier of the stylus may be the stylus type.

In an embodiment, when learning that the capacitance sampling value change amount of the TP sensor is greater than or equal to the preset capacitance sampling value change amount, the first IC chip may report the information about the stylus to the touch driver. In this embodiment, the information about the stylus may include: the capacitance sampling value change amount of the TP sensor and an identifier of the stylus.

S1009. The first IC chip reports the information about the stylus to a touch driver.

S1010. The touch driver reports a location of the stylus on the screen, a state type, and an identifier of the stylus to a touch message dispatch processing module.

In an embodiment, the touch driver may receive a location of the stylus on the screen, a state type, and an identifier of the stylus that are reported by the first IC chip, and then report the location of the stylus on the screen, the state type, and the identifier of the stylus to the touch message dispatch processing module.

In an embodiment, when the information about the stylus includes the capacitance sampling value change amount of the TP sensor and the identifier of the stylus, the touch driver may obtain a location of the stylus on the screen and a state type based on the capacitance sampling value change amount of the TP sensor, and then report the location of the stylus on the screen, the state type, and the identifier of the stylus to the touch message dispatch processing module.

In an embodiment, the touch driver may further obtain a system time, encapsulate the system time and "the location of the stylus on the screen, the state type, and the identifier of the stylus", to obtain encapsulated information, and report the encapsulated information to the touch message dispatch processing module. In FIG. 10B, the location of the stylus on the screen, the state type, and the identifier of the stylus are reported to the touch message dispatch processing module. In the following embodiments, a description is made using an example in which the touch driver reports "a location of the stylus on the screen, a state type, and an identifier of the stylus" to a touch message dispatch processing module.

S1011. The touch message dispatch processing module sends the location of the stylus on the screen, the state type, and the identifier of the stylus to a first touch message processing module.

The electronic device includes the first touch message processing module and the second touch message processing module, the first touch message processing module is related to adjustment of a refresh rate of the electronic device, the second touch message processing module is a touch message processing module corresponding to the application, and FIG. 6A shows only the first touch message processing module. For example, referring to c in FIG. 11, the second touch message processing module is a touch message processing module corresponding to the desktop.

A priority of the first touch message dispatch processing module is higher than that of the second touch message dispatch processing module. The touch message dispatch processing module may preferentially send the location of the stylus on the screen, the state type, and the identifier of the stylus to the first touch message processing module.

S1012. The first touch message processing module determines to send a refresh rate adjustment message to the frame rate control module based on the state type of the stylus and the identifier of the stylus.

After receiving the location of the stylus on the screen, the state type, and the identifier of the stylus, the first touch message processing module may determine, based on the identifier of the stylus, that the stylus approaches the screen, and then the first touch message processing module may determine whether to send a refresh rate adjustment message to the frame rate control module based on the state type of the stylus. When the state type of the stylus is a preset state type, where the preset state type includes the enter hover type (enter hover) or the down type (down), the first touch message processing module may send the refresh rate adjustment message to the frame rate control module.

The refresh rate adjustment message is used to indicate that a frame rate adjustment module adjusts the second refresh rate to the third refresh rate, the first frequency of the stylus is an integer multiple of the third refresh rate, and the third refresh rate is the same as or different from the first refresh rate. The refresh rate adjustment message may include: a state type of the stylus and an identifier of the stylus.

S1013. The first touch message processing module sends a refresh rate adjustment message to the frame rate control module.

In this embodiment of this application, referring to c in FIG. 11, the state type of the stylus is the enter hover type (enter hover), so that the first touch message processing module may send the refresh rate adjustment message to the frame rate control module.

In an embodiment, the first touch message processing module may send the first signal to the touch message dispatch processing module. The first signal is used to indicate that the touch message dispatch processing module sends the location of the stylus on the screen, the state type, and the identifier of the stylus to the second touch message processing module. The touch message dispatch processing module may send, in response to the first signal, the location of the stylus on the screen, the state type, and the identifier of the stylus to the second touch message processing module.

It should be understood that, the first touch message processing module may determine, based on the touch information from the touch message dispatch processing module, whether to send the first signal or the second signal to the touch message dispatch processing module. The second signal is used to indicate that the touch message dispatch processing module does not send the location of the stylus on the screen, the state type, and the identifier of the stylus to the second touch message processing module. When the touch information from the touch message dispatch processing module indicates finger joint information or three-button navigation information, the first touch message processing module sends the second signal to the touch message dispatch processing module.

A solution in which the touch message dispatch processing module sends the touch information to the second touch message processing module is not described in detail in this embodiment of this application.

S1014. The frame rate control module queries the frame quantity record based on the state type of the stylus and the identifier of the stylus.

The frame rate control module may determine, based on the identifier of the stylus, that the stylus approaches the screen, and determine, based on the state type of the stylus, that the stylus is in the enter hover type, and therefore determine that it is necessary to switch from the second refresh rate to the third refresh rate, so that the frame quantity record is queried, to switch from the second refresh rate to the third refresh rate when the quantity of frames is proper.

It should be understood that, if the touch information from the first touch message processing module received by the frame rate control module is touch information of a finger of the user, the frame rate control module determines not to switch the refresh rate, and therefore does not need to query the frame quantity record.

S1015. The frame rate control module switches from the second refresh rate to a third refresh rate in response to that a quantity of frames in the frame quantity record reaches a target quantity of frames.

Based on related descriptions in FIG. 5, the frame rate control module can obtain the first frequency of the stylus, and the frame rate control module may determine the target quantity of frames based on the first frequency of the stylus and the second refresh rate.

A product of the target quantity of frames and the first frequency is divisible by the second refresh rate. That is to say, the product of the target quantity of frames and the first frequency is an integer multiple of the second refresh rate. For example, the first refresh rate is 60 Hz, the second refresh rate is 90 Hz, the first frequency is 240 Hz, and the target quantity of frames may be 3t, where t is an integer greater than or equal to 1. In this way, the target quantity of frames may be 3, 6, 9, . . . , or the like. Therefore, the frame rate control module may switch from the second refresh rate to the third refresh rate in response to that the quantity of frames in the frame quantity record reaches the target quantity of frames. For example, if the electronic device is currently displaying a first frame of picture at the second refresh rate, the frame rate control module may switch from the second refresh rate to the third refresh rate when the quantity of frames reaches 3.

In an embodiment, the frame rate control module pre-stores tables of target quantities of frames corresponding to different first frequencies and different second refresh rates. For example, the frame rate control module stores a table of a target quantity of frames corresponding to a first frequency being 240 Hz and a second refresh rate being 90 Hz, as shown in Table 4. For example, the frame rate control module stores a table of a target quantity of frames corresponding to a first frequency being 60 Hz and a second refresh rate being 90 Hz, as shown in Table 5. In this embodiment of this application, the frame rate control module may learn, by querying Table 4, that the target quantity of frames is 3, 6, 9, . . . , or the like. In this way, the frame rate control module queries a quantity of frames in the frame quantity record, and switches from the second refresh rate to the third refresh rate when the quantity of frames reaches the target quantity of frames.

In an embodiment, the frame rate control module may query a quantity of frames in the frame quantity record, and calculate whether a product of a latest recorded quantity of frames and the first frequency is divisible by the second refresh rate. If the product is divisible by the second refresh rate, the frame rate control module may switch from the second refresh rate to the third refresh rate. If the product of the latest recorded quantity of frames and the first frequency is not divisible by the second refresh rate and there is a remainder, the frame rate control module records a new quantity of frames again in response to the frame quantity record, and performs calculation by using the new quantity of frames, until a product of the latest recorded quantity of frames in the frame quantity record and the first frequency is divisible by the second refresh rate, and the frame rate control module switches from the second refresh rate to the third refresh rate.

For example, a quantity of frames in the frame quantity record is 2, and the frame rate control module performs calculation to learn that a product of the quantity of frames 2 and the first frequency 240 Hz is 480 and is not divisible by 90 Hz and there is a remainder 40, so that 2 is not a target quantity of frames. When the first IC chip controls the display screen to display a frame of picture again, a quantity of frames in the frame quantity record is 3, and the frame rate control module performs calculation to learn that a product of the quantity of frames 3 and the first frequency 240 Hz is 720 and is divisible by 90 Hz, so that 3 is a target quantity of frames. Therefore, the frame rate control module may switch from the second refresh rate to the third refresh rate in a VFP of the target quantity of frames.

TABLE 4

| Quantity of frames of pictures displayed at the second refresh rate | Recorded quantity of frames | Whether to be able to switch to the first refresh rate (whether to be the target quantity of frames) |
|---|---|---|
| 1st frame | n + 1 | No |
| 2nd frame | n + 2 | No |
| 3rd frame | n + 3 | Yes |
| 4th frame | n + 4 | No |
| 5th frame | n + 5 | No |
| 6th frame | n + 6 | Yes |
| 7th frame | n + 7 | No |
| 8th frame | n + 8 | No |
| . . . | . . . | . . . |
| mth frame | n + m | If m × the first frequency is divisible by the second refresh rate, the second refresh rate can be switched to the first refresh rate; or if m × the first frequency is not divisible by the second refresh rate, the second refresh rate cannot be switched to the first refresh rate |

TABLE 5

| Quantity of frames of pictures displayed at the second refresh rate | Recorded quantity of frames | Whether to be able to switch to the first refresh rate (whether to be the target quantity of frames) |
|---|---|---|
| 1st frame | n + 1 | No |
| 2nd frame | n + 2 | No |
| 3rd frame | n + 3 | Yes |
| 4th frame | n + 4 | No |
| 5th frame | n + 5 | No |
| 6th frame | n + 6 | Yes |
| 7th frame | n + 7 | No |
| 8th frame | n + 8 | No |
| . . . | . . . | . . . |
| mth frame | n + m | If m × the first frequency is divisible by the second refresh rate, the second refresh rate can be switched to the first refresh rate; or if m × the first frequency is not divisible by the second refresh rate, the second refresh rate cannot be switched to the first refresh rate |

The first frequency of the stylus is an integer multiple of the third refresh rate. For example, the third refresh rate may be 60 Hz or 120 Hz. In an embodiment, if the electronic device supports 60 Hz, 90 Hz, and 120 Hz, the frame rate control module may preferentially switch to a high refresh rate, for example, switch from 90 Hz to 120 Hz. If the electronic device supports 60 Hz and 90 Hz, the frame rate control module may switch from 90 Hz to 60 Hz. A description is made below using an example in which the frame rate control module switches from 90 Hz to 60 Hz.

For that the frame rate control module switches from the second refresh rate to the third refresh rate, reference may be made to related descriptions of "the frame rate control module switches from the first refresh rate to the second refresh rate" in S1006.

It should be understood that, after switching from the second refresh rate to the third refresh rate, the frame rate control module may restart the frame counter, to start recording a quantity of frames of pictures displayed at the third refresh rate.

Because the touch IC chip and the display IC chip are integrated, after S1015, the method may include S1017A: The frame rate control module synchronizes the third refresh rate to the first IC chip. When switching from the second refresh rate to the third refresh rate in a VFP of the target quantity of frames of pictures, the frame rate control module may send ID2 of a refresh rate control parameter to the first IC chip, where ID2 of the refresh rate control parameter is used to indicate the third refresh rate. The first IC chip may determine, based on ID2 of the refresh rate control parameter, to switch the refresh rate to the third refresh rate.

In addition, the frame rate control module may output a VSYNC to the first IC chip based on the second refresh rate, and the first IC chip controls, in response to receiving the VSYNC, the display screen to display a picture at the third refresh rate. Because the first frequency of the stylus is an integer multiple of the third refresh rate, the first IC chip sends the wake-up signal in a VBP of a picture displayed at the third refresh rate, and then may receive the uplink signal of the stylus. That is to say, when displaying a picture at the third refresh rate, the first IC chip may collect touch information, where the touch information may include the uplink signal of the stylus and the touch information of the user.

S1016. The frame rate control module controls, based on the third refresh rate, a display screen to display a picture at the third refresh rate.

The frame rate control module switches from the second refresh rate to the third refresh rate, so that the display screen of the electronic device may display a picture at the third refresh rate. Reference may be made to related descriptions in S1007.

Referring to FIG. 12, the user holds the stylus to operate the screen, and the first frequency of the stylus is 240 Hz. Between a moment H1 and a moment H2, a first IC chip displays a first frame of picture at 60 Hz, and the first IC chip may receive the uplink signal of the stylus. Reference may be made to related descriptions in FIG. 7. If the user puts the stylus aside between the moment H1 and the moment H2, a finger is used to enable the frame rate control module to switch the refresh rate from 60 Hz to 90 Hz in a VFP of the first frame of picture. Because the first frequency 240 Hz of the stylus is not an integer multiple of 90 Hz, the first IC chip sends no wake-up signal in a VBP of the second frame of picture. Correspondingly, the stylus has intercepted no wake-up signal, and the stylus sends no uplink signal. Therefore, in a process of displaying the second frame of picture (the moment H2 to the moment H3), the first IC chip has received no uplink signal from the stylus. For the moment H3 to the H5 moment, reference may be made to descriptions of the moment H2 to moment H3.

After the frame rate control module switches from 60 Hz to 90 Hz, a quantity of frames of pictures displayed at 90 Hz may be counted. At the moment H4, when the user holds the stylus to approach the screen, steps of S1008 to S1015 may be performed. In response to that a quantity of frames in the frame quantity record reaches 3, the frame rate control module may switch from the second refresh rate to the third refresh rate. In FIG. 12, a description is made using an example in which the third refresh rate is 60 Hz.

Referring to FIG. 12, the moment H4 to the moment H5 are a third frame of picture displayed by the first IC chip at 90 Hz, and the frame rate control module may switch from 90 Hz to 60 Hz in a VFP of the third frame of picture. In this way, when the first IC chip sends a wake-up signal in a VBP of a first frame of picture displayed at 60 Hz (that is, a fifth frame of picture that the first IC chip controls the display screen to display), the stylus may intercept the wake-up signal, and therefore may send an uplink signal in response to the wake-up signal, and the first IC chip may receive the uplink signal, to ensure signal synchronization between the electronic device and the stylus.

In this embodiment of this application, after switching from the first refresh rate to the second refresh rate, the frame rate control module may record the quantity of frames of the pictures displayed by the electronic device at the second refresh rate, and then switch to the third refresh rate when detecting that the stylus approaches the screen, where the first frequency of the stylus is an integer multiple of the third refresh rate, and therefore occurrence of a handwriting intermittence phenomenon caused by signal asynchrony between the electronic device and the stylus may be avoided. Specifically, in response to that the quantity of frames of the pictures displayed at the second refresh rate reaches the target quantity of frames, the frame rate control module may switch from the second refresh rate to the third refresh rate, so that the stylus may intercept the wake-up signal from the electronic device, to send the uplink signal and ensure signal synchronization between the electronic device and the stylus.

Based on the embodiment shown in FIG. 10A, FIG. 10B, and FIG. 10C, an embodiment of this application provides a refresh rate switching method. In an embodiment, before S1001, the method may further include:

S1001A. When a Bluetooth connection between an electronic device and a stylus is successful, a Bluetooth message processing module in the electronic device sends a Bluetooth connection success message to a frame rate control module.

In this way, in response to the Bluetooth connection success message, the frame rate control module may perform steps in FIG. 10A, FIG. 10B, and FIG. 10C.

In an embodiment, this embodiment of this application may further include:

S1002A. When the Bluetooth connection between the electronic device and the stylus is interrupted, the Bluetooth message processing module sends a Bluetooth connection interrupt message to the frame rate control module.

For example, after S1016, the frame rate control module receives the Bluetooth connection interrupt message. Because the Bluetooth connection between the stylus and the electronic device is interrupted, and the user does not use the stylus, the frame rate control module may control, based on a scenario in which the electronic device is located, the display screen to display a picture at a refresh rate corresponding to the scenario, without considering whether to receive the information about the stylus from the touch message processing module.

For example, after the electronic device displays a desktop, and the frame rate control module performs S1016, to switch the refresh rate from 90 Hz to 60 Hz, if the frame rate control module receives the Bluetooth connection interrupt message, the refresh rate may be switched from 60 Hz to 90 Hz, to provide the user with fluent pictures.

With reference to S1001A, in an embodiment, S1002A may be replaced with:

S1002B. The stylus sends, when sleeping, a sleep message to the electronic device through a Bluetooth module in the stylus.

S1003B. A Bluetooth driver in the electronic device receives the sleep message through a Bluetooth module in the electronic device, and sends the sleep message to the Bluetooth message processing module.

S1004B. The Bluetooth message processing module sends the sleep message to the frame rate control module.

In this embodiment, the frame rate control module receives the sleep message. Because the stylus has fallen asleep, and the user does not use the stylus, the frame rate control module may control, based on a scenario in which the electronic device is located, the display screen to display a picture at a refresh rate corresponding to the scenario, without considering whether to receive the information about the stylus from the touch message processing module. Reference may be made to descriptions in S1002A.

In this embodiment of this application, in response to that the Bluetooth connection between the stylus and the electronic device is interrupted or the stylus falls asleep, the frame rate control module may switch the refresh rate based on a scenario in which the electronic device is located, without considering whether to receive the information about the stylus from the touch message processing module.

Figure 13:
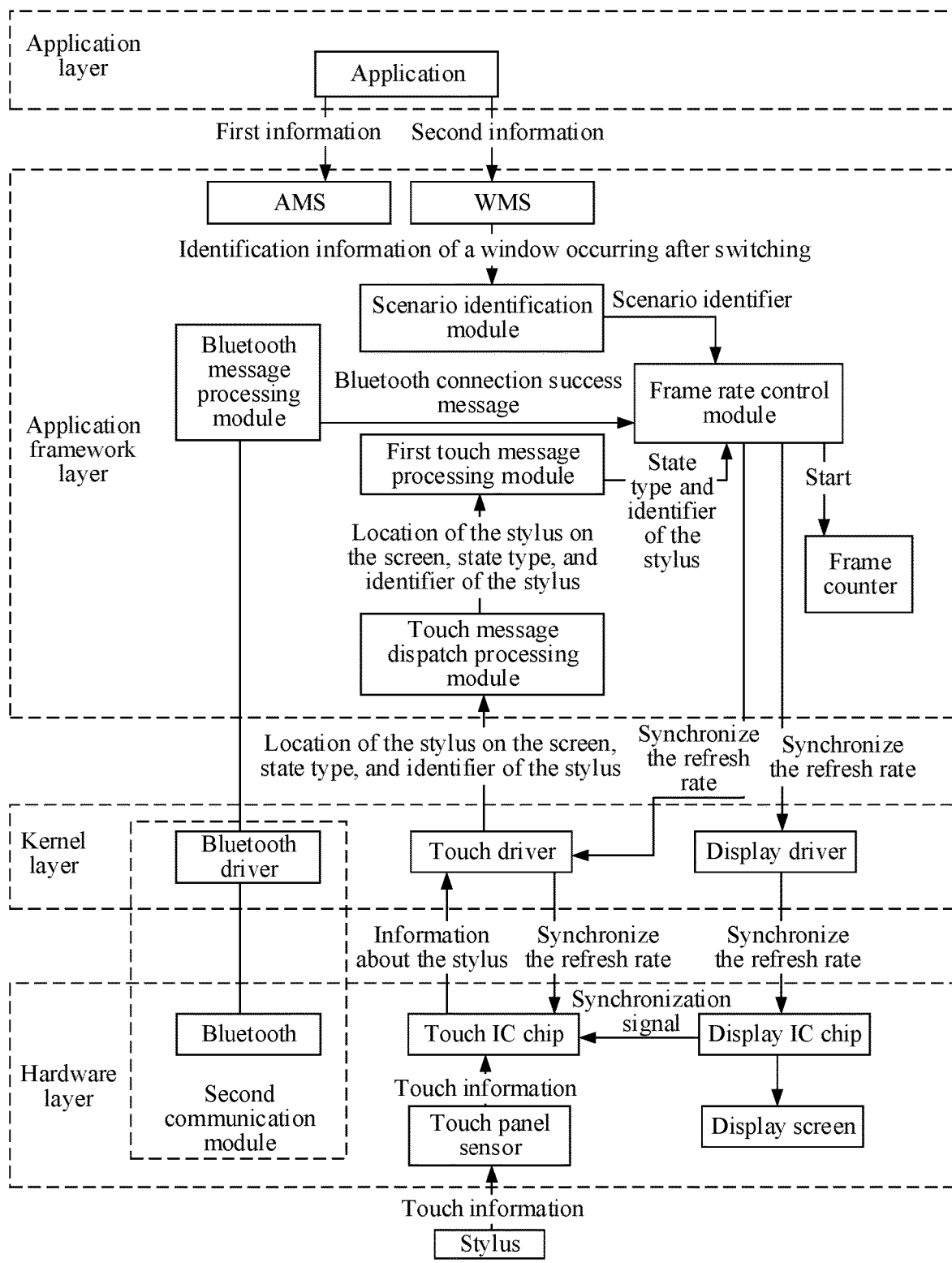
FIG. 13 is a block diagram of another structure of an electronic device to which an embodiment of this application is applicable.

FIG. 13 is a block diagram of another structure of an electronic device to which an embodiment of this application is applicable. Compared with FIG. 6A, referring to FIG. 13, in an embodiment, a touch IC chip and a display IC chip may be independently arranged, the touch IC chip is connected to each of a TP sensor and a touch driver, the display IC chip is connected to each of a display screen and a display driver, and a frame rate control module is connected to each of the touch driver and the display driver. In this embodiment, for example, when the frame rate control module switches from a first refresh rate to a second refresh rate, the frame rate control module may control the display IC chip to control the display screen to display a picture at the second refresh rate, and the frame rate control module may further send and synchronize the second refresh rate to the touch IC chip through the touch driver, so that the touch IC chip intercepts touch information based on the second refresh rate.

In the structure of the electronic device, the display IC chip may control the display screen to display a frame of picture at a corresponding refresh rate, and the touch IC chip may intercept touch information, that is, perform touch sampling in a period in which the display screen displays a frame of picture. For example, a refresh rate of the electronic device is, for example, 60 Hz, and if the touch IC chip intercepts touch information twice in a period of displaying a frame of picture, a touch sampling rate of the electronic device is 120 Hz, and the touch sampling rate of the electronic device is related to the refresh rate of the electronic device.

Figure 14:
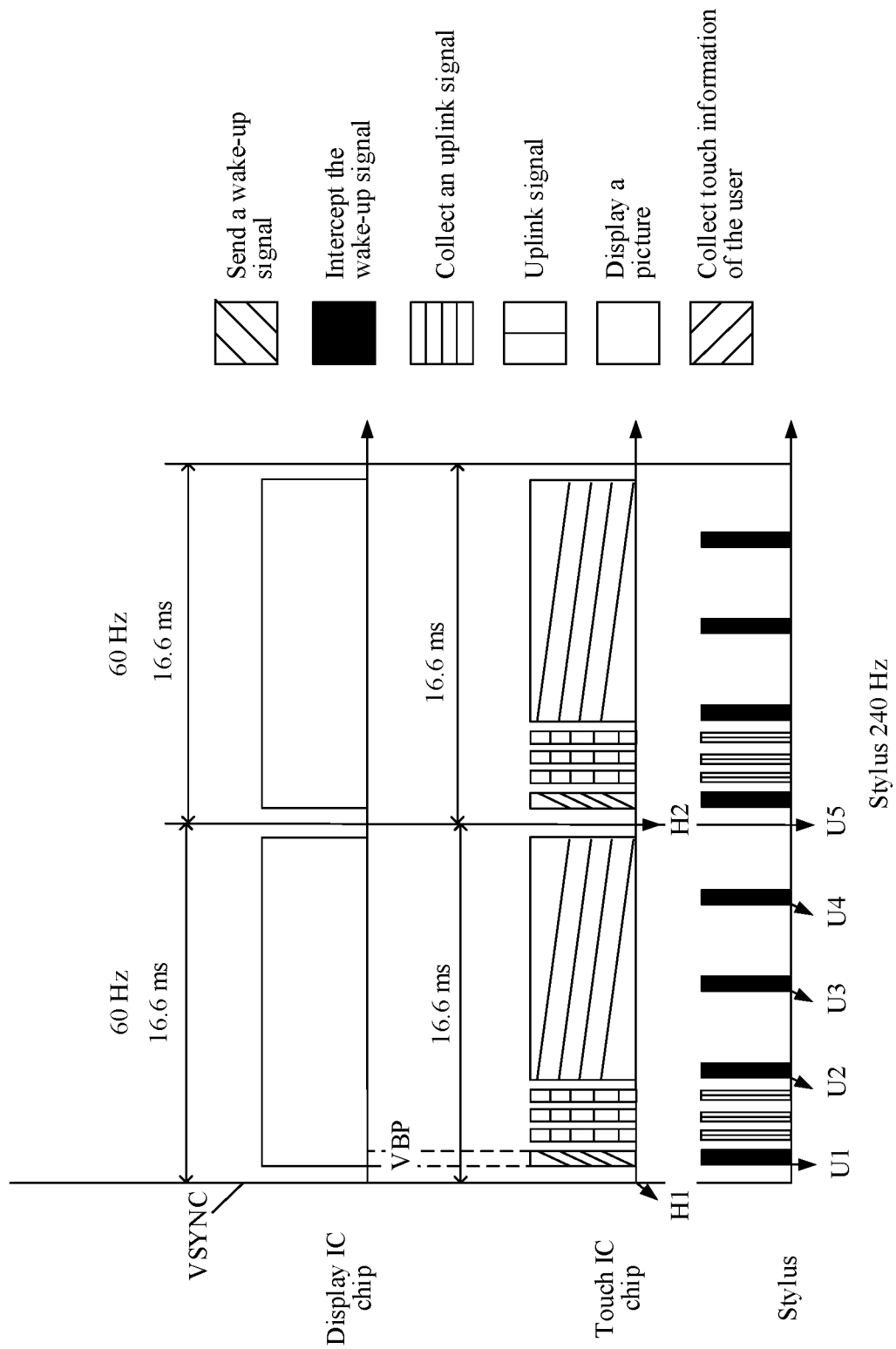
FIG. 14 is another sequence diagram of interaction between an electronic device and a stylus according to an embodiment of this application.

Referring to FIG. 14, between a moment H1 and a moment H2, a display IC chip displays a first frame of picture at 60 Hz. Because the display IC chip does not need to intercept touch information, the display IC chip may always display the first frame of picture between a vertical back porch and a vertical front porch of the first frame of picture. Correspondingly, the touch IC chip may send a wake-up signal in the VBP of the first frame of picture, and always intercept touch information after sending the wake-up signal. If a first frequency of a stylus is 240 Hz, the touch IC chip may intercept an uplink signal at a moment at which the stylus sends the uplink signal, and the stylus may always intercept touch information of a user after intercepting the uplink signal. It should be understood that, in FIG. 14, that the touch IC chip intercepts an uplink signal at a moment at which the stylus sends the uplink signal is used as an example. It should be understood that, the touch IC chip also intercepts touch information at a moment between moments of intercepting two adjacent uplink signals.

Because a period in which the touch IC chip sends the wake-up signal and intercepts the touch information (the uplink signal of the stylus and the touch information of the user) is the same as a period in which the display IC chip displays a frame of picture, when the touch IC chip and the display IC chip are independently arranged, there is also the problem in FIG. 8 and FIG. 9. For details, reference may be made to descriptions in FIG. 15 and FIG. 16.

Figure 15:
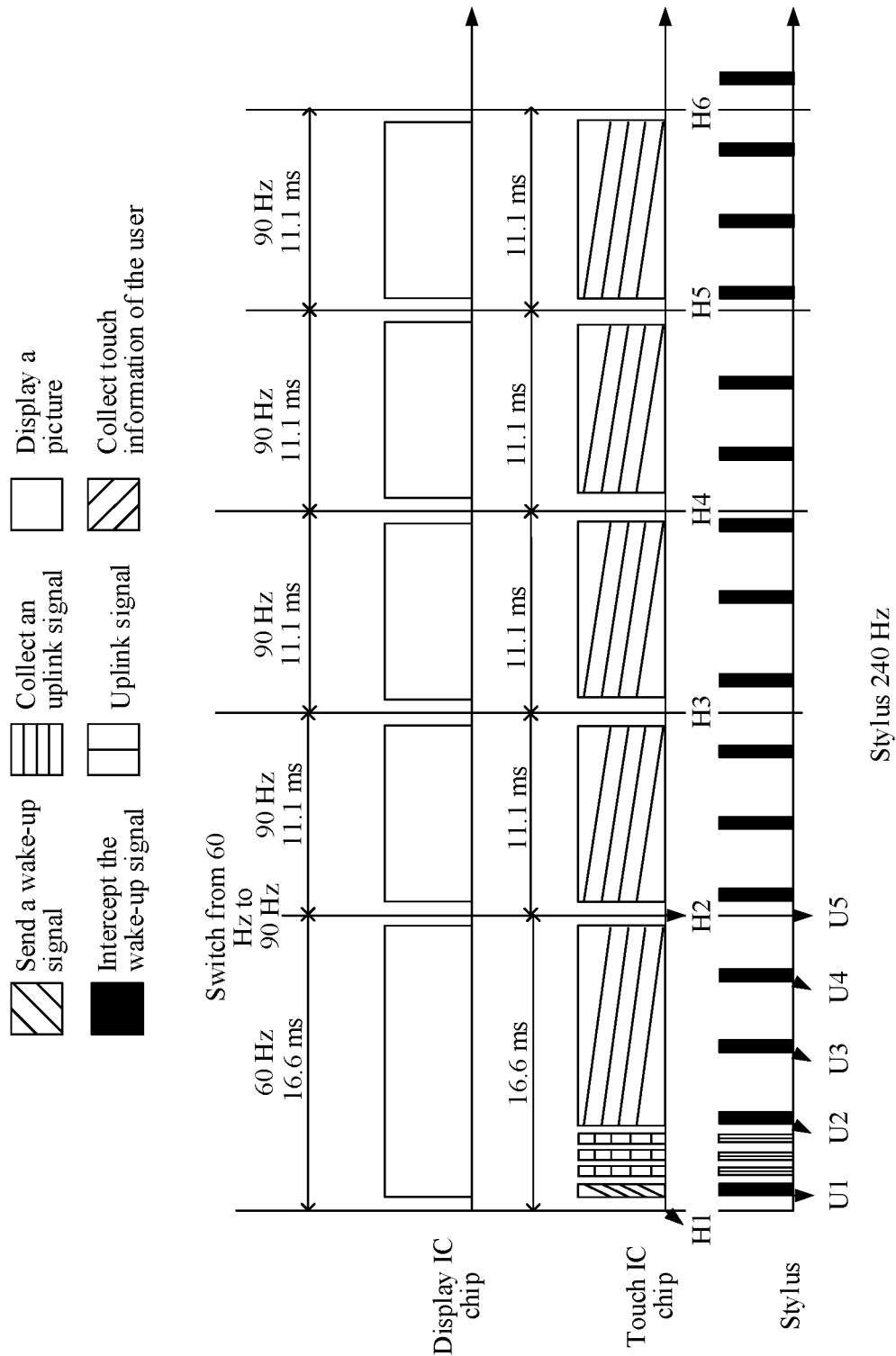
FIG. 15 is another sequence diagram of interaction between an electronic device and a stylus according to an embodiment of this application.

In FIG. 15, between a moment H1 and a moment H2, a display IC chip displays a first frame of picture at 60 Hz, and a touch IC chip may send a wake-up signal in a VBP of the first frame of picture. An electronic device switches a refresh rate from 60 Hz to 90 Hz in a VFP of the first frame of picture. Because a first frequency 240 Hz of the stylus is not an integer multiple of 90 Hz, the touch IC chip may not send a wake-up signal in a VBP of a second frame of picture. Correspondingly, the stylus has not intercepted the wake-up signal, and therefore does not send an uplink signal. Therefore, the display IC chip displays the second frame of picture (the moment H2 to a moment H3). The touch IC chip has received no uplink signal from the stylus. Therefore, within this duration, the user holds the stylus to write on the screen, but the screen does not display handwriting of writing of the stylus. that is to say, from the moment H2 to the moment H3, the stylus slides and taps on the screen, but is not responded to by the electronic device. For the moment H3 to the H6 moment, reference may be made to related descriptions of the moment H2 to moment H3.

In the scenario shown in FIG. 15, after the electronic device switches the refresh rate, if the first frequency is a non-integer multiple of a refresh rate occurring after switching, a handwriting intermittence phenomenon of the stylus is caused, and it is necessary to switch the refresh rate of the electronic device to a refresh rate divisible by the first frequency as soon as possible.

Figure 16:
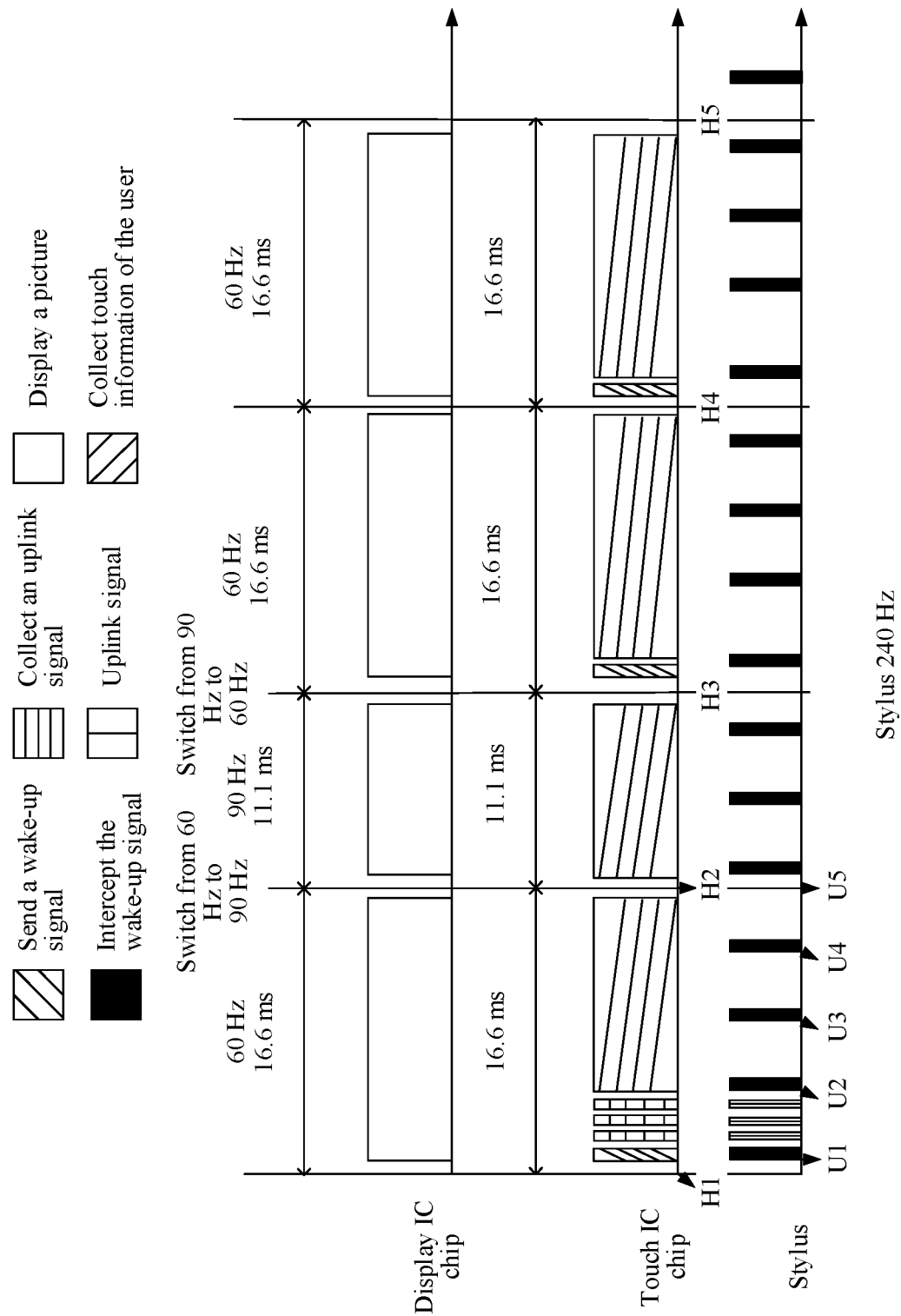
FIG. 16 is another sequence diagram of interaction between an electronic device and a stylus according to an embodiment of this application.
Figure 17A:
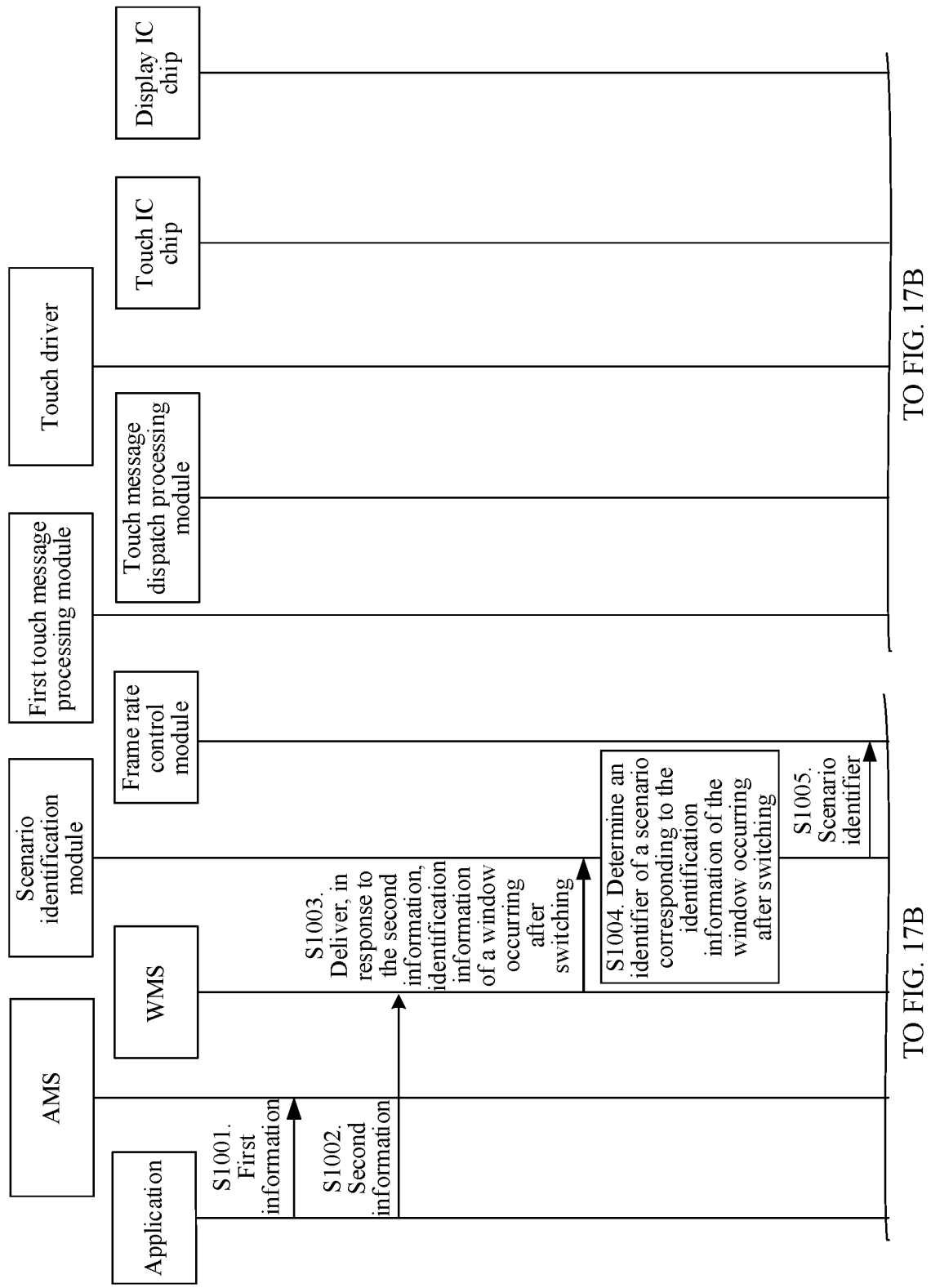
Figure 17B:
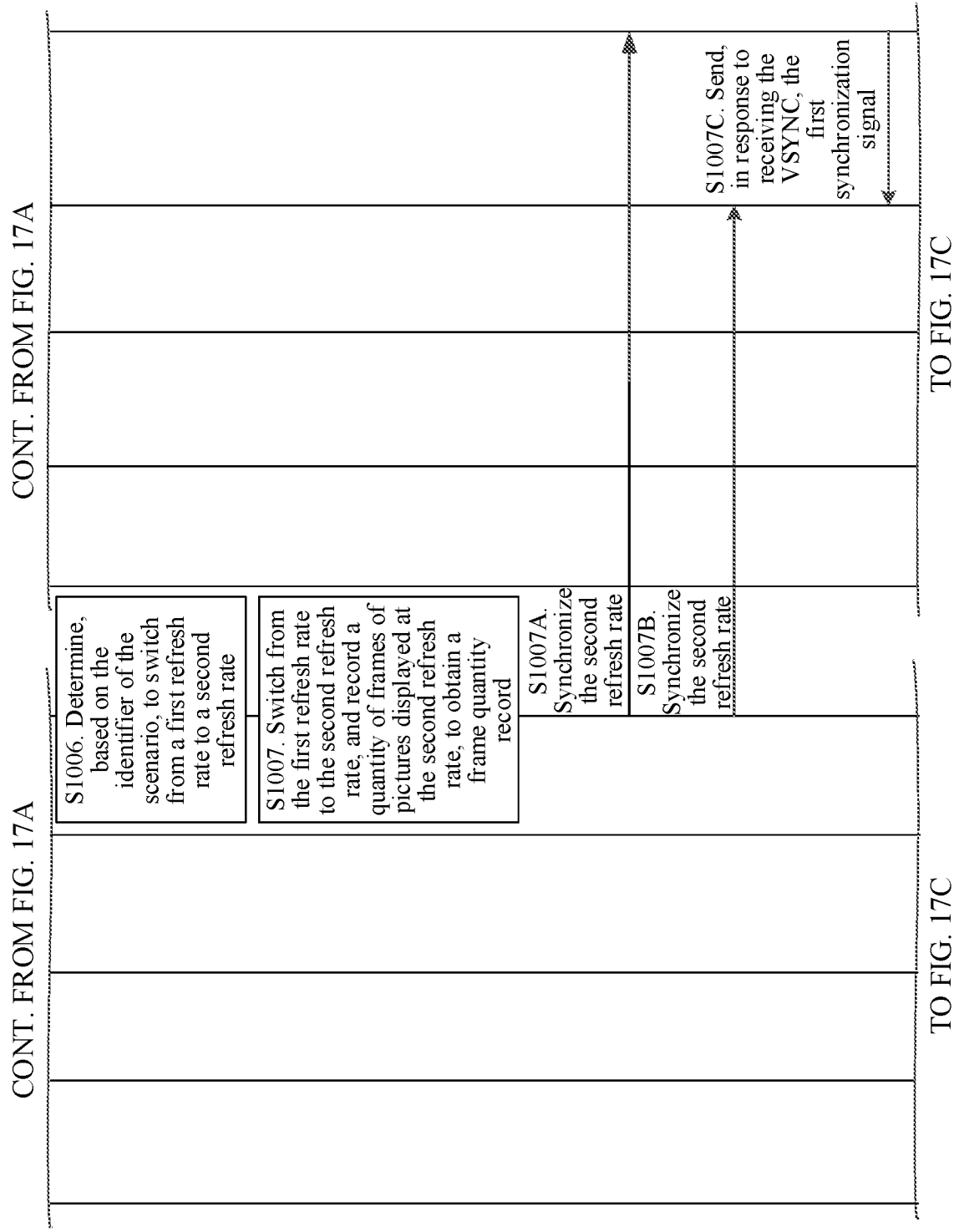
Figure 17D:
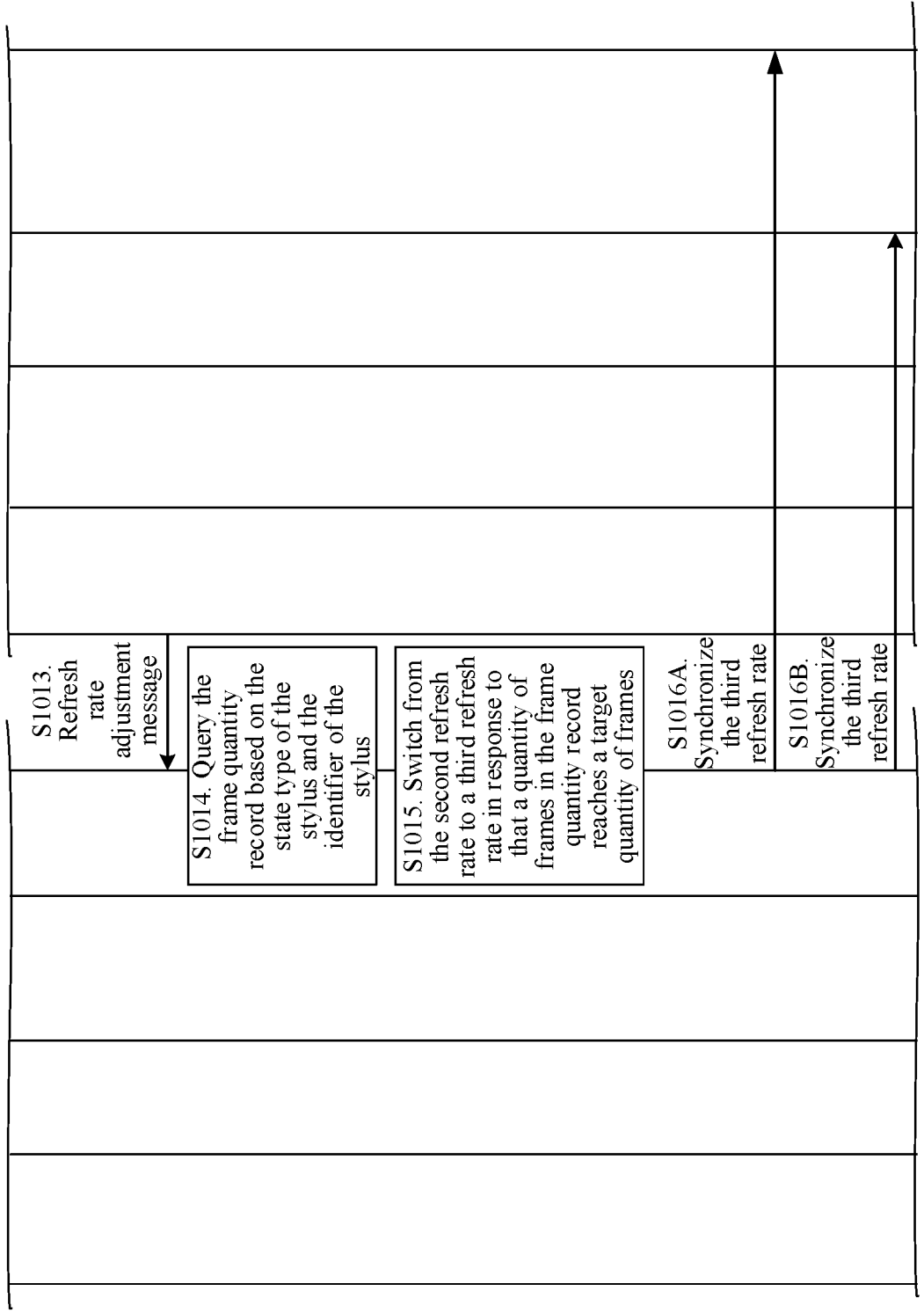

Referring to FIG. 16, if the electronic device switches the refresh rate from 90 Hz to 60 Hz at the moment H3, or the moment H4, or the moment H5, the stylus cannot intercept the wake-up signal from the touch IC chip, and cannot send the uplink signal, to cause the user to consider that the stylus is damaged. It should be understood that, in FIG. 15 and FIG. 16, if the electronic device detects that a distance between the stylus and the screen is less than a preset distance, the refresh rate is not switched. That the electronic device switches the refresh rate at the moment H2 is an example, making it convenient to describe a problem of signal asynchrony between the electronic device and the stylus occurring when the user reuses the stylus after the electronic device switches the refresh rate.

Therefore, in a structure in which the touch IC chip and the display IC chip may be independently arranged, there is also the problem in FIG. 8 and FIG. 9. In this embodiment, to resolve the problem, referring to FIG. 17B, FIG. 17C, FIG. 17D, and FIG. 17E, after S1007 in FIG. 10B, the method may further include S1007A to S1007C, S1008 and S1009 may be replaced with S1008A and S1009A, and after S1015, the method may further include S1016A to S1016C.

S1007A. The frame rate control module synchronizes the second refresh rate to a display IC chip through a display driver.

In an embodiment, when switching from the first refresh rate to the second refresh rate in a VFP of the target quantity of frames of pictures, the frame rate control module synchronizes the second refresh rate to the display IC chip. For example, the frame rate control module may send ID1 of a refresh rate control parameter to the display IC chip, and the display IC chip may determine, based on ID1 of the refresh rate control parameter, to switch the refresh rate to the second refresh rate.

S1007B. The frame rate control module synchronizes the second refresh rate to a touch IC chip through a touch driver.

In an embodiment, when switching from the first refresh rate to the second refresh rate in a VFP of the target quantity of frames of pictures, the frame rate control module synchronizes the second refresh rate to the display IC chip. For example, the frame rate control module may send ID3 of a refresh rate control parameter to the touch IC chip, and the touch IC chip may determine, based on ID3 of the refresh rate control parameter, to switch the refresh rate to the second refresh rate.

In an embodiment, ID1 of the refresh rate control parameter may be the same as or different from ID3 of the refresh rate control parameter. It should be understood that, S1007A and S1007B are not performed in a sequential order, and may be performed simultaneously.

S1007C. The display IC chip sends, when receiving a VSYNC from the frame rate control module, a first synchronization signal to the touch IC chip.

The frame rate control module may output the VSYNC to the first IC chip based on the second refresh rate, and the first IC chip may control, in response to receiving the VSYNC, the display screen to display a picture at the second refresh rate. The display IC chip may send, in response to receiving the VSYNC, the first synchronization signal to the touch IC chip.

The first synchronization signal is used to indicate that the display IC chip starts displaying a picture at the second refresh rate. Because the first frequency of the stylus is not an integer multiple of the second refresh rate, the touch IC chip may not send the wake-up signal. In this embodiment of this application, in response to receiving the first synchronization signal, the touch IC chip may start intercepting the touch information of the user. Reference may be made to related descriptions of the first IC chip in FIG. 10B.

S1008A. The touch IC chip obtains information about the stylus in response to that a capacitance sampling value change amount of a TP sensor is greater than a preset capacitance sampling value change amount.

S1009A. The touch IC chip reports the information about the stylus to a touch driver.

S1016A. The frame rate control module synchronizes the third refresh rate to a display IC chip through a display driver.

In an embodiment, when switching from the first refresh rate to the third refresh rate in a VFP of the target quantity of frames of pictures, the frame rate control module synchronizes the third refresh rate to the display IC chip. For example, the frame rate control module may send ID2 of a refresh rate control parameter to the display IC chip, and the display IC chip may determine, based on ID2 of the refresh rate control parameter, to switch the refresh rate to the third refresh rate.

S1016B. The frame rate control module synchronizes the third refresh rate to a touch IC chip through a touch driver.

In an embodiment, when switching from the first refresh rate to the third refresh rate in a VFP of the target quantity of frames of pictures, the frame rate control module synchronizes the third refresh rate to the display IC chip. For example, the frame rate control module may send ID4 of a refresh rate control parameter to the touch IC chip, and the touch IC chip may determine, based on ID4 of the refresh rate control parameter, to switch the refresh rate to the third refresh rate.

In an embodiment, ID2 of the refresh rate control parameter may be the same as or different from ID4 of the refresh rate control parameter. It should be understood that, S1016A and S1016B are not performed in a sequential order, and may be performed simultaneously.

S1016C. The display IC chip sends, when receiving a VSYNC from the frame rate control module, a second synchronization signal to the touch IC chip.

The frame rate control module may output the VSYNC to the first IC chip based on the third refresh rate, and the first IC chip may control, in response to receiving the VSYNC, the display screen to display a picture at the third refresh rate. In this embodiment of this application, to ensure that the touch IC chip can send the wake-up signal in the VBP of the picture displayed by the display IC chip at the third refresh rate, so that collecting the touch information by the touch IC chip is synchronized with displaying the picture by the display IC chip, the display IC chip may send, whenever receiving a VSYNC from the frame rate control module once, a second synchronization signal to the touch IC chip once.

In an embodiment, the second synchronization signal includes: a start moment and an end moment of a VBP of a corresponding frame of picture displayed at the third refresh rate. The touch IC chip may send, in response to receiving the second synchronization signal, a wake-up signal in a VBP of each frame of picture displayed at the third refresh rate, and intercept, after the VBP ends, the uplink signal from the stylus and the touch information of the user.

For example, when receiving the VSYNC of the first frame of picture from the frame rate control module, the display IC chip may send a second synchronization signal to the touch IC chip, where the second synchronization signal includes: a start moment and an end moment of a VBP of the first frame of picture displayed at the third refresh rate. The touch IC chip may send, in response to receiving the second synchronization signal, a wake-up signal in the VBP of the first frame of picture displayed at the third refresh rate, and intercept, after the VBP ends, the uplink signal from the stylus and the touch information of the user.

When receiving the VSYNC of the first frame of picture from the frame rate control module, the display IC chip may send a second synchronization signal to the touch IC chip, where the second synchronization signal includes: a start moment and an end moment of a VBP of a second frame of picture displayed at the third refresh rate. The touch IC chip may send, in response to receiving the second synchronization signal, a wake-up signal in the VBP of the second frame of picture displayed at the third refresh rate, and intercept, after the VBP ends, the uplink signal from the stylus and the touch information of the user.

It should be understood that, in FIG. 13, the synchronization signal indicates the first synchronization signal and the second synchronization signal.

Figure 18:
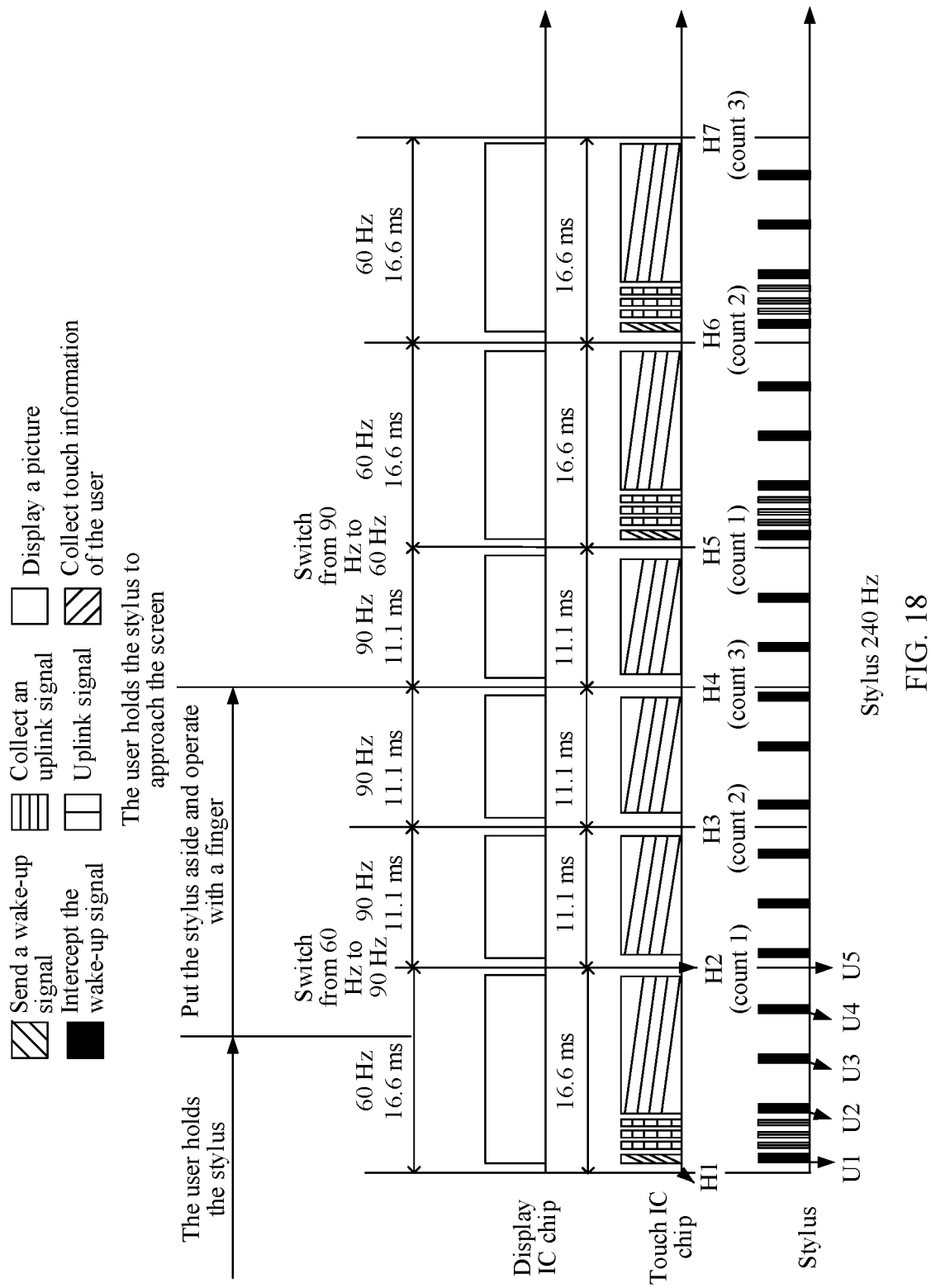
FIG. 18 is another sequence diagram of interaction between an electronic device and a stylus according to an embodiment of this application.

Referring to FIG. 18, a user holds a stylus to operate a screen, and a first frequency of the stylus is 240 Hz. Between a moment H1 and a moment H2, a display IC chip controls a display screen to display a first frame of picture at 60 Hz, a touch IC chip may send a wake-up signal in a VBP of the first frame of picture, and the touch IC chip may receive an uplink signal of the stylus. If the user puts the stylus aside between the moment H1 and the moment H2, a finger is used to enable the frame rate control module to switch the refresh rate from 60 Hz to 90 Hz in a VFP of the first frame of picture. Steps of S1006A and S1006B may be performed, so that the touch IC chip intercepts the touch information of the user in 11.1 ms. For the moment H2 to the moment H5, reference may be made to related descriptions in FIG. 12. The touch IC chip may not send the wake-up signal. The stylus has not intercepted the wake-up signal, and therefore does not send the uplink signal.

After the frame rate control module switches from 60 Hz to 90 Hz, a quantity of frames of pictures displayed at 90 Hz may be counted. At the moment H4, when the user holds the stylus to approach the screen (the touch IC chip detects that the capacitance sampling value change amount of the TP sensor is greater than or equal to the preset capacitance sampling value change amount), steps of S1008A, S1009A, and S1010 to S1015 may be performed. In response to that a quantity of frames in the frame quantity record reaches 3, the frame rate control module may switch from the second refresh rate to the third refresh rate. In FIG. 18, a description is made using an example in which the third refresh rate is 60 Hz.

Referring to FIG. 18, the moment H4 to the moment H5 are a third frame of picture displayed by the first IC chip at 90 Hz, and the frame rate control module may switch from 90 Hz to 60 Hz in a VFP of the third frame of picture. S1016A to S1016C may be performed, so that the touch IC chip sends a wake-up signal in the VBP of the first frame of picture displayed by the display IC chip at 60 Hz, the stylus may intercept the wake-up signal, and therefore may send an uplink signal in response to the wake-up signal, and the touch IC chip may receive the uplink signal, to ensure signal synchronization between the electronic device and the stylus.

In this embodiment of this application, an independent arrangement of the touch IC chip and the display IC chip may also achieve the technical effect of the embodiment shown in FIG. 10A, FIG. 10B, and FIG. 10C. Reference may be made to descriptions in the foregoing embodiments.

Based on the problem in FIG. 8 and FIG. 9, an embodiment of this application provides a refresh rate switching method, to change a frequency with which a stylus intercepts a wake-up signal, so that regardless of which refresh rate is adopted by the electronic device, it can be ensured that when using the stylus, the user can intercept the wake-up signal of the electronic device, and therefore the electronic device may receive the uplink signal from the stylus, to achieve an objective of signal synchronization between the electronic device and the stylus.

The electronic device supports a first refresh rate and a second refresh rate, the stylus may intercept the wake-up signal from the electronic device at a second frequency, and the second frequency is an integer multiple of a least common multiple of the first refresh rate and the second refresh rate.

Based on descriptions in FIG. 5, after the electronic device and the stylus are in a Bluetooth connection, the electronic device may synchronize, based on a response signal, the first refresh rate and the second refresh rate supported by the electronic device to the stylus. The stylus may calculate, based on the first refresh rate and the second refresh rate that are supported by the electronic device, a least common multiple of the first refresh rate and the second refresh rate, and then intercept the wake-up signal from the electronic device with the least common multiple.

Figure 19:
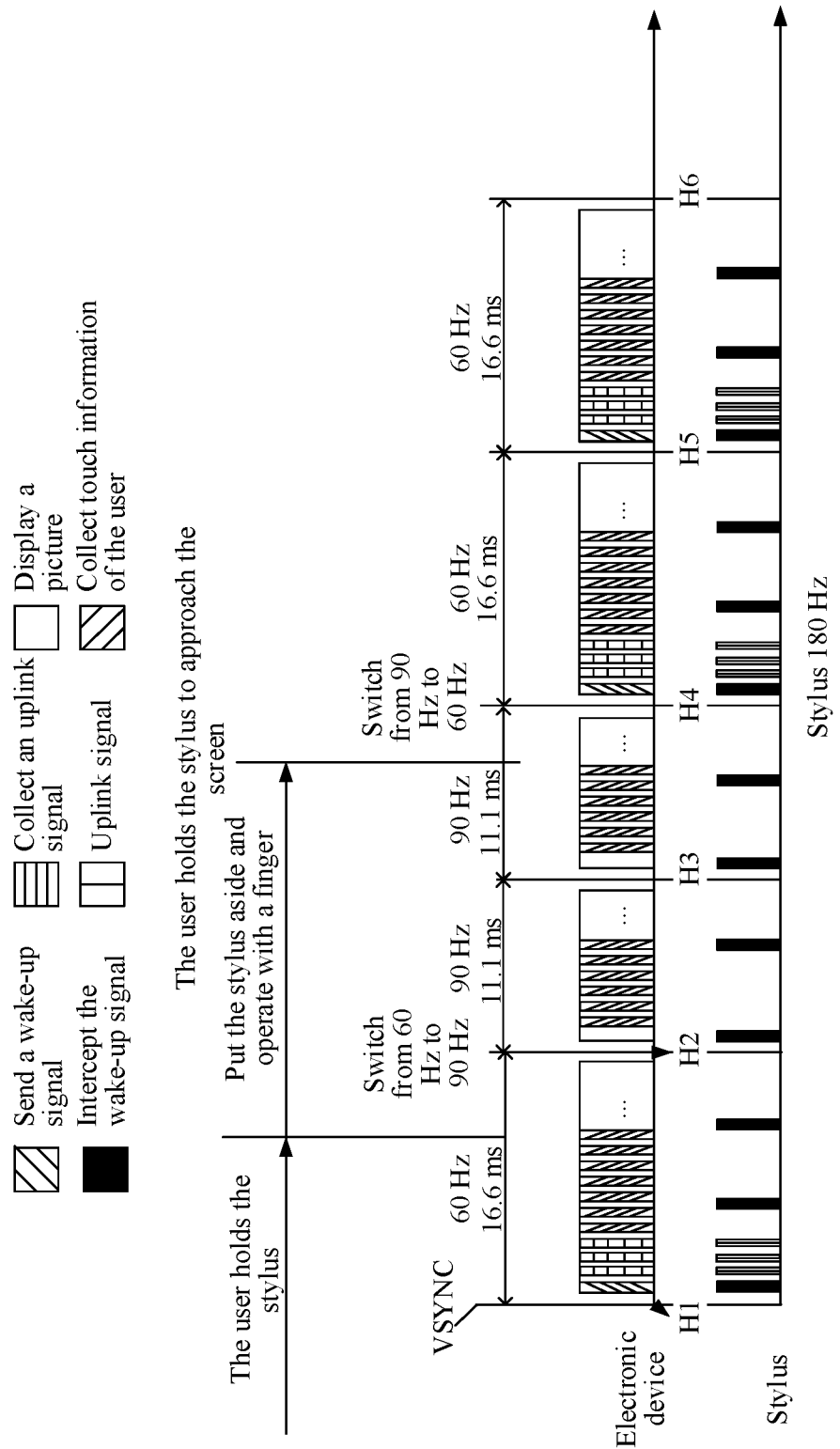
FIG. 19 is another sequence diagram of interaction between an electronic device and a stylus according to an embodiment of this application.

For example, that the touch IC chip and the display IC chip are integrated is used as an example. Referring to FIG. 19, the electronic device supports, for example, the first refresh rate 60 Hz and the second refresh rate 90 Hz, a least common multiple of the first refresh rate and the second refresh rate is 180 Hz, and the stylus may intercept the wake-up signal from the electronic device at 180 Hz. The user holds the stylus to operate the screen, and the first frequency of the stylus is 240 Hz. Between a moment H1 and a moment H2, the first IC chip controls the display screen to display the first frame of picture at 60 Hz and sends the wake-up signal in the VBP of the first frame of picture, and the first IC chip may receive the uplink signal of the stylus. Reference may be made to descriptions in FIG. 12. Between the moment H1 and the moment H2, the stylus may execute an action of intercepting a wake-up signal thrice.

If the user puts the stylus aside between the moment H1 and the moment H2, a finger is used to enable the frame rate control module to switch the refresh rate from 60 Hz to 90 Hz in a VFP of the first frame of picture. In the VBP of the second frame of picture, that is, the moment H2, the first IC chip may send a wake-up signal, and the stylus is far away from the screen and cannot intercept the wake-up signal, but the stylus always intercepts the wake-up signal at 180 Hz. Between the moment H2 and the moment H3, the stylus may execute an action of intercepting a wake-up signal twice.

For example, between the moment H3 and the moment H4, the user holds the stylus to approach the screen, and the electronic device switches from 90 Hz to 60 Hz in the VFP of displaying the third frame of picture. Because the frequency with which the stylus intercepts the wake-up signal is a least common multiple of 60 Hz and 90 Hz, when the electronic device sends a wake-up signal in the VBP of displaying the fourth frame of picture, the stylus may intercept the wake-up signal, and then send an uplink signal, to ensure signal synchronization between the electronic device and the stylus.

In an embodiment, the stylus may further intercept a wake-up signal with an integer multiple of "the least common multiple of the first refresh rate and the second refresh rate", such as 360 Hz or 540 Hz.

In this way, the refresh rate switching method provided in this embodiment of this application can similarly also achieve the objective of signal synchronization between the electronic device and the stylus.

Figure 20:
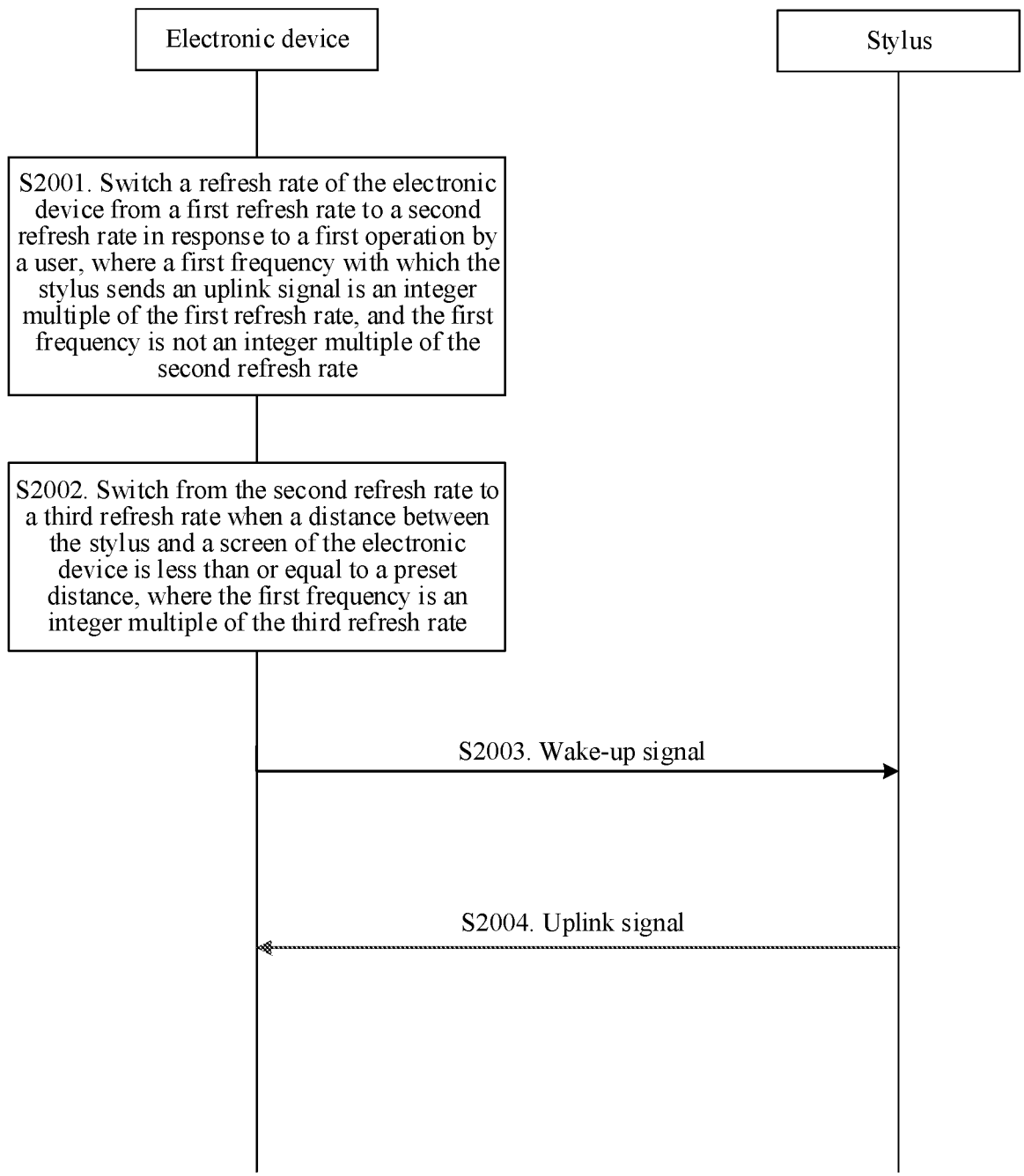
FIG. 20 is a schematic flowchart of another embodiment of a refresh rate switching method according to an embodiment of this application.

Because the electronic device may include the components (or modules) shown in FIG. 6A or FIG. 13, the electronic device may perform the foregoing refresh rate switching method in the embodiments of this application. In an embodiment, referring to FIG. 20, the refresh rate switching method provided in this embodiment of this application may include:

S2001. The electronic device switches a refresh rate of the electronic device from a first refresh rate to a second refresh rate in response to a first operation by a user, where a first frequency with which the stylus sends an uplink signal is an integer multiple of the first refresh rate, and the first frequency is not an integer multiple of the second refresh rate.

S2002. The electronic device switches from the second refresh rate to a third refresh rate when a distance between the stylus and a screen of the electronic device is less than or equal to a preset distance, where the first frequency is an integer multiple of the third refresh rate.

S2003. The electronic device sends a wake-up signal to the stylus.

S2004. The electronic device receives the uplink signal from the stylus, where the uplink signal is sent after the stylus receives the wake-up signal.

For steps of S2001 to S2004, reference may be made to related descriptions in the embodiment shown in FIG. 10A, FIG. 10B, and FIG. 10C or the embodiment shown in FIG. 17A, FIG. 17B, FIG. 17C, FIG. 17D, and FIG. 17E. The first operation may be a window switching operation by the user or a list sliding operation by the user.

This embodiment of this application has the same technical effect as that in the foregoing embodiments. Reference may be made to the descriptions of the foregoing embodiments.

In an embodiment, the embodiments of this application provide an electronic device, and a structure of the electronic device may be shown in FIG. 6A or FIG. 13.

In an embodiment, the embodiments of this application provide a refresh rate switch system, and the system includes the electronic device shown in FIG. 6A or FIG. 13 and a stylus, as shown in FIG. 1A. In an embodiment, the system may further include a wireless keyboard, as shown in FIG. 1B.

It should be understood that, both the electronic device and the refresh rate switch system may implement the refresh rate switching method in the foregoing embodiments, to achieve the technical effect in the foregoing embodiments, and reference may be made to related descriptions in the foregoing embodiments.

It should be noted that, the modules shown in FIG. 6A or FIG. 13 may be one or more integrated circuits configured to implement the foregoing methods, for example, one or more application-specific integrated circuits (application-specific integrated circuit, ASIC), or one or more digital signal processors (digital signal processor, DSP), or one or more field programmable gate arrays (field programmable gate array, FPGA). In another example, when a module described above is implemented in a form of a processing element scheduling program code, the processing element may be a general-purpose processor, for example, a central processing unit (central processing unit, CPU) or another processor that can invoke program code. In another example, such modules may be integrated together and implemented in a form of a system-on-a-chip (system-on-a-chip, SOC).

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, (SSD)), or the like.

"Plurality of" in this specification means two or more. The term "and/or" used herein describes only an association relationship for describing associated objects and represents that three relationships may exist. For example, A and/or B may represent the following three cases: Only A exists, both A and B exist, and only B exists. In addition, the character "I" in this specification generally indicates an "or" relationship between the associated objects. In formulas, the character "I" indicates a "division" relationship between the associated objects.

It may be understood that, various reference numerals in the embodiments of this application are merely for differentiation for ease of description, and are not intended to limit the scope of the embodiments of this application. In the embodiments of this application, an order of sequence numbers of the foregoing processes does not indicate an execution sequence, and execution sequences of the processes should be determined according to functions and internal logics thereof and should not impose any limitation on an implementation process of the embodiments of this application.

"Plurality of" in this specification means two or more. The term "and/or" used herein describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In formulas, the character "/" indicates a "division" relationship between the associated objects. The "first" and the "second" are used for distinguishing descriptions, but do not impose any limitation on an implementation process of the embodiments of this application.

It may be understood that, various reference numerals in the embodiments of this application are merely for differentiation for ease of description, and are not intended to limit the scope of the embodiments of this application.

It should be understood that in the embodiments of this application, an order of sequence numbers of the foregoing processes does not indicate an execution sequence, and execution sequences of the processes should be determined according to functions and internal logics thereof and should not impose any limitation on an implementation process of the embodiments of this application.

What is claimed is:

1. A refresh rate switching method, applicable to an electronic device, wherein the electronic device and a stylus are in a communication connection, and the method comprises:

switching a refresh rate of the electronic device from a first refresh rate to a second refresh rate in response to a first operation, wherein a first frequency with which the stylus sends an uplink signal is an integer multiple of the first refresh rate, and the first frequency is not an integer multiple of the second refresh rate;

recording a quantity of frames of pictures displayed at the second refresh rate, to obtain a frame quantity record;

switching from the second refresh rate to a third refresh rate when a distance between the stylus and a screen of the electronic device is less than or equal to a preset distance, wherein the first frequency is an integer multiple of the third refresh rate, and wherein the switching from the second refresh rate to a third refresh rate comprises:

querying the frame quantity record, and switching from the second refresh rate to the third refresh rate in response to that a quantity of frames recorded in the frame quantity record reaches a target quantity of frames;

sending a wake-up signal to the stylus; and
receiving the uplink signal from the stylus, wherein the uplink signal is sent after the stylus receives the wake-up signal.

2. The method according to claim 1, wherein before the switching from the second refresh rate to the third refresh rate in response to that the quantity of frames recorded in the frame quantity record reaches the target quantity of frames, the method further comprises:
A: calculating whether a product of a latest quantity of frames recorded in the frame quantity record and the second refresh rate is an integer multiple of the first frequency; and if yes, performing step B, or otherwise, performing step A in response to detecting a new quantity of frames recorded in the frame quantity record; and
B: determining that the quantity of frames recorded in the frame quantity record reaches the target quantity of frames.

3. The method according to claim 2, wherein after the switching the refresh rate of the electronic device from the first refresh rate to the second refresh rate, the method further comprises:
determining that a distance between the stylus and the screen is less than or equal to the preset distance if it is detected that a capacitance sampling value change amount of a touch panel sensor TP sensor in the screen is greater than or equal to a preset capacitance sampling value change amount and a change area of the capacitance sampling value change amount of the TP sensor indicates that a touch type is a stylus type.

4. The method according to claim 1, wherein the recording the quantity of frames of pictures displayed at the second refresh rate comprises:
starting a frame counter, to count the quantity of frames of the pictures displayed at the second refresh rate.

5. The method according to claim 4, wherein the third refresh rate is equal to the first refresh rate.

6. The method according to claim 5, wherein before the switching the refresh rate of the electronic device from the first refresh rate to the second refresh rate in response to the first operation, the method further comprises:
sending a handshake request to the stylus after being in the communication connection to the stylus;
receiving a handshake signal from the stylus, wherein the handshake signal comprises the first frequency;
determining that the refresh rate of the electronic device is the first refresh rate; and
sending a response signal to the stylus, wherein the response signal comprises the first refresh rate, the second refresh rate, and the third refresh rate.

7. The method according to claim 6, wherein the first operation is a window switching operation or a list sliding operation, and the switching the refresh rate of the electronic device from the first refresh rate to the second refresh rate in response to the first operation comprises:
obtaining, in response to the first operation, a refresh rate occurring after the first operation is executed; and
switching from the first refresh rate to the second refresh rate in response to that the refresh rate occurring after the first operation is executed is the second refresh rate.

8. The method according to claim 7, wherein an application and the refresh rate have a mapping relationship, and when the first operation is the window switching operation, the obtaining the refresh rate occurring after the first operation is executed comprises:
obtaining, according to the application to which a window occurring after switching belongs and the mapping relationship, the refresh rate occurring after the first operation is executed.

9. The method according to claim 7, wherein when the first operation is the list sliding operation, the obtaining the refresh rate occurring after the first operation is executed comprises:
obtaining, based on an application to which the window corresponding to the first operation belongs and the first operation, the refresh rate occurring after the first operation is executed.

10. The method according to claim 9, wherein after the receiving the uplink signal from the stylus, the method further comprises:
receiving a communication connection interrupt message from the stylus or a sleep message from the stylus;
obtaining, in response to a second operation, the refresh rate occurring after the second operation is executed; and
switching, in response to that the refresh rate occurring after the second operation is executed is not the third refresh rate, the third refresh rate to the refresh rate occurring after the second operation is executed.

11. The method according to claim 10, wherein the electronic device comprises: the application, an activity manager service module (AMS), a window manager service module (WMS), a scenario identification module, a frame rate control module, and the screen, the screen comprises: a first integrated circuit (IC) chip, a display screen, and a touch panel sensor (TP) sensor, and the switching the refresh rate of the electronic device from the first refresh rate to the second refresh rate in response to the first operation comprises:
sending, by the application in response to the first operation, first information to the AMS, wherein the first information comprises: an identifier of the application and an identifier of an activity;
sending, by the application, second information to the WMS, wherein the second information comprises: a location of a window, a display sequence, sizes, and locations of elements in the window, the identifier of the application, and the identifier of the activity;
sending, by the WMS in response to receiving the second information, the identifier of the application and the identifier of the activity to the scenario identification module;
determining, by the scenario identification module, an identifier of a scenario based on the identifier of the application and the identifier of the activity;
sending, by the scenario identification module, the identifier of the scenario to the frame rate control module;
responding, by the frame rate control module, to receiving the identifier of the scenario, and when the first operation is the window switching operation, determining, by the frame rate control module based on the identifier of the scenario, that the refresh rate corresponding to the identifier of the scenario is the second refresh rate; or
when the first operation is the list sliding operation, determining, by the frame rate control module based on the identifier of the scenario and the first operation, that the refresh rate corresponding to the identifier of the scenario is the second refresh rate;
synchronizing, by the frame rate control module, the second refresh rate to the first IC chip;

sending, by the frame rate control module based on the second refresh rate, a vertical synchronization signal (VSYNC) to the first IC chip; and
displaying, by the first IC chip in response to receiving the VSYNC, a picture at the second refresh rate, and collecting touch information;
the switching from the second refresh rate to the third refresh rate comprises:
synchronizing, by the frame rate control module, the third refresh rate to the first IC chip;
sending, by the frame rate control module based on the third refresh rate, the VSYNC to the first IC chip; and
displaying, by the first IC chip in response to receiving the VSYNC, the picture at the third refresh rate;
the sending the wake-up signal to the stylus comprises:
sending, by the first IC chip, the wake-up signal to the stylus through the TP sensor in a vertical back porch of displaying the picture at the third refresh rate; and
the receiving the uplink signal from the stylus comprises:
receiving, by the first IC chip, the uplink signal from the stylus through the TP sensor.

12. The method according to claim 11, wherein during the displaying, by the first IC chip in response to receiving the VSYNC, the picture at the second refresh rate, the method further comprises:
starting, by the frame rate control module, the frame counter, to count the quantity of frames of the pictures displayed at the second refresh rate, to obtain the frame quantity record; and
before the synchronizing, by the frame rate control module, the third refresh rate to the first IC chip, the method further comprises:
querying the frame quantity record, and synchronizing the third refresh rate to the first IC chip in response to that the quantity of frames recorded in the frame quantity record reaches the target quantity of frames.

13. The method according to claim 12, wherein before the synchronizing the third refresh rate to the first IC chip in response to that the quantity of frames recorded in the frame quantity record reaches the target quantity of frames, the method further comprises:
A: calculating whether a product of a latest quantity of frames recorded in the frame quantity record and the second refresh rate is the integer multiple of the first frequency; and if yes, performing step B, or otherwise, performing step A in response to detecting a new quantity of frames recorded in the frame quantity record; and
B: determining that the quantity of frames recorded in the frame quantity record reaches the target quantity of frames.

14. The method according to claim 13, wherein after the displaying, by the first IC chip in response to receiving the VSYNC, the picture at the second refresh rate, the method further comprises:
determining, by the first IC chip, that the distance between the stylus and the screen is less than or equal to the preset distance in response to detecting that a capacitance sampling value change amount of the TP sensor is greater than or equal to a preset capacitance sampling value change amount and a change area of the capacitance sampling value change amount of the TP sensor indicates that a touch type is a stylus type.

15. The method according to claim 14, wherein the electronic device further comprises: a touch driver, a touch message dispatch processing module, and a first touch message processing module, and after the determining that the distance between the stylus and the screen is less than or equal to the preset distance, the method further comprises:
sending, by the first IC chip, information about the stylus to the touch driver, wherein the information about the stylus comprises: a location of the stylus on the screen, a state type, and an identifier of the stylus, or the information about the stylus comprises: the capacitance sampling value change amount of the TP sensor and the identifier of the stylus, and the state type comprises: an enter hover type, a down type, an up type, or a move type;
obtaining, by the touch driver, the location of the stylus on the screen, the state type, and the identifier of the stylus according to the information about the stylus;
sending, by the touch driver, the location of the stylus on the screen, the state type, and the identifier of the stylus to the first touch message processing module through the touch message dispatch processing module; and
determining, by the first touch message processing module, to send a refresh rate adjustment message to the frame rate control module according to the state type of the stylus and the identifier of the stylus, wherein the refresh rate adjustment message is used for instructing the frame rate control module to adjust the second refresh rate to the third refresh rate.

16. The method according to claim 15, wherein the determining, by the first touch message processing module, to send the refresh rate adjustment message to the frame rate control module according to the state type of the stylus and the identifier of the stylus comprises:
determining, by the first touch message processing module in response to the identifier of the stylus and determining that the state type of the stylus is a preset state type, to send the refresh rate adjustment message to the frame rate control module, wherein the preset state type comprises: the enter hover type or the down type; and
the synchronizing, by the frame rate control module, the third refresh rate to the first IC chip comprises:
synchronizing, by the frame rate control module in response to receiving the refresh rate adjustment message, the third refresh rate to the first IC chip.

17. The method according to claim 16, wherein the first IC chip comprises: a touch IC chip and a display IC chip; the synchronizing, by the frame rate control module, the second refresh rate to the first IC chip comprises:
synchronizing, by the frame rate control module, the second refresh rate to the touch IC chip; and
synchronizing, by the frame rate control module, the second refresh rate to the display IC chip; and
the displaying, by the first IC chip in response to receiving the VSYNC, the picture at the second refresh rate, and collecting touch information comprises:
displaying, by the display IC chip in response to receiving the VSYNC, the picture at the second refresh rate, and sending a first synchronization signal to the touch IC chip; and
collecting, by the touch IC chip in response to receiving the first synchronization signal, the touch information;
the synchronizing, by the frame rate control module, the third refresh rate to the first IC chip comprises:
synchronizing, by the frame rate control module, the third refresh rate to the touch IC chip; and
synchronizing, by the frame rate control module, the third refresh rate to the display IC chip;

the displaying, by the first IC chip in response to receiving the VSYNC, the picture at the third refresh rate comprises:
displaying, by the display IC chip in response to the VSYNC, the picture at the third refresh rate, and sending a second synchronization signal to the touch IC chip, wherein the second synchronization signal comprises: a start moment and an end moment of the vertical back porch of displaying the picture at the third refresh rate; and
the sending, by the first IC chip, the wake-up signal to the stylus through the TP sensor in the vertical back porch of displaying the picture at the third refresh rate comprises:
sending, by the touch IC chip in response to receiving the second synchronization signal, the wake-up signal to the stylus through the TP sensor in the vertical back porch;
receiving, by the first IC chip, the uplink signal from the stylus through the TP sensor; and
receiving, by the touch IC chip, the uplink signal from the stylus through the TP sensor.

18. An electronic device, comprising one or more processors and a memory, wherein
the memory is coupled to the one or more processors, the memory stores computer instructions for execution by the one or more processors, wherein the computer instructions, when executed, cause the electronic device to perform operations comprising:
switching a refresh rate of the electronic device from a first refresh rate to a second refresh rate in response to a first operation, wherein a first frequency with which a stylus sends an uplink signal is an integer multiple of the first refresh rate, and the first frequency is not an integer multiple of the second refresh rate;
recording a quantity of frames of pictures displayed at the second refresh rate, to obtain a frame quantity record;
switching from the second refresh rate to a third refresh rate when a distance between the stylus and a screen of the electronic device is less than or equal to a preset distance, wherein the first frequency is an integer multiple of the third refresh rate, and wherein the switching from the second refresh rate to a third refresh rate comprises:
querying the frame quantity record, and switching from the second refresh rate to the third refresh rate in response to that a quantity of frames recorded in the frame quantity record reaches a target quantity of frames;
sending a wake-up signal to the stylus; and
receiving the uplink signal from the stylus, wherein the uplink signal is sent after the stylus receives the wake-up signal.

19. A refresh rate switching system, comprising an electronic device and a stylus, the electronic device is configured to perform the following operations:
switching a refresh rate of the electronic device from a first refresh rate to a second refresh rate in response to a first operation, wherein a first frequency with which the stylus sends an uplink signal is an integer multiple of the first refresh rate, and the first frequency is not an integer multiple of the second refresh rate;
recording a quantity of frames of pictures displayed at the second refresh rate, to obtain a frame quantity record;
switching from the second refresh rate to a third refresh rate when a distance between the stylus and a screen of the electronic device is less than or equal to a preset distance, wherein the first frequency is an integer multiple of the third refresh rate, and wherein the switching from the second refresh rate to a third refresh rate comprises:
querying the frame quantity record, and switching from the second refresh rate to the third refresh rate in response to that a quantity of frames recorded in the frame quantity record reaches a target quantity of frames;
sending a wake-up signal to the stylus; and
receiving the uplink signal from the stylus, wherein the uplink signal is sent after the stylus receives the wake-up signal.

20. The electronic device according to claim 18, wherein before the switching from the second refresh rate to the third refresh rate in response to that the quantity of frames recorded in the frame quantity record reaches the target quantity of frames, the operations further comprise:
A: calculating whether a product of a latest quantity of frames recorded in the frame quantity record and the second refresh rate is an integer multiple of the first frequency; and if yes, performing step B, or otherwise, performing step A in response to detecting a new quantity of frames recorded in the frame quantity record; and
B: determining that the quantity of frames recorded in the frame quantity record reaches the target quantity of frames.

* * * * *